US005753279A

United States Patent [19]
Takada et al.

[11] Patent Number: 5,753,279
[45] Date of Patent: May 19, 1998

[54] INJECTION STRETCH BLOW MOLDING APPARATUS

[75] Inventors: Minoru Takada; Koichi Sato; Kazuyuki Yokobayashi, all of Ueda; Shyuichi Ogihara, Komoro, all of Japan

[73] Assignee: Nissei ASB Machine Co., Ltd., Nagano, Japan

[21] Appl. No.: 528,193

[22] Filed: Sep. 14, 1995

Related U.S. Application Data

[63] Continuation-in-part of Ser. No. 474,746, Jun. 7, 1995.

[30] Foreign Application Priority Data

Sep. 16, 1994 [JP] Japan ................................. 6-248416
Jul. 21, 1995 [JP] Japan ................................. 7-207789

[51] Int. Cl.⁶ .......................... B29C 49/06; B29C 49/12; B29C 49/64; B29C 49/70
[52] U.S. Cl. ................ 425/526; 425/529; 425/533; 425/534; 425/538; 425/556
[58] Field of Search ............... 425/529, 526, 425/534, 538, 533, 168

[56] References Cited

U.S. PATENT DOCUMENTS

| | | | |
|---|---|---|---|
| 3,149,373 | 9/1964 | Marzillier | 425/526 |
| 3,787,170 | 1/1974 | Gilbert | 425/526 |
| 3,963,399 | 6/1976 | Zavasnik | 425/526 |
| 4,070,428 | 1/1978 | Krall et al. | 425/530 |
| 4,102,626 | 7/1978 | Scharrenbroich | 425/526 |
| 4,140,464 | 2/1979 | Spurr et al. | 425/533 |
| 4,140,468 | 2/1979 | Duga | 425/534 |
| 4,204,111 | 5/1980 | Yonko | 425/526 |
| 4,214,860 | 7/1980 | Kleimenhagen et al. | 425/529 |
| 4,239,475 | 12/1980 | Rainville | 425/526 |
| 4,261,949 | 4/1981 | Spurr et al. | 264/535 |
| 4,310,282 | 1/1982 | Spurr et al. | 414/753 |
| 4,330,255 | 5/1982 | Suzuki | 425/529 |

(List continued on next page.)

FOREIGN PATENT DOCUMENTS

| | | |
|---|---|---|
| 0058947 | 9/1982 | European Pat. Off. . |
| 0266804 | 5/1988 | European Pat. Off. . |
| 0534367 | 3/1993 | European Pat. Off. . |
| 2343588 | 10/1977 | France . |
| 2389580 | 12/1978 | France . |
| 2056617 | 6/1972 | Germany . |
| 4033531 | 5/1992 | Germany . |

(List continued on next page.)

OTHER PUBLICATIONS

Patent Abstract, ES2058019, Reycobe SL. "Testing and Sorting Equipment for Plastic Bottles . . . ". Oct. 1994.

Patent Abstracts of Japan, JP60180814, vol. 10, No. 21, (M–449), Katashi, "Stretching Blow Molding System," Sep. 1985.

By E. Neumann, "Blasformen von Mehrwegflaschen," in *Kunststoffe*, vol. 83, No. 5, May 1993, pp. 343–347, Germany.

(List continued on next page.)

*Primary Examiner*—Robert Davis
*Attorney, Agent, or Firm*—David L. Hoffman, Esq.; Cislo & Thomas LLP

[57] ABSTRACT

An injection stretch blow molding apparatus and method wherein while the preforms are amply cooled the injection molding cycle time is shortened and furthermore a small number of blow cavities are used. In an injection molding section, N (N≧2) preforms are injection molded in an upright state and then released from the injection cavity mold. While the preforms are cooled by the injection core mold, they are carried to a preform ejecting section. After the preforms cool to a temperature at which they can be ejected, the preforms are ejected from the injection core mold. In a transfer station, an array pitch of the simultaneously molded preforms are changed to a blow molding pitch, and then the preforms are transferred to a blow molding station in an inverted state. In the blow molding station, each preform is carried by a carrier member through a heating section into a blow molding section. In the blow molding section, n bottles are simultaneously blow molded from n preforms.

7 Claims, 34 Drawing Sheets

U.S. PATENT DOCUMENTS

| | | | |
|---|---|---|---|
| 4,391,578 | 7/1983 | Schaar | 425/534 |
| 4,405,556 | 9/1983 | Valyi | 425/526 |
| 4,412,806 | 11/1983 | Gaiser et al. | 425/533 |
| 4,522,581 | 6/1985 | Schad et al. | 425/534 |
| 4,690,633 | 9/1987 | Schad et al. | 425/526 |
| 4,693,375 | 9/1987 | Schweers | 425/534 |
| 4,729,732 | 3/1988 | Schad et al. | 425/526 |
| 4,747,769 | 5/1988 | Nakamura et al. | 425/533 |
| 4,793,960 | 12/1988 | Schad et al. | 264/535 |
| 4,929,450 | 5/1990 | Takakusaki et al. | 425/526 |
| 5,261,809 | 11/1993 | Koga | 425/534 |
| 5,297,950 | 3/1994 | Kresak | 425/534 |
| 5,308,237 | 5/1994 | Kieran | 425/534 |
| 5,424,022 | 6/1995 | Koga | 425/526 |
| 5,589,130 | 12/1996 | Takada et al. | 425/533 |

FOREIGN PATENT DOCUMENTS

| | | | |
|---|---|---|---|
| 4212115 | 6/1993 | Germany | 425/526 |
| 631654 | 8/1982 | Switzerland . | |
| 2062534 | 5/1981 | United Kingdom . | |
| 2093396 | 9/1982 | United Kingdom . | |
| 2097322 | 11/1982 | United Kingdom . | |

OTHER PUBLICATIONS

By Haldenwanger, Mineif, Arnegger and Schuler, "Kunstoff–Motorbauteile in Ausschmelzkerntechnik am Beispiel Eines Saugrohres," in *Automobiltechnische Zeitschrift*, vol. 89, No. 3, pp. 139–143, Mar. 1987, Germany.

INJECTION STRETCH BLOW MOLDING APPARATUS

CROSS REFERENCE TO RELATED APPLICATIONS

This application is a continuation-in-part of Ser. No. 08/474,746 filed Jun. 7, 1995.

BACKGROUND OF THE INVENTION

This invention relates to an injection stretch blow molding apparatus and method wherein containers are stretch blow molded from preforms retaining heat from when they were injection molded. This invention also relates to an injection stretch blow molding apparatus and method wherein N ($N \geq 2$) preforms are simultaneously injection molded and n ($1 \leq n < N$) preforms among these are simultaneously blow molded into n containers. More particularly, the invention relates to an injection stretch blow molding apparatus and method with which while ample cooling time is provided the preforms can be molded with a shortened injection molding cycle time and furthermore the operation rate of the blow cavities can be increased. Also, this invention relates to constructions and methods for heating and adjusting the temperature of the preforms before they are blow molded. Also, this invention relates to an injection stretch blow molding apparatus and method with which it is possible when necessary to discharge the preforms to outside the apparatus instead of carrying them to the blow molding section.

Methods for blow molding a container from a preform (parison) include that known as the cold parison or 2-stage method and that which is known as the hot parison or 1-stage method. In both these methods, for injection molding the preforms required for the blow molding, at least an injection cavity mold which shapes the outer wall of the preform and an injection core mold which shapes the inner wall of the preform are necessary. Also, after the injection cavity mold and the injection core mold are clamped together and the preform is injection molded, with the molds still clamped together it is necessary to cool the preform down to a temperature at which the preform can be released from the molds.

Particularly in the case of the cold parison (2-stage) method, because this preform mold-release temperature has to be made quite low, the injection molding cycle time has been long and productivity has been poor. This is because when the preform is ejected by the injection cavity mold and the injection core mold being released from the preform and the preform being dropped or the like, it is necessary for the preform to be cooled to a mold-release temperature low enough for the preform not to be deformed when it makes contact with other members.

In the case of the cold parison method, because the preform molding step and the step in which a container is blow molded from this preform are completely unrelated or independent, the blow molding cycle time is not affected by the injection molding cycle time. However, because the cold parison method involves reheating preforms which have been cooled to room temperature the cold parison method is inferior to the hot parison method in its energy efficiency.

In a hot parison (1-stage) method injection stretch blow molding machine which draw blow molds bottles from preforms still containing heat from when they were injection molded the cycle time of the overall apparatus is determined by the injection molding cycle time, which of all the cycles is the one requiring the most time. Consequently there has been the problem that when the time required for injection molding is long, the throughput of the whole apparatus is low.

In the case of the hot parison method, although the preform is mold-released at a higher temperature than in the cold parison method, there is a limit on this mold-release temperature and consequently it is not possible to greatly speed up the injection molding cycle. One reason for this is that when the preform mold-release temperature is high, when the injection core mold is released from the preform, a mold-release called lifting, wherein the preform sticks to the core mold, occurs. Also, after the injection core mold is released from the preform, because there is no longer any member restricting deformation of the preform, deformation caused by temperature nonuniformity and thermal contraction and the like make it impossible for preforms conforming to the design to be ejected. Furthermore, when the cooling effected by the injection core mold is inadequate, crystallization caused by inadequate cooling occurs, particularly at the inner wall of the preform, and a preform of which the trunk portion is opaque is ejected.

Also, when preforms are ejected before they are completely cooled by the injection core mold and the injection cavity mold (with the preforms still at a temperature at which blow molding is possible) and blow molding is carried out thereafter, there have been the following problems:

(A) Unless the internal pressure (injection sustain pressure) is raised, shrink marks form at the injection cavity mold side of the preform and a preform with a uniform temperature distribution cannot be obtained. Consequently, when this preform is blow molded, a molded product with a uniform wall thickness distribution cannot be obtained.

(B) When the internal pressure (injection sustain pressure) is raised, a pressure differential forms between the gate portion and the preform end portion (for example the neck portion), and the resulting preform has large residual stresses at the preform bottom end where the pressure was high. Consequently, when the preform is blow molded, a molded product with a uniform wall thickness distribution cannot be obtained.

(C) When the preform is cooled by the injection core mold and the injection cavity mold, as the cooling progresses the preform contracts and tends to move away from the injection cavity surface. Because of this, there are some parts of the outer wall surface of the preform which are in contact with the injection cavity and some parts which are not in contact with the injection cavity, and consequently different parts of the preform cool at different rates and the temperature becomes uneven. As a result, when this preform is blow molded, a molded product of uniform wall thickness cannot be obtained.

Thus, in a conventional hot parison system, unless the preform is amply cooled by the injection cavity mold and the injection core mold it has not been possible to obtain good blowing characteristics or good bottle characteristics. Because of this, the injection molding of the preforms has required time, and the throughput of the apparatus has been low.

Various other problems have also been associated with injection stretch blow molding machines using the hot parison method, including the following:

When in order to increase the throughput the number N of preforms injection molded simultaneously is increased, the same number N of cavities conforming to the external shape of the bottles being manufactured have to be formed in the blow cavity mold. Of the molds used in a blow molding machine the blow cavity mold is the most expensive, and the cost of this blow cavity mold increases roughly in proportion to the number of cavities in it. Even if a mold is expensive, if its operation rate is high then it can be used cost-effectively; however, because as described above the cycle time of the overall apparatus depends on the injection molding cycle time and cannot be shortened, the operation rate of each cavity in the blow cavity mold has unavoidably been low. Also, when the number of bottles blow molded simultaneously increases, not only the number of cavities in the blow mold but also the number of drawing rods and blow core molds and mechanisms for supporting and driving these increases, and this has resulted in increases in the size and cost of the apparatus.

Another problem has been that conventionally it has not been possible to eject the preforms unless the injection core mold is completely pulled out of the preforms, and consequently with a rotary injection molding apparatus it has not been possible to carry the preforms from the injection molding section to the next stage. When on the other hand the injection core mold is completely pulled out of the preforms, there has been the problem that this pullout stroke is long and the overall height of the apparatus is high.

Another problem has been that when hot parison blow molding is carried out by a rotary carrier type blow molding machine the injection molded preforms are always carried by the rotary carrier to the blow molding section. Here, for example when a problem has arisen in the blow molding section, there has been no alternative but to shut down the preform injection molding as well as the blow molding section. However, once the injection molding section is shut down, a long starting-up time is required when it is restarted. This is because the injection apparatus contains numerous resin-heating mechanisms in the hot runner mold and elsewhere.

As a result, as well as it not being possible to raise the throughput of the overall apparatus, as described above, a lot of time is required for starting up the apparatus when a problem has arisen, and the productivity falls even further.

SUMMARY OF THE INVENTION

Accordingly, it is an object of the invention to provide an injection stretch blow molding apparatus and method with which while ample preform cooling time is provided the injection molding cycle time can be shortened and the cycle time of the overall apparatus can thereby be shortened.

Another object of the invention is to provide a highly efficient injection stretch blow molding apparatus and method with which while reducing costs and spaces by reducing the number of cavities in the blow mold the operation rate of the blow mold can be increased.

Another object of the invention is to provide an injection stretch blow molding apparatus and method which while exploiting the heat energy efficiency of hot parison molding also has the preform temperature distribution stability of the cold parison method.

Another object of the invention is to provide an injection stretch blow molding apparatus and method with which temperature nonuniformity and deformation can be prevented even when the preform mold-release temperature at which the preforms are released from the injection cavity mold is made high and furthermore the preforms can be amply cooled before they are released from the injection core mold and can be stably blow molded thereafter at a suitable blow molding temperature.

According to an aspect of the present invention, an injection stretch blow molding apparatus comprises:
  a preform molding station for injection molding preforms;
  a blow molding station for stretch blow molding the preforms into containers; and
  a transfer station for transferring said preforms from said preform molding station to said blow molding station,
  said preform molding station comprising:
    a first circulatory carrier for intermittently circulatorily carrying a plurality of injection core molds spaced away from one another along a first carrying path; na injection molding section including an injection cavity mold capable of being clamped relative to one of said injection core molds which is stopped in course of said carrying path such that an erecting preform will be injection molded with its opened neck being directed upwardly; and
    a removal section for separating and removing the molded preform from the injection core mold stopped in course of said first carrying path with said preform being maintained at its erecting state,
  said blow molding station comprising:
    a second circulatory carrier for intermittently circulatorily carrying the molded preforms transferred from said preform molding station through said transfer station along a second carrying path with said preforms being inverted to have their opened necks directed downwardly; and
    a blow molding section including a blow mold capable of being clamped relative to one of said preforms which is stopped in course of said second carrying path, thereby permitting that preform to be blow molded into a container, said transfer station comprising:
    a mechanism for receiving the molded preform from the injection core mold with said molded preformed being its erecting state; and
    another mechanism for inverting said received preform to its inverted state.

According to another aspect of the invention, an injection stretch blow molding method wherein preforms which are injection molded are transferred from a preform molding station to a blow molding station by way of a transfer station and the preforms are blow molded into containers in the blow molding station, comprising the steps of:
  in the preform molding station, injection molding the preforms in an upright state with open neck portions of said preforms facing upward;
  in the transfer station, changing an array pitch of the preforms from an injection molding pitch to a blow molding pitch after the transfer station has received the preforms from the preform molding station, turning the preforms upside-down and thereafter transferring the preforms to the blow molding station in an inverted state; and
  in the blow molding station, blow molding the containers from the preforms in an inverted states.

According to the inventions, the preforms are molded in an upright state with their neck portions facing upward. As a result, the injection mold clamping is vertical clamping and is therefore space-saving. Also, because resin is normally injected from the preform bottom portion side, a stable arrangement wherein the injecting apparatus and the injection cavity mold are disposed on a machine bed and the injection core mold is disposed thereabove can be employed. Also, because when the preforms are carried to the blow molding station they are in an inverted state, the openings at their neck portions can be used to have the preforms support themselves easily. Furthermore, because the drawing rods and blow core molds consequently have to be positioned underneath the preforms, they can be disposed using a space in the machine bed and the overall height of the blow molding section can be made low.

With use of the separate receiving and inverting mechanisms, a preform can be inverted while the other preform is being received. The system of the present invention can easily be applied to a more rapid cycle of molding.

In addition, according to these inventions, the preforms injection molded in the injection molding section are cooled by the injection cavity mold and the injection core mold and then the injection cavity mold only is released from the preforms. After that, the preforms are carried to the preform ejecting section by the injection core mold. The preforms are ejected after being cooled by the injection core mold during this carrying and in the preform ejecting section. As a result, by the preforms being cooled by the injection core mold even after the injection cavity mold is mold-released in the injection molding section, ample preform cooling time is provided. Therefore, the preform mold-release temperature at which the preforms are released from the injection cavity mold can be made high, the injection molding cycle time can thereby be shortened and the cycle time of the overall apparatus can be shortened. Also, even when the preforms are released from the injection cavity mold at a high temperature, deformation of the preforms is prevented by the injection core mold. Furthermore, not only does the cooling efficiency increase because the preforms contract into contact with the injection core mold as they are cooled, and consequently crystallization and loss of transparency of the trunk portions of the preforms caused by inadequate cooling is prevented, but also by thus stabilizing the cooling process it is possible to stabilize the amount of heat retained by the preforms and thereby stabilize the wall thickness distributions of successively blow molded containers. Since the preform is carried by the injection core mold, furthermore, any stroke of drawing the preform is not required, resulting in reduction of the height in the entire apparatus.

According to these inventions, the inventions provide the following operations and effects in addition to those of the inventions as described above: If the number n of preforms simultaneously blow molded is made smaller than the number N of preforms simultaneously injection molded, fewer cavities are required in the blow mold and mold costs, molds being consumable items, can be greatly reduced. Also, because fewer blow core molds, stretching rods, and mechanisms for supporting and driving these are required, the apparatus can be made more compact and cheaper. Furthermore, because N simultaneously molded preforms are blow molded n ($n \leq N$) at a time over a plurality of blow molding cycles within the shortened injection molding cycle time, the operating rate of the n cavities in the blow cavity mold increases.

Here, a heating section for heating the preforms being carried to the blow molding section can be provided. When this is done, the preforms can be brought to a temperature suitable for blow molding by cooling performed by the injection molds and reheating of the cooled preforms, and the temperature stability from cycle to cycle therefore increases. Since the preforms have their heat holdings, they can attain a temperature suitable for blow molding merely by adding a certain heat to the preforms in many cases. Therefore, the preforms require a relatively short time period to heat them.

Further, containers of the desired wall thickness can be obtained by providing a longitudinal distribution of temperature to the preforms in the heating step. Also, even though N simultaneously injection molded preforms are blow molded n preforms at a time over (N/n) blow molding cycles, control reducing the temperature variation among blow molding cycles can easily be carried out.

Also, when the preforms being heated are rotated about their vertical center axes, heating unevenness is reduced and temperature nonuniformity in the circumferential direction of the preforms can thereby be reduced.

Furthermore, a second circulatory carrier comprises a plurality of carrier members which remain spaced at equal intervals along the second carrying path, and each of the carrier members has a supporting portion for supporting a preform in an inverted state. It is preferable that the array pitch at which the plurality of carrier members are spaced along the second carrier path be made equal to the array pitch P of the plurality of cavities in the blow cavity mold. This is because it makes pitch conversion in the carrying process unnecessary. When this is done, the array pitch of the preforms in the heating section of the invention is greater than the small pitch at which the preforms are arrayed in the heating section in a conventional 2-stage system. However, because in this invention it is only necessary to give the preforms a small amount of heat energy in addition to the heat which they retain from when they were injection molded, the heating time can be short and the length of the heating section does not have to be made long as it does in the cold parison case.

The pitch of injection molding in the preform molding station is larger than the pitch of blow molding in the blow molding station. It is thus preferable that the receiving mechanism includes a pitch changing mechanism for changing said preforms from the injection molding pitch to the blow molding pitch.

Even if the injection molding pitch is larger than the blow molding pitch, therefore, the blow molding pitch can be attained immediately after the receiving mechanism has received the preforms. The system of the present invention can easily be applied to any molding apparatus which requires the change of pitch.

The preform has its barrel diameter smaller than that of its final product configuration. Thus, the number of preforms to be handled can be increased. The optimum pitch can be provided in the blow molding stage.

Such a change of pitch may be carried out by the inverting mechanism. In such a case, the inverting mechanism may include a pitch changing mechanism for changing said preforms from the injection molding pitch to the blow molding pitch.

Thus, the inverting mechanism can perform its inverting step while changing the preforms from the injection molding pitch to the blow molding pitch immediately after the receiving mechanism has received the preforms. The system of the present invention can easily be applied to any molding apparatus which requires the change of pitch.

Such a change of pitch may be carried out in the transfer station between the preform molding station and the blow molding station. In such a case, the transfer station changes the array pitch of the preforms from the injection molding pitch to the blow molding pitch immediately after the transfer station has received the preforms from the preform molding station and thereafter inverts the preforms.

In general, each of said preforms has a flange portion having a diameter that is larger than the external diameter of the barrel below the neck. In such a case, the receiving mechanism may include holding members each of which engages the bottom of the flange portion to hold the preform.

Thus, the flange portion can reliably hold the preform as through a support ring or the like and yet will not damage the preform since the flange does not almost contact the barrel or other part of the preform.

Each of the holding members may include an open/close mechanism for holding and releasing the preform. In such a case, the open/close mechanism may include a passage portion which can hold the flange portion of the preform while permitting the barrel portion smaller than the flange portion to pass through the passage portion.

Thus, the open/close mechanism of the holding member can reliably hold the preform without any play and yet be opened to release the preform easily and positively when the preform is to be removed.

Each of the holding members of the receiving mechanism may include a holding part which contacts at least part of the bottom and barrel of the preform to hold the preform.

Thus, the bottom or barrel of the preform can be reliably held by the holding part irrespectively of the final product configuration.

Each of the holding members of the receiving mechanism may have means for cooling the outer wall of the preform.

The cooling means can cool the preform while being held by the holding member. Particularly, the outer wall of the preform has its temperature higher than that of the inner wall thereof since the outer wall is not in contact with other parts such as core pins or the like. By cooling the outer wall of the preform, the difference of temperature between the outer and inner walls of the preform can be reduced more rapidly.

The second circulatory carrier may be adapted to orientate carrier members at the preform receiving position opposed to the inverting mechanism, the number of said carrier members being equal to the number N of preforms which have been injection molded simultaneously in the preform molding station.

In such a case, the inverting mechanism may have a holding mechanism for holding the N preforms at the same time. Such a holding mechanism can simultaneously deliver the N preforms to the same number (N) of said carrier members stopped at the preform receiving position while inverting the preforms.

Even if the number of molded preforms is larger than that of blow molded articles, the blow molded articles can be delivered to the carrier member at a batch manner. Thus, the delivery of preforms can be once attained to simplify the system in procedure and construction.

The apparatus may further include a device for moving the receiving mechanism in the horizontal direction. The receiving mechanism will be horizontally moved by such a device after it has received the preforms at a position just below the removal section of the injection molding station. Thus, the preforms can be delivered to the inverting mechanism.

Thus, the delivery of preforms from the receiving mechanism to the inverting mechanism can be more simply performed using a more simplified mechanism for moving the receiving mechanism in the horizontal direction.

From the same viewpoint, the apparatus may include a further device for moving the inverting mechanism in the horizontal direction. In such a case, the inverting mechanism will be horizontally moved by the further device after the inverting mechanism has received the preforms from the receiving mechanism. Thus, the preforms will be delivered to the N carrier members.

It is further preferable that the inverting mechanism is positioned at its stand-by place until all the carrier members have been moved to the preform receiving position, while holding the preforms in their inverted state with the neck parts being directed downwardly.

This can omit time required to invert the preforms from their erecting state after the carrier members have been moved to the preform receiving position. Therefore, the preforms can be delivered to the carrier members with less behavior and/or time immediately after all the carrier member have been moved to the preform receiving position.

According to the other aspect of the present invention, a blow molding apparatus or a blow molding section in an injection stretch blow molding apparatus comprises:

a circulatory carrier having a carrying path of substantially rectangular configuration that has first to fifth sides and a plurality of carrier members that are circulatorily moved on said carrying path;

a receiving section disposed on the first side of said circulatory carrier for receiving preforms which are transfered from the transfer station and for causing the received preform to be supported on the corresponding carrier member;

a heating section disposed on the second side of said circulatory carrier for heating the preform while being placed on the carrier member;

a blow molding section disposed on the third side of said circulatory carrier for blow molding the heated preform into a container; and an outlet section disposed on the fourth side of said circulatory carrier for externally discharging the blow molded container.

Since the receiving, heating, blow molding and outlet sections are disposed on the respective sides of the circulatory carrier forming the substantially rectangular, carrying path in the direction of article conveyance, all the sides of the carrying path can effectively be utilized to perform a cycle of molding. In addition, the inside area of the circulatory carrier can effectively be used as a space wherein the clamping mechanism of the blow molding apparatus is moved for clamping. As a result, the effective space can be further saved, resulting in provision of a compact system.

9

Figure 1:
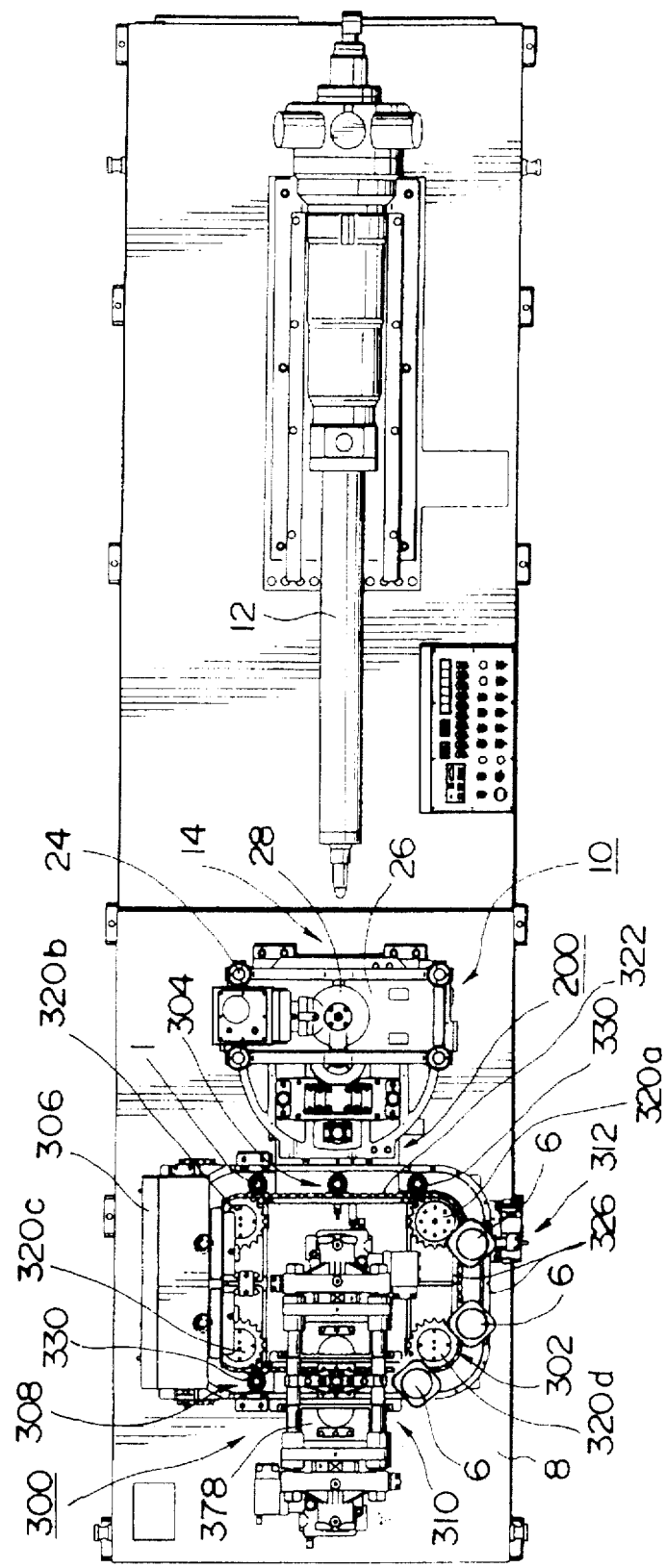
FIG. 1 is a plan view of a preferred embodiment of the invention.
Figure 12:
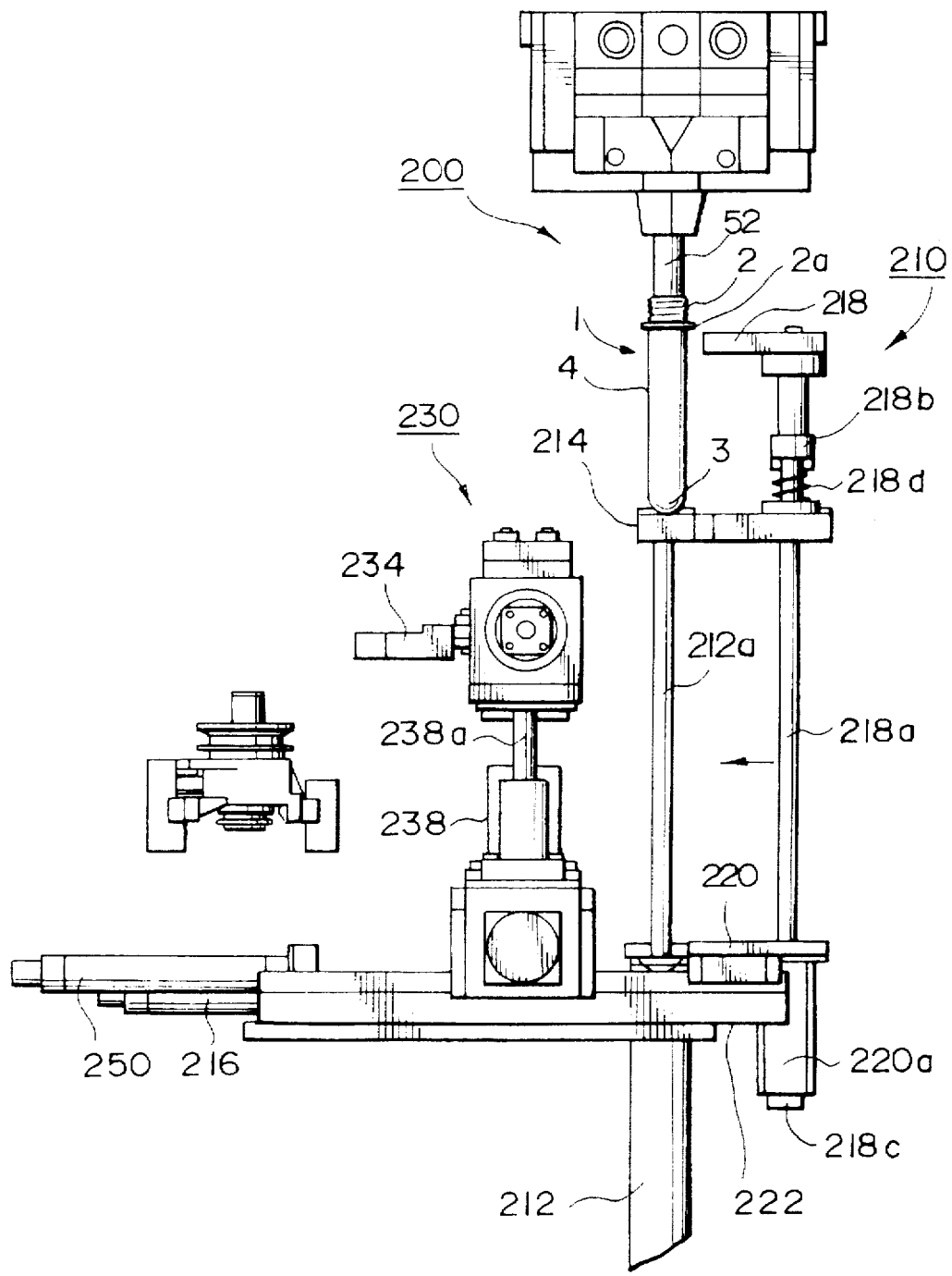
Figure 13:
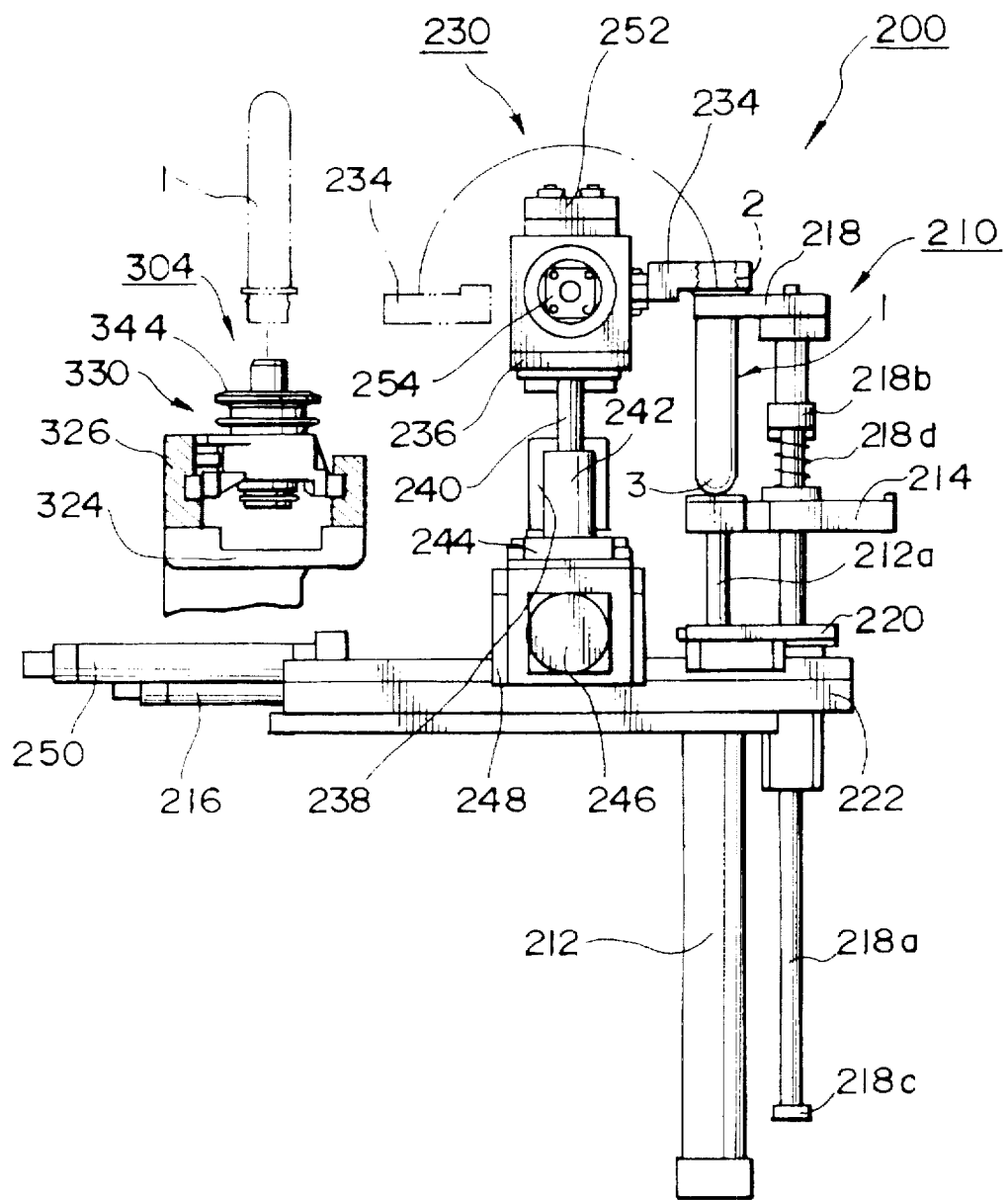
Figure 14:
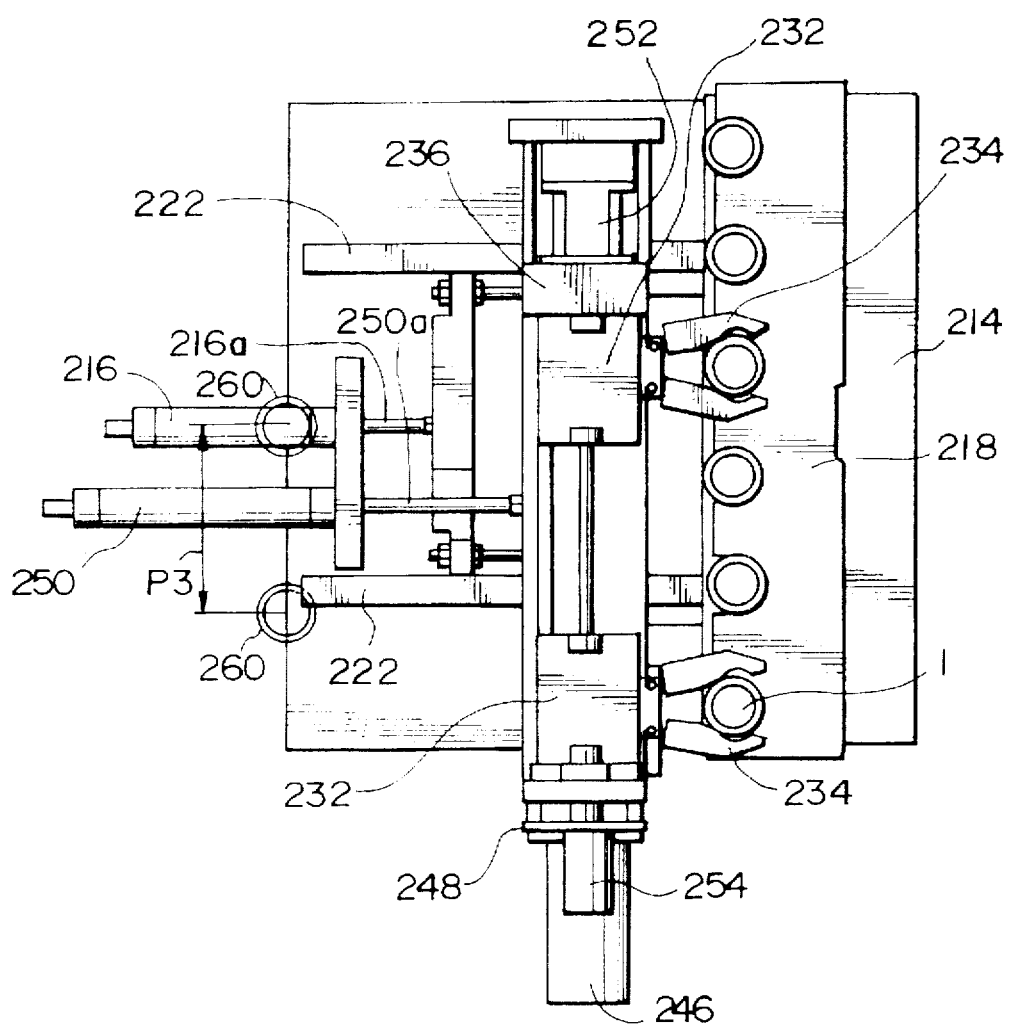
Figure 15:
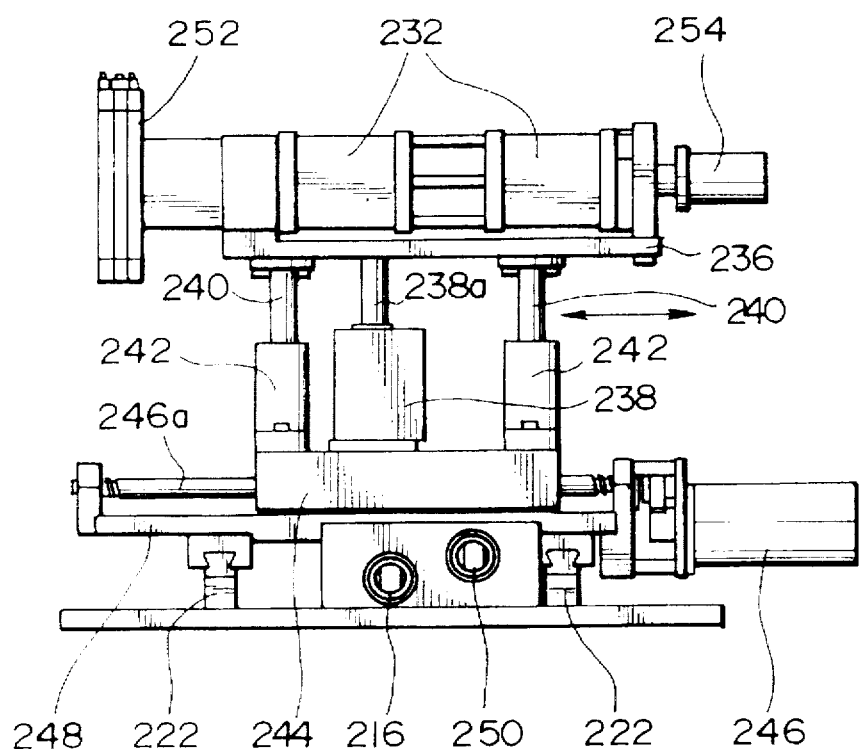
Figure 16:
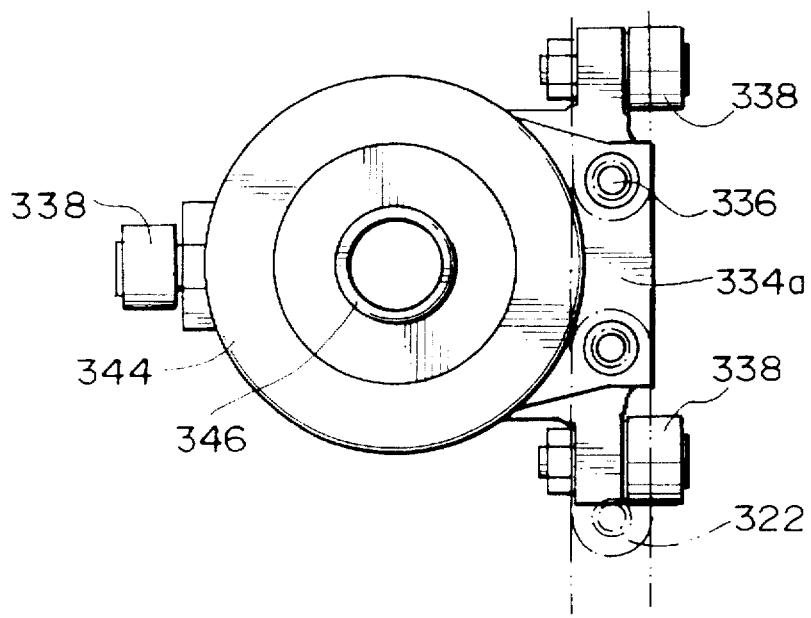
Figure 17:
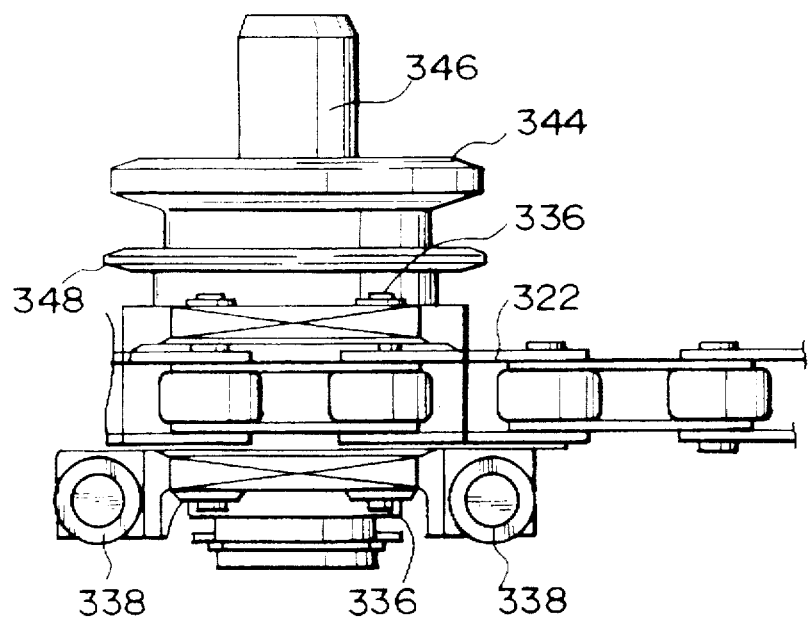
Figure 18:
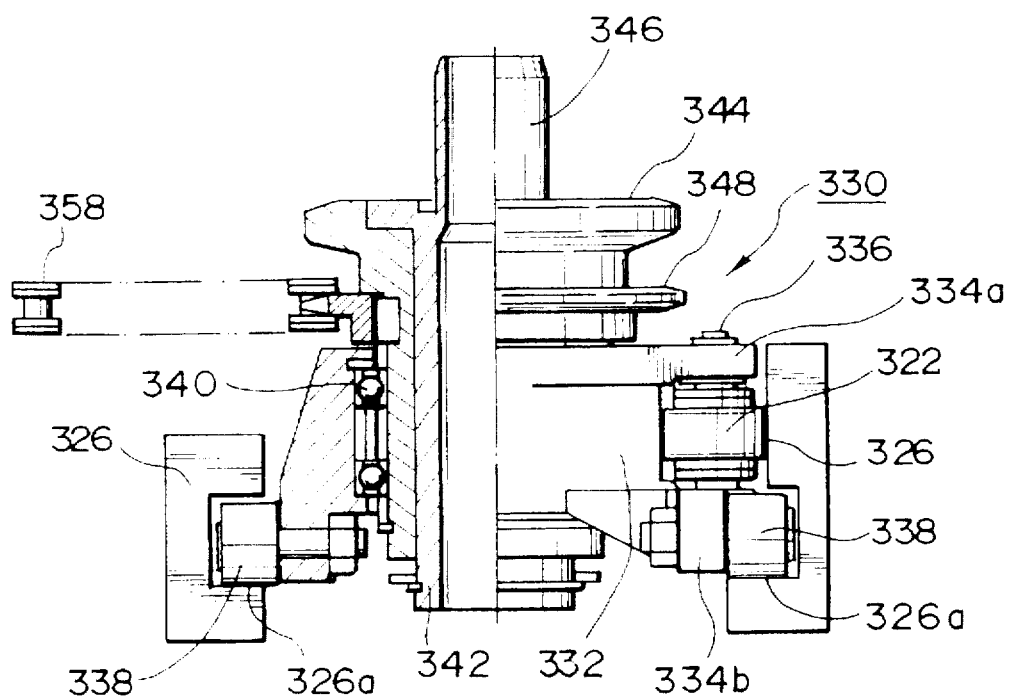
Figure 19:
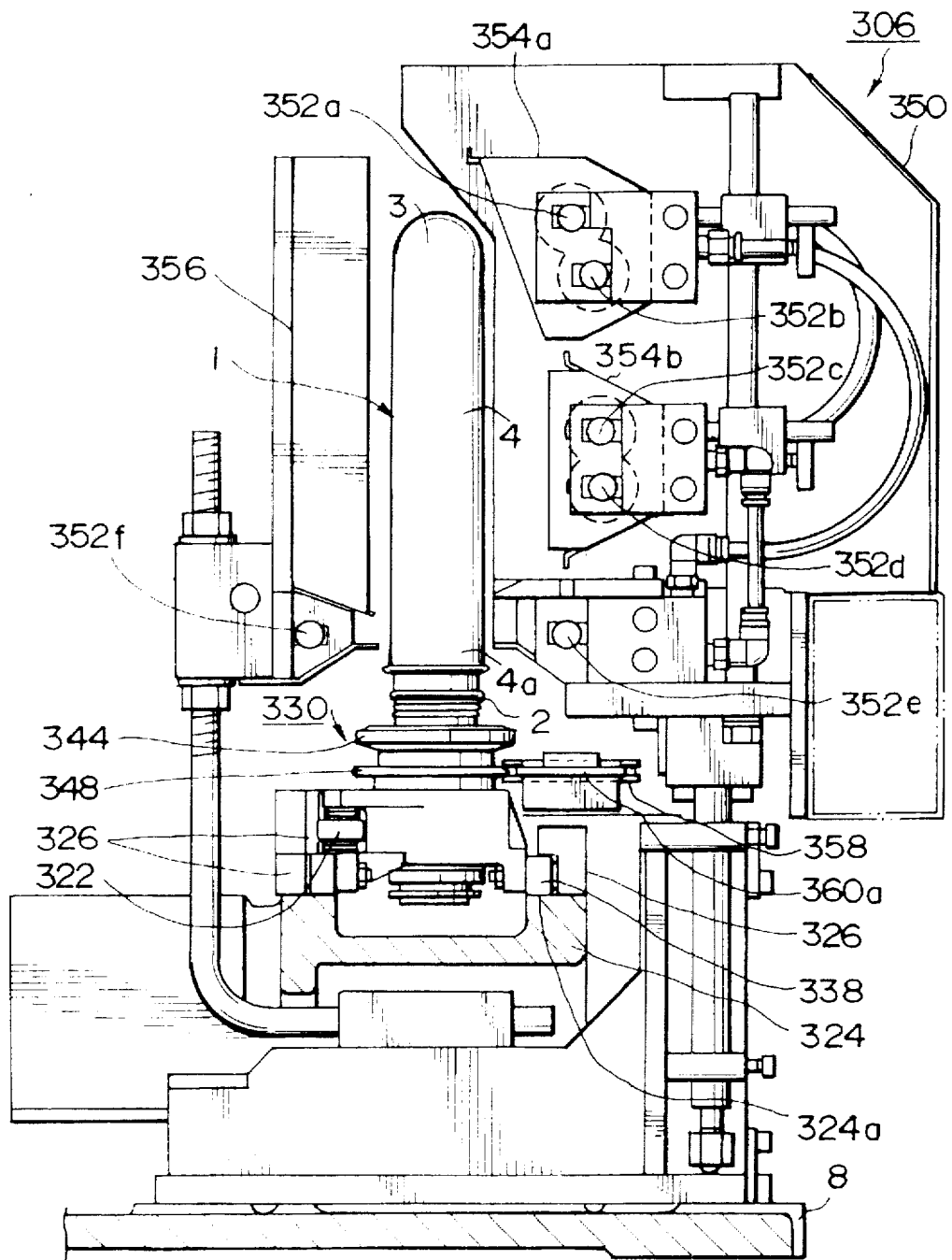
Figure 20:
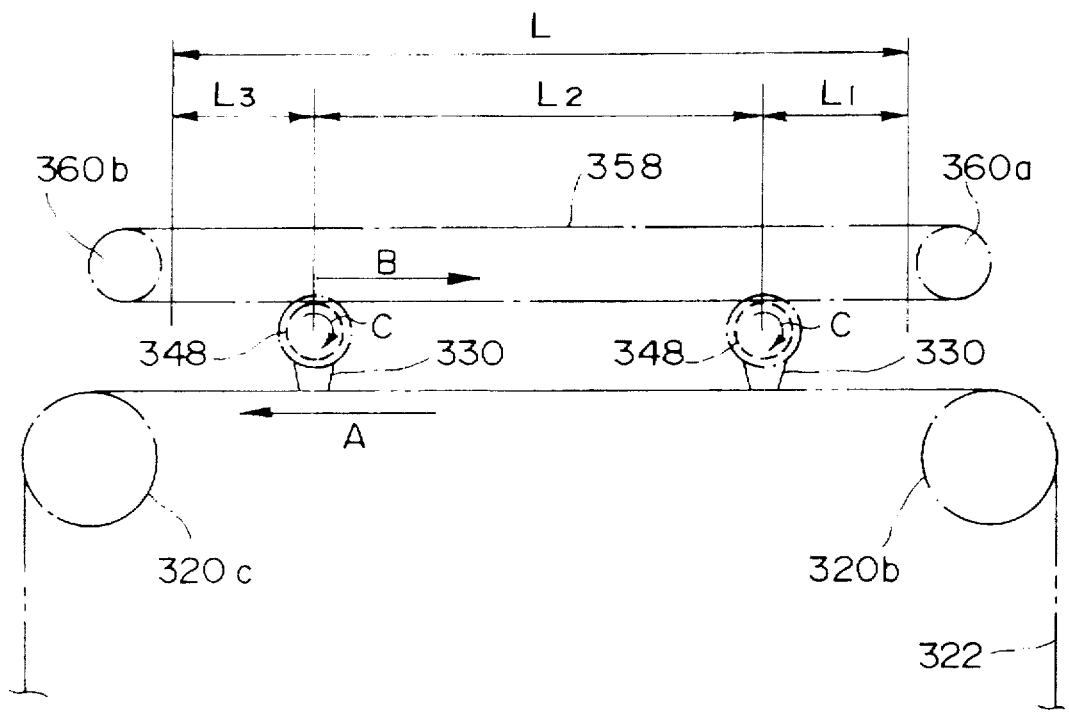
Figure 21:
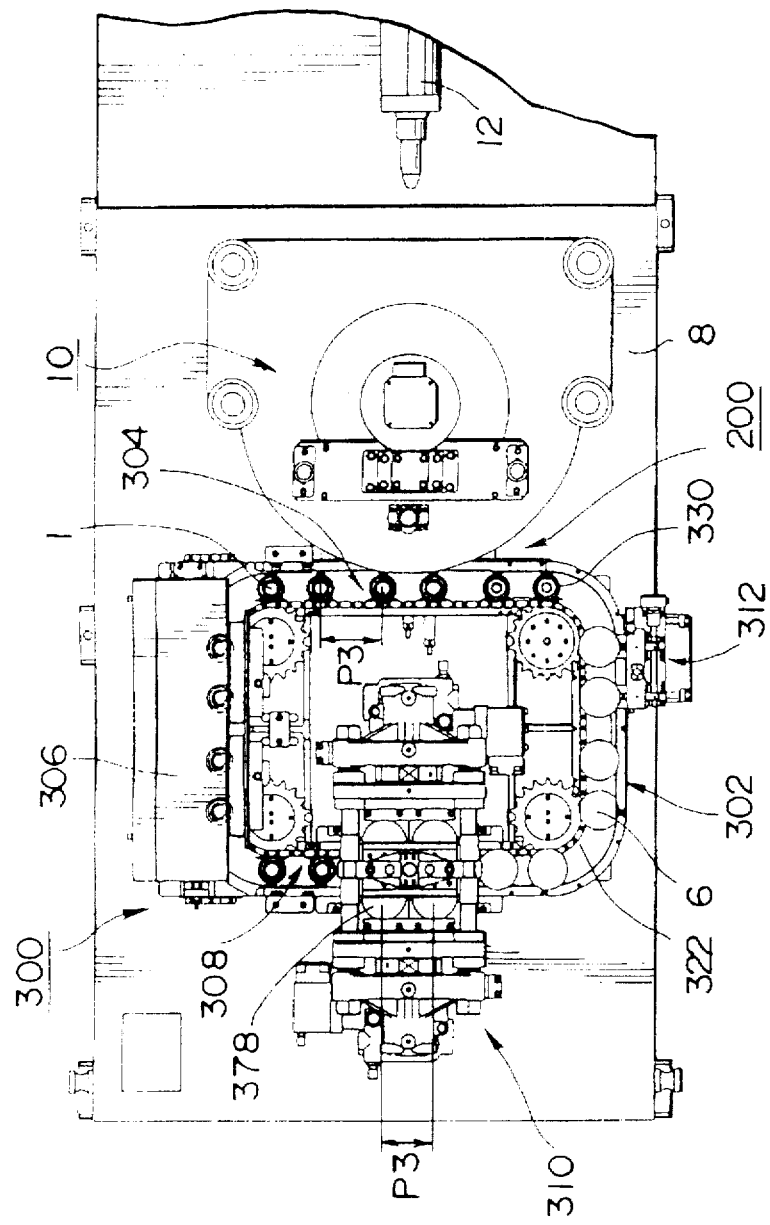
Figure 22:
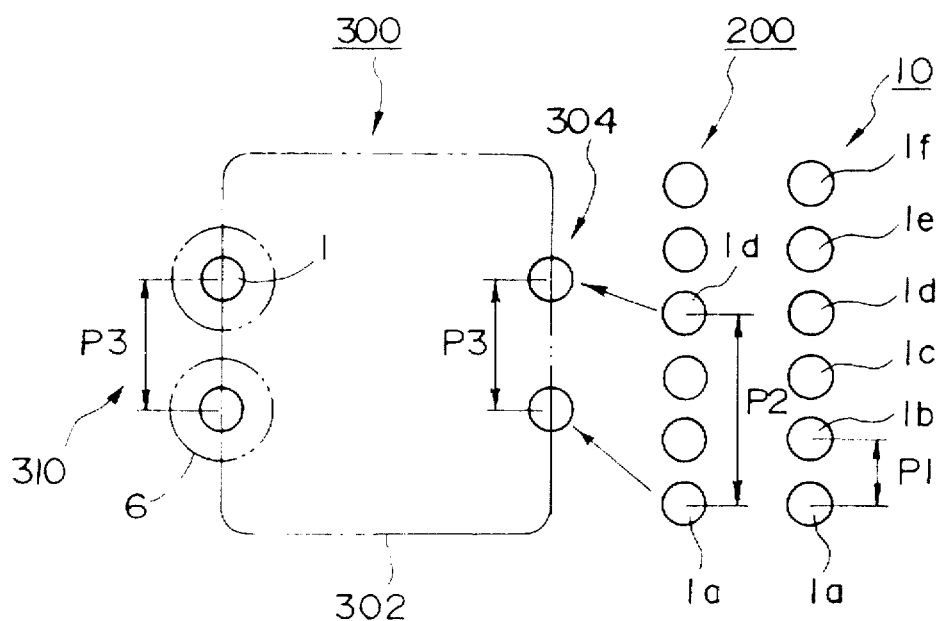
Figure 23:
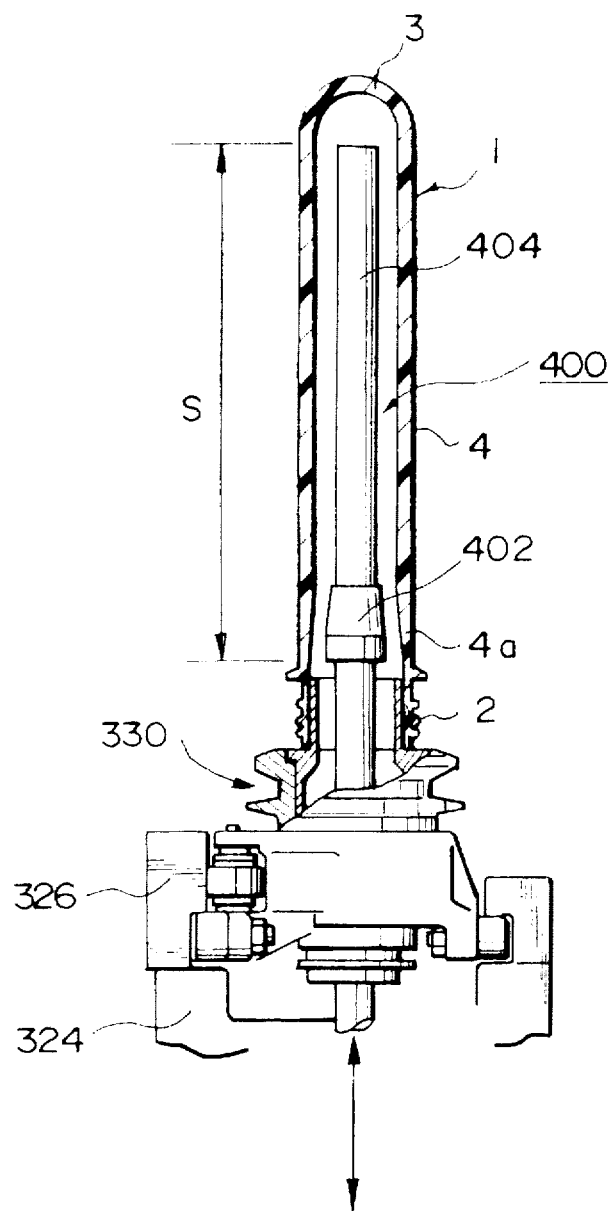
Figure 24:
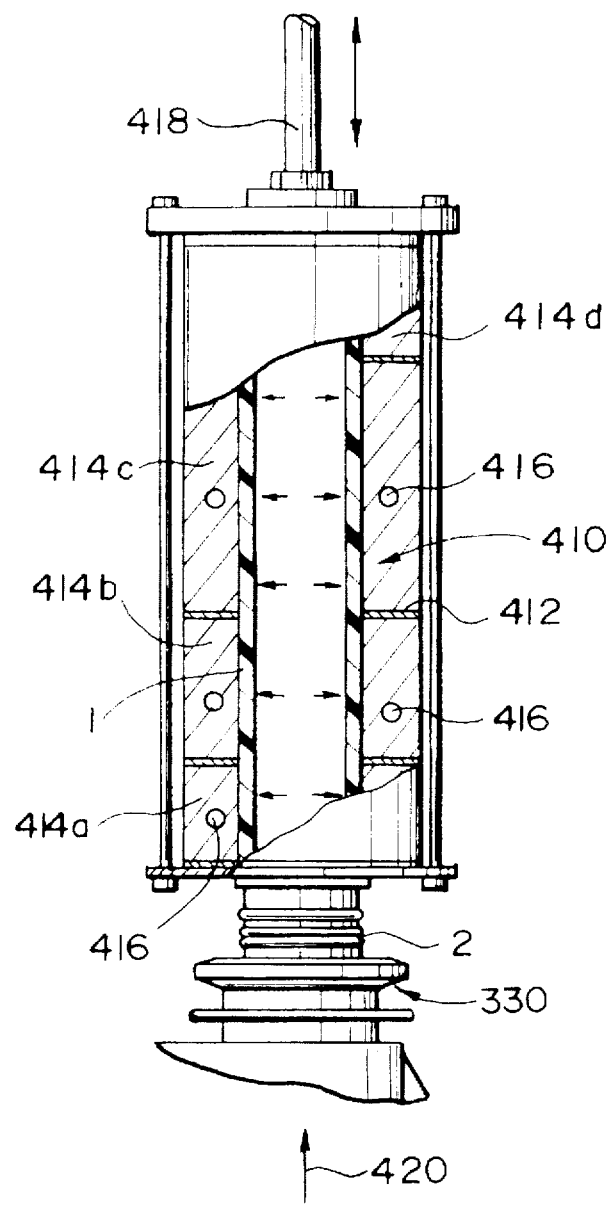
Figure 25:
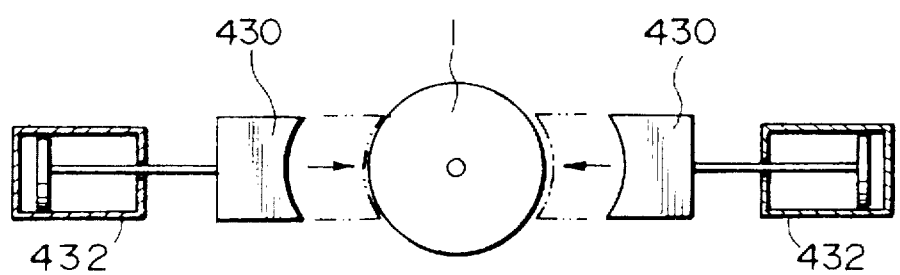
Figure 26:
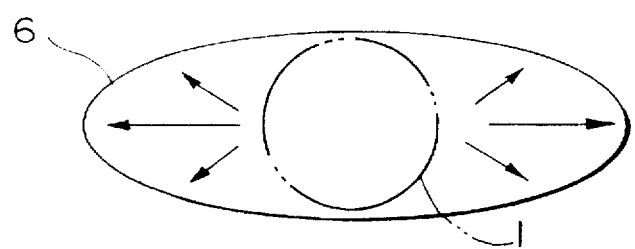

FIG. 12 is a view illustrating the operation of a transfer station receiving a preform;

FIG. 13 is a view illustrating the operation of a transfer station handing a preform over to a blow molding station;

FIG. 14 is a plan view of the transfer station;

FIG. 15 is a side view of the transfer station;

FIG. 16 is a plan view of a carrier member of a second circulatory carrier provided in the blow molding station;

FIG. 17 is a side view of the carrier member shown in FIG. 16;

FIG. 18 is a partially cut-away front view of the carrier member shown in FIG. 16;

FIG. 19 is a side view in the preform carrying direction of a heating section;

FIG. 20 is a plan view showing in outline a rotating carrier mechanism of the heating section;

FIG. 21 is a plan view showing another preferred embodiment apparatus of the invention wherein the numbers of preforms molded simultaneously are different from those of the apparatus of FIG. 1;

FIG. 22 is a view illustrating the operation of a transfer station transferring preforms while converting their pitch;

FIG. 23 is a sectional view of a temperature adjusting core disposed in a standby section;

FIG. 24 is a sectional view of a temperature adjusting pot disposed in the standby section;

FIG. 25 is a sectional view of local temperature adjusting members disposed in the standby section; and FIG. 26 is a view of a flat container blow molded after the temperature adjusting shown in FIG. 25.

Figure 27:
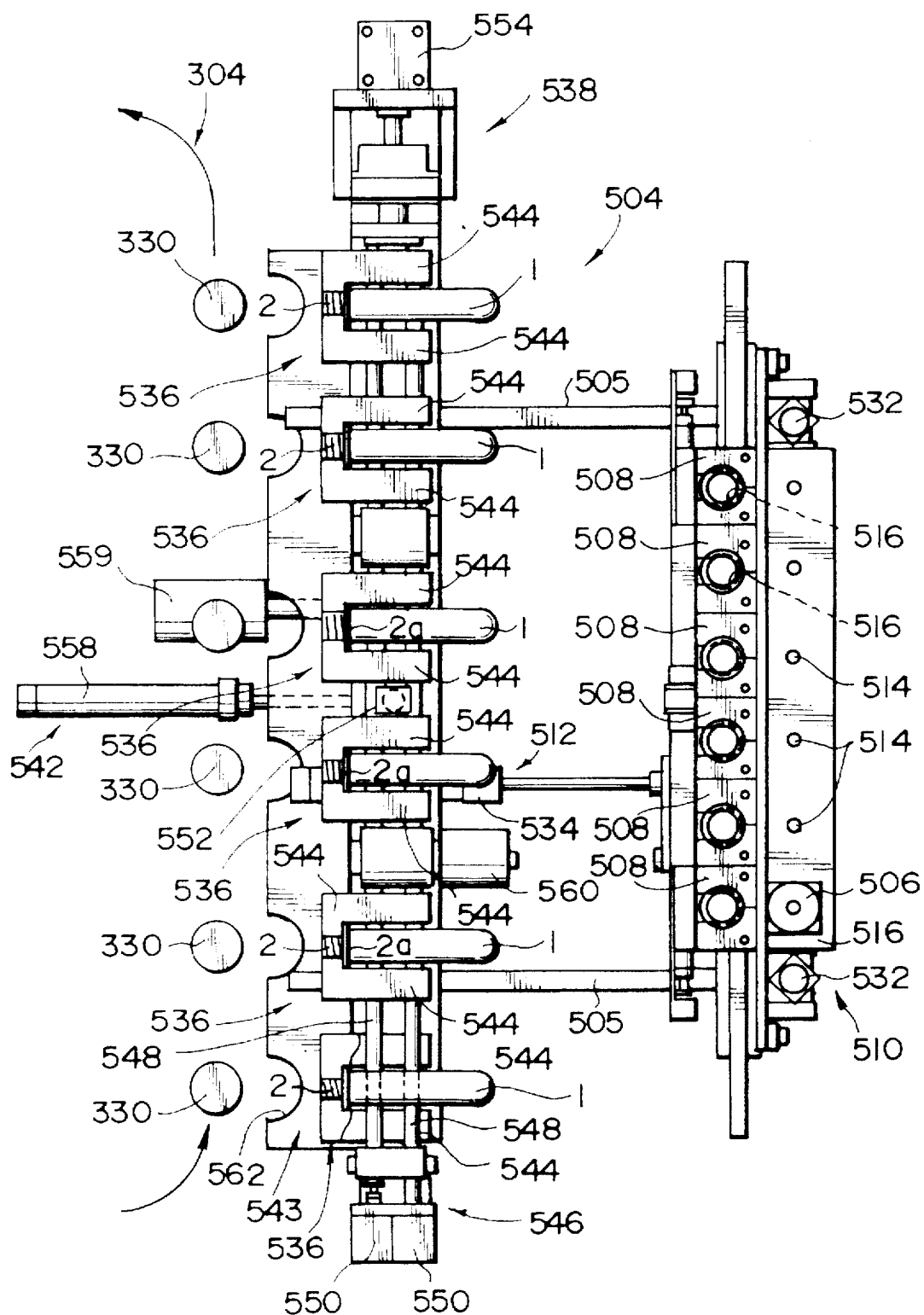

FIG. 27 is a plan view showing a transfer station in a further embodiment of an injection stretch blow molding apparatus constructed in accordance with the present invention.

Figure 28:
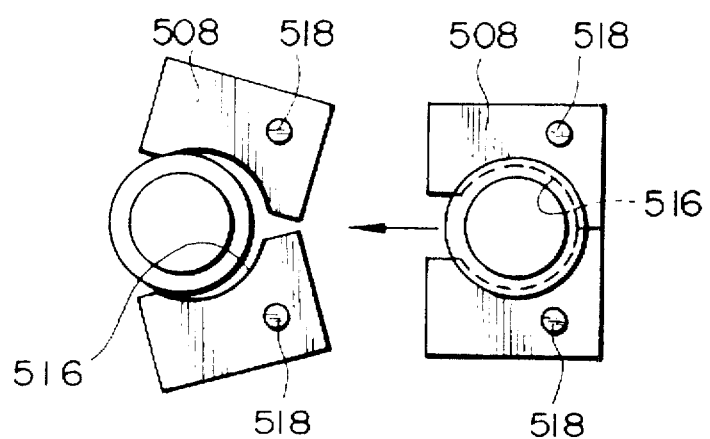

FIG. 28 is a plan view illustrating the open/close operation of an open/close mechanism in one of the holding members shown in FIG. 27.

Figure 29:
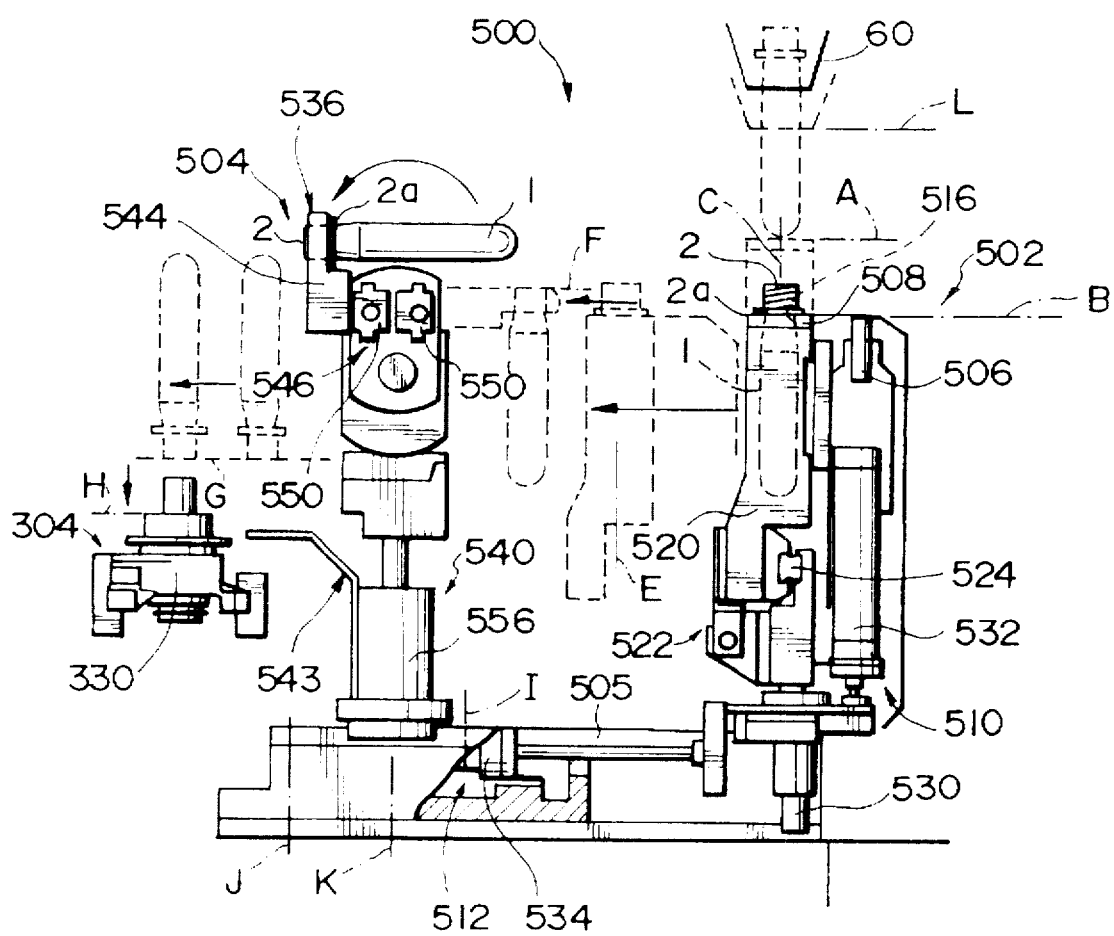

FIG. 29 is a side view showing the transfer station of FIG. 27 which is inverting a preform.

Figure 30:
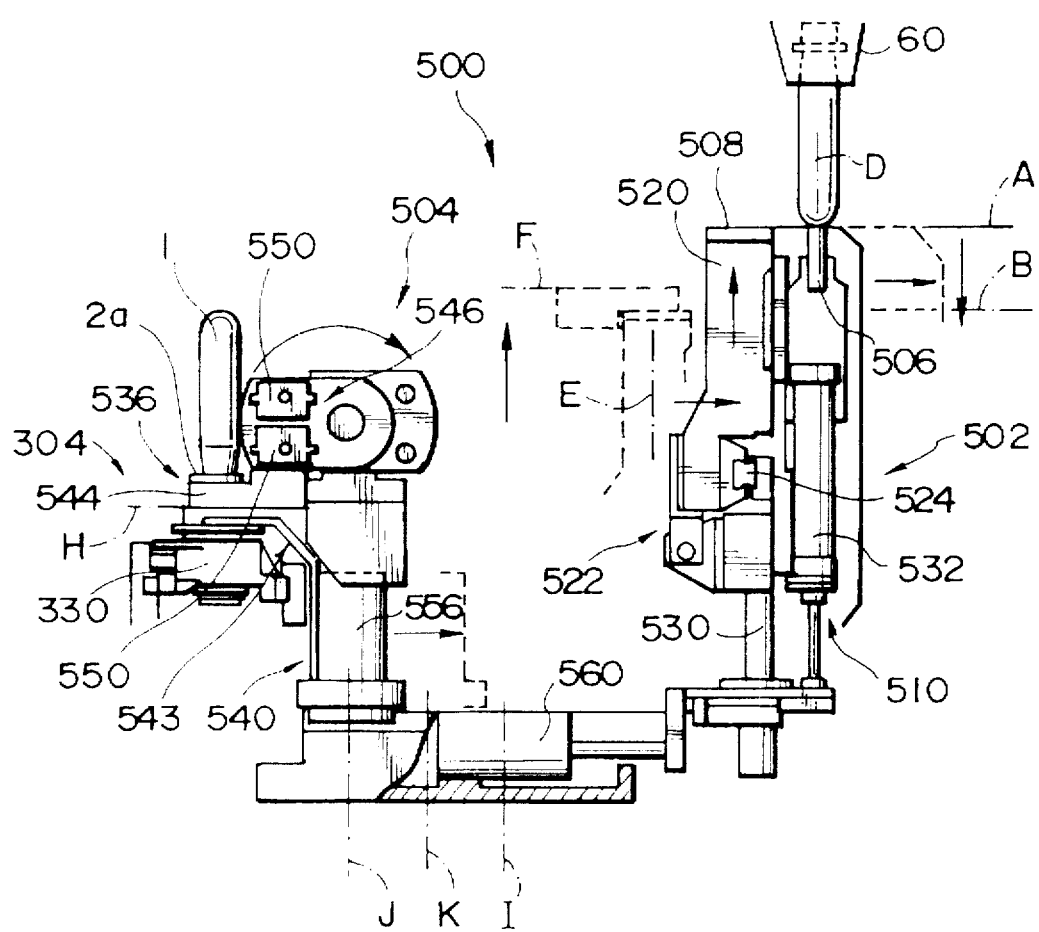

FIG. 30 is a side view illustrating a state that the preform is completely inverted from its position of FIG. 29 and then delivered to the carrier member.

Figure 31:
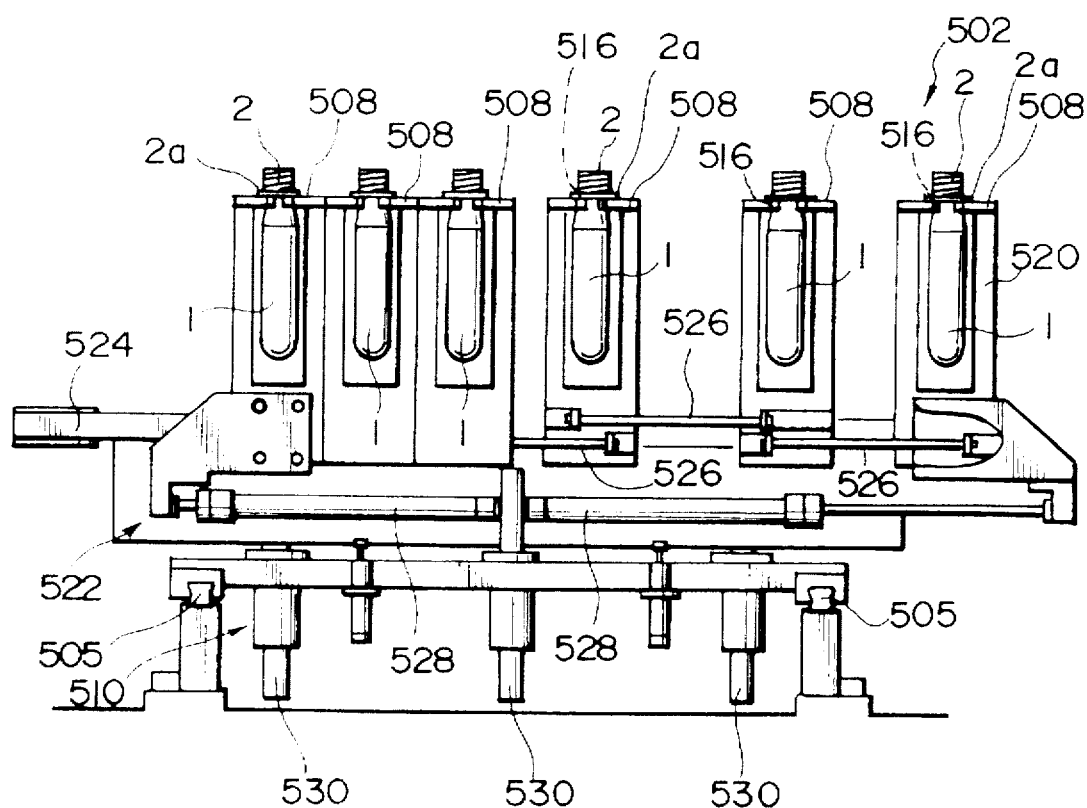

FIG. 31 is a front view of the receiving and lowering mechanism of FIG. 27.

Figure 32:
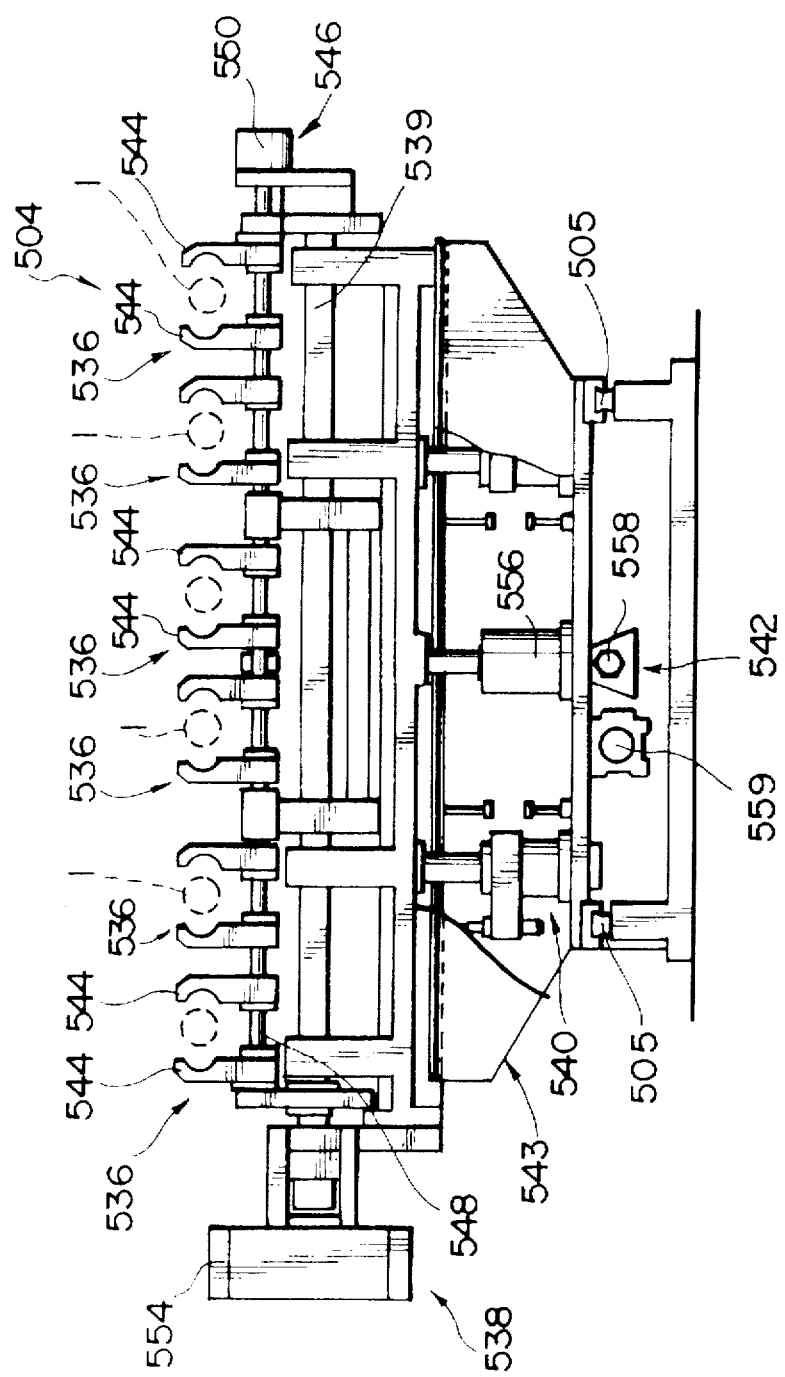

FIG. 32 is a front view of the inverting and handing over mechanism of FIG. 27.

Figure 33:
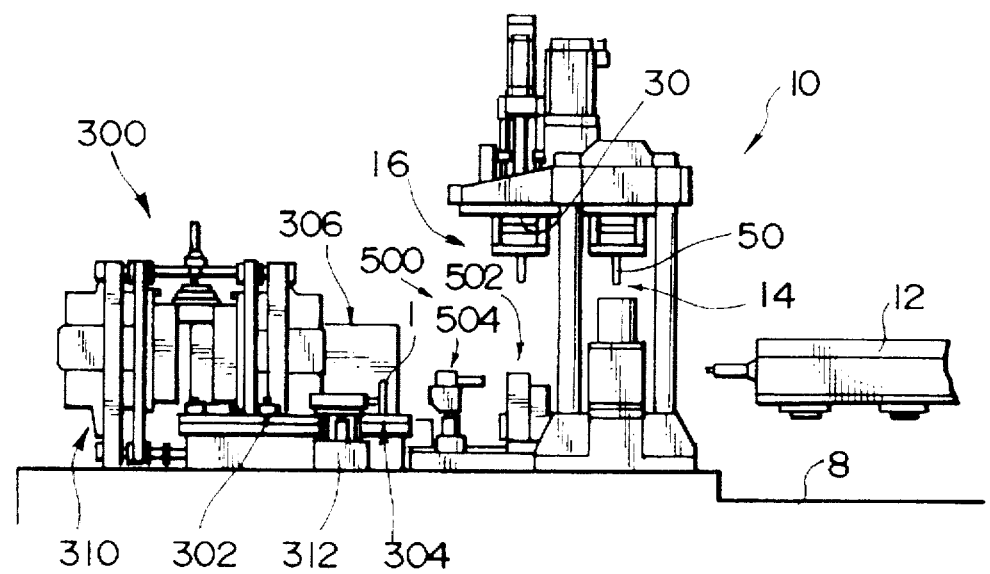

FIG. 33 is a side view of the injection stretch blow molding apparatus according to the present embodiment.

Figure 34:
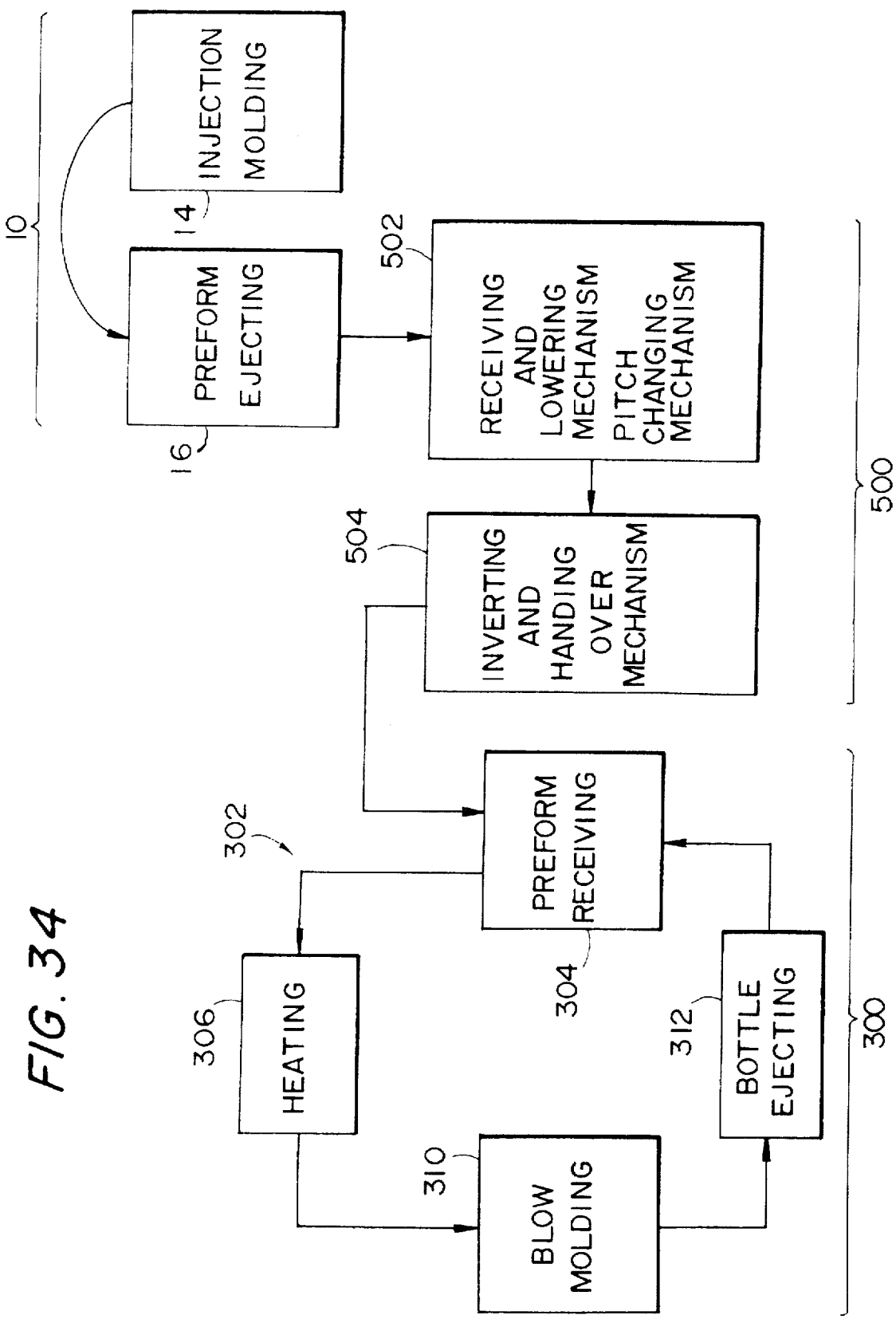

FIG. 34 is a layout diagram of various sections in the injection stretch blow molding apparatus according to the present embodiment.

Figure 35:
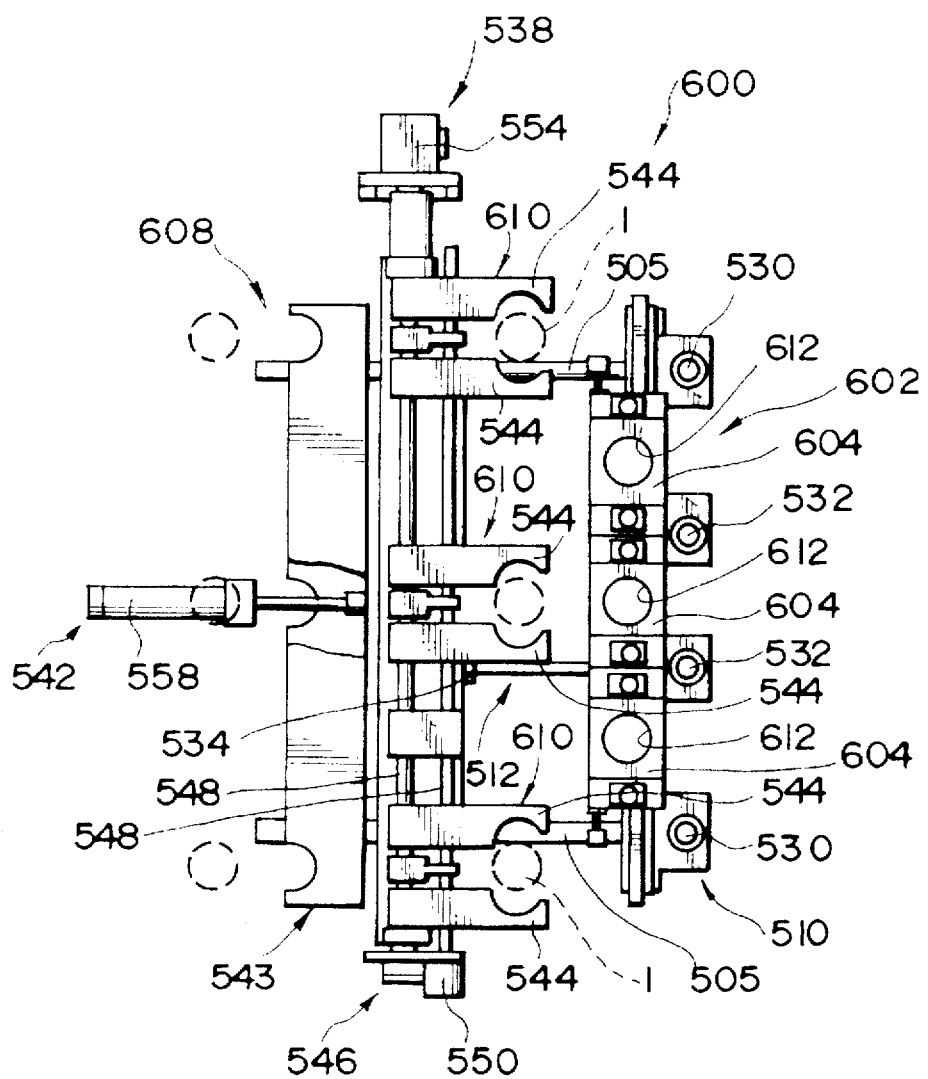

FIG. 35 is a plan view showing a transfer station in an injection stretch blow molding apparatus constructed in accordance with a still further embodiment of the present invention.

Figure 36:
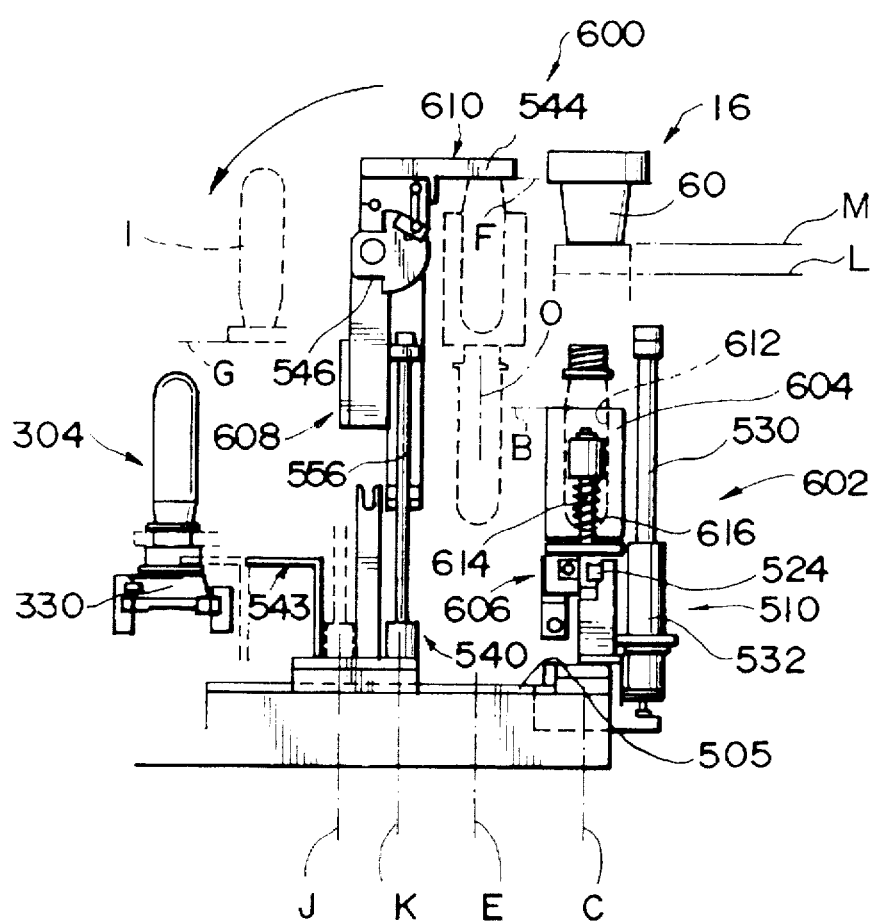

FIG. 36 is a side view of the transfer station shown in FIG. 35.

Figure 37:
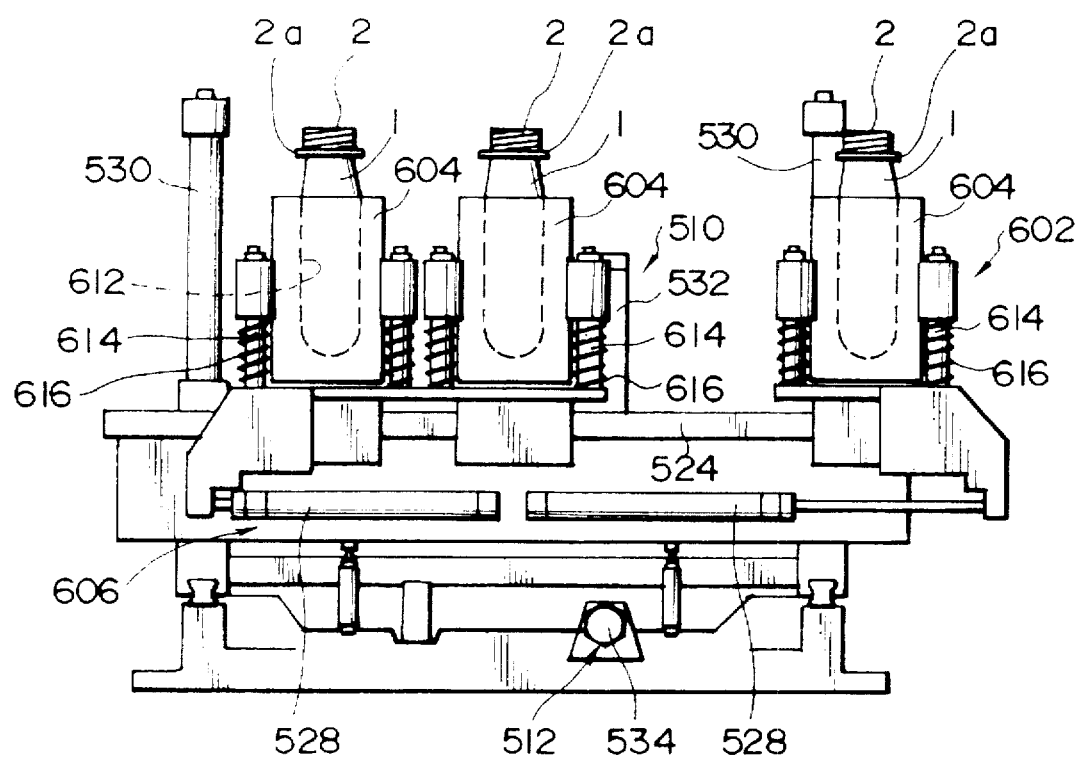

FIG. 37 is a front view of the receiving and lowering mechanism in the transfer station of FIG. 35.

Figure 38:
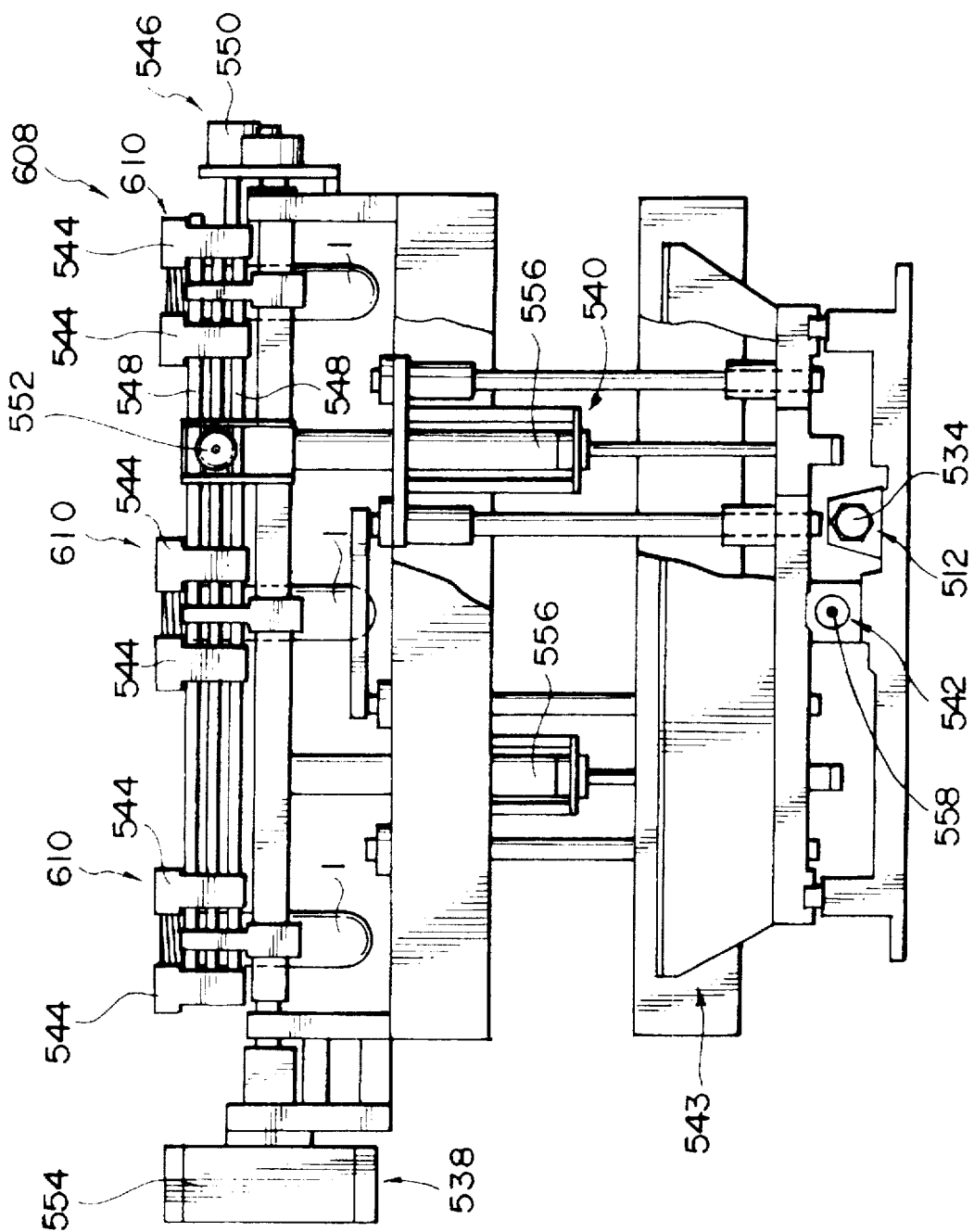

FIG. 38 is a front view of the inverting and handing over mechanism in the transfer station of FIG. 35.

DETAILED DESCRIPTION OF THE PREFERRED EMBODIMENTS

A preferred embodiment wherein the method and apparatus of the invention are applied will be described below with reference to the accompanying drawings.

10

One embodiment of the present invention is shown in FIGS. 1 through 26.

FIGS. 1 through 26 show an injection stretch blow molding apparatus which is one embodiment of the present invention.

Overall Constitution of the Apparatus

Figure 2:
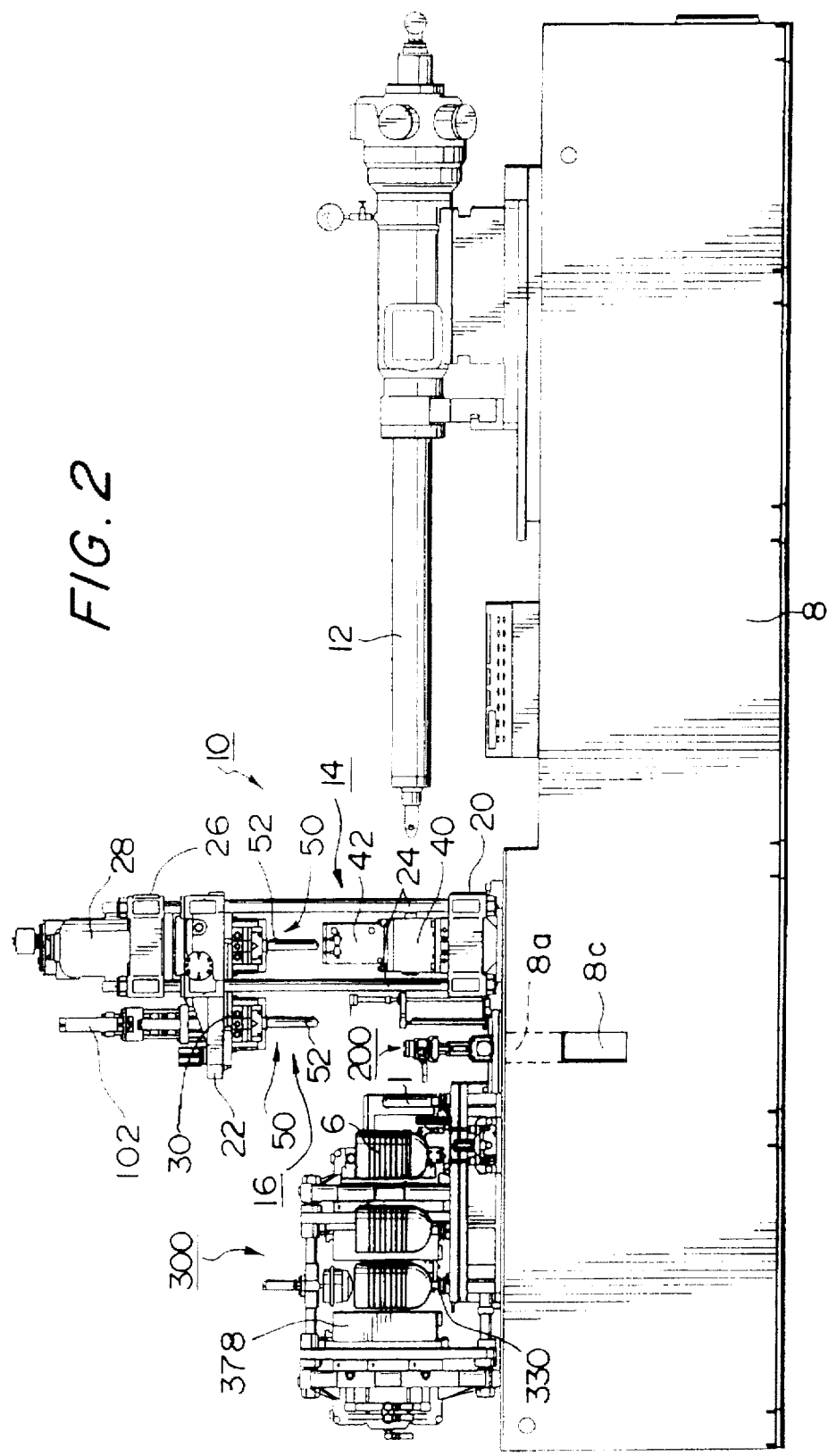
FIG. 2 is a front view of the preferred embodiment apparatus shown in FIG. 1.
Figure 3:
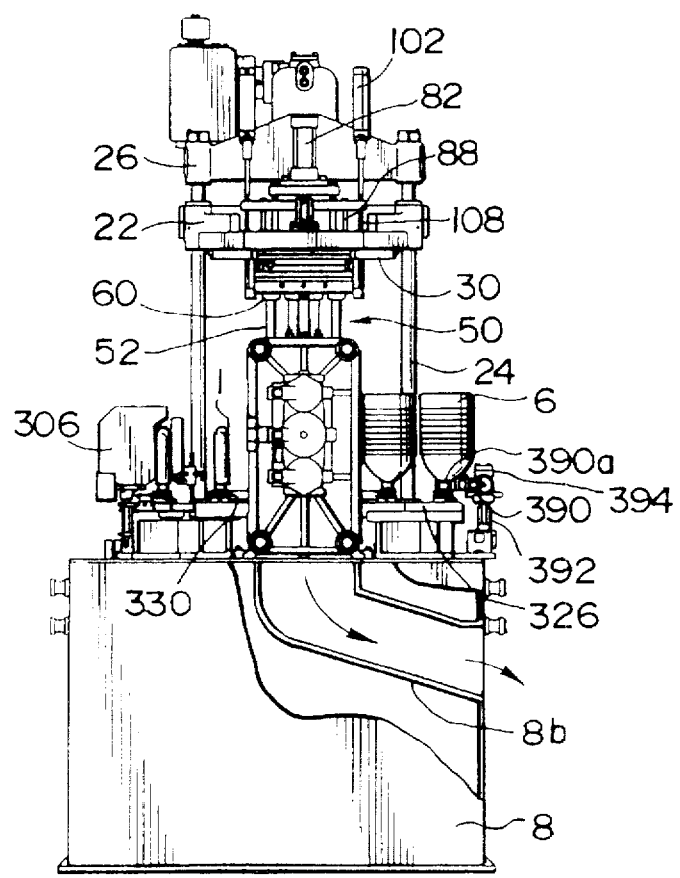
FIG. 3 is a left side view of the preferred embodiment apparatus shown in FIG. 1.
Figure 4:
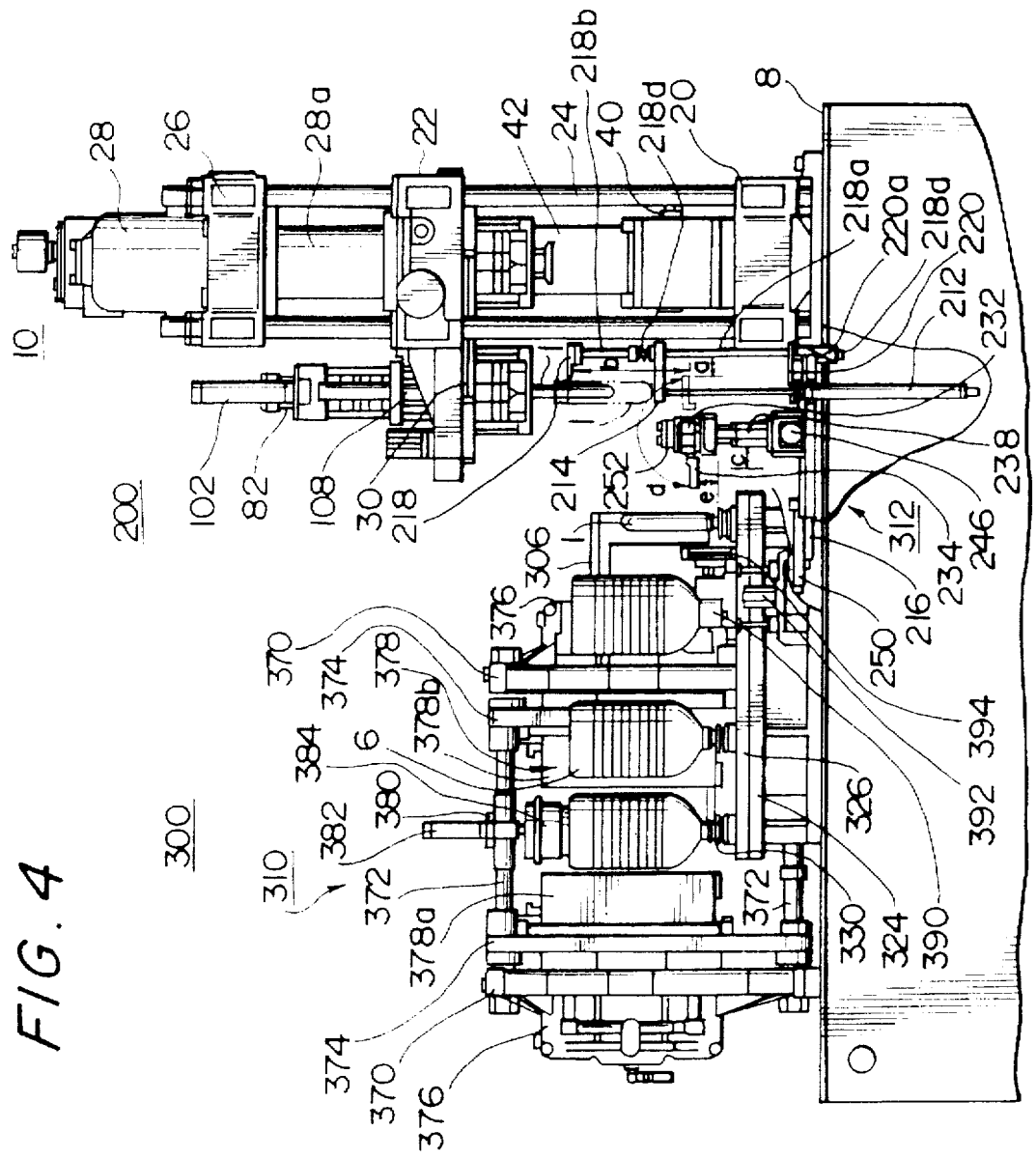
FIG. 4 is an enlarged view of the main parts of the apparatus shown in FIG. 1.

FIG. 1. FIG. 2 and FIG. 3 respectively are a plan view, a front view and a left side view of the apparatus of this preferred embodiment, and FIG. 4 is an enlarged view showing the main parts of the apparatus of the preferred embodiment. As shown in the drawings, the apparatus comprises a preform molding station 10, a transfer station 200 and a blow molding station 300 disposed on a machine bed 8.

As shown in FIG. 2, the preform molding station 10 has a rotary disc 30 which has an injection core mold 50 in each of two locations an angle of rotation 180° apart and is a first circulatory carrier which circulatorily carries the injection core molds 50 intermittently along a rotary carrying path. An injection molding section 14 facing an injecting apparatus 12 and a preform ejecting section 16 facing this injection molding section 14 are respectively provided at the stopping positions of the injection core molds 50. The injection molding section 14 has an injection cavity mold 42 to which an injection core mold 50 can be clamped, and with this injection cavity mold 42 the injection molding section 14 simultaneously injection molds N (N≧2), for example N=4, preforms 1 at a time. In the preform ejecting section 16, the injection core mold 50 is released from the preforms 1. In this preferred embodiment, a neck portion of each preform 1 is molded by means of a neck cavity mold 60 which will be further discussed later. and the preforms 1 are held by this neck cavity mold 60 and the injection core mold 50 and carried by the rotary disc 30 to the preform ejecting section 16. In the preform ejecting section 16 the preforms 1 are ejected by being released from the neck cavity mold 60 after a partial release of the injection core mold 50.

As shown in FIG. 1, the blow molding station 300 has a second circulatory carrier 302 comprising four sprockets 320a to 320d and a carrier chain 322 running around these sprockets. A plurality of for example ten carrier members 330 are fixed to this carrier chain 322 uniformly spaced apart, and a preform 1 or a bottle 6 is supported by each carrier member 330. In the carrying path of the carrier members 330 are provided a preform receiving section 304 which receives the preforms 1 from the transfer station 200, a heating section 306 which heats the preforms 1, a standby section 308 which causes the heated preforms 1 to temporarily standby, a blow molding section 310 which blow molds the preforms 1 into bottles 6, and a bottle ejecting section 312 which ejects the bottles 6 to outside the apparatus.

The blow molding section 310 has a blow mold 378 which is clamped around the preforms 1 and blow molds one bottle 6 from each of n (1≦n<N) preforms 1, for example n=1 preform 1.

The transfer station 200 transfers the preforms 1 ejected from the preform ejecting section 16 of the preform molding station 10 to the preform receiving section 304 of the blow molding station 300. In the preform ejecting section 16 of the preform molding station 10 N preforms 1, i.e. the number of preforms 1 simultaneously molded in the injection molding section 14, are ejected at a time, but in the transfer station 200 n preforms 1, i.e. the number of preforms 1 simultaneously molded in the blow molding section 310 of the blow molding station 300, are transferred at a time. In the apparatus of this preferred embodiment, four preforms 1 simultaneously ejected by the preform ejecting section 16 are transferred one at a time to the preform receiving section 304. Also, whereas in the preform molding station 10 the preforms 1 are injection molded in an upright state, in the transfer station 200 the preforms 1 are turned upside-down and transferred to the blow molding station 300 in an inverted state.

Preform Molding Station 10

First the preform molding station 10 will be described, with reference to FIG. 1 to FIG. 11.

Injection Molding Section 14 and First Circulatory Carrier 30

As shown in FIG. 2 and FIG. 4, the injection molding section 14 of the preform molding station 10 is provided with a lower clamping plate 20 mounted on the machine bed 8. A for example circular upper clamping plate 22 is disposed above this lower mold clamping plate 20 and extends from the injection molding section 14 into the preform ejecting section 16. This upper mold clamping plate 22 is movable vertically along four tie bars 24 provided in four locations around the injection molding section 14. As shown in FIG. 1, FIG. 2 and FIG. 4, a fixed plate 26 is mounted on the upper ends of the tie bars 24 and a clamping cylinder 28 is mounted on this fixed plate 26. The clamping cylinder 28 drives a clamping rod 28a (see FIG. 4), and the upper clamping plate 22 is driven up and down by this clamping rod 28a.

Figure 5:
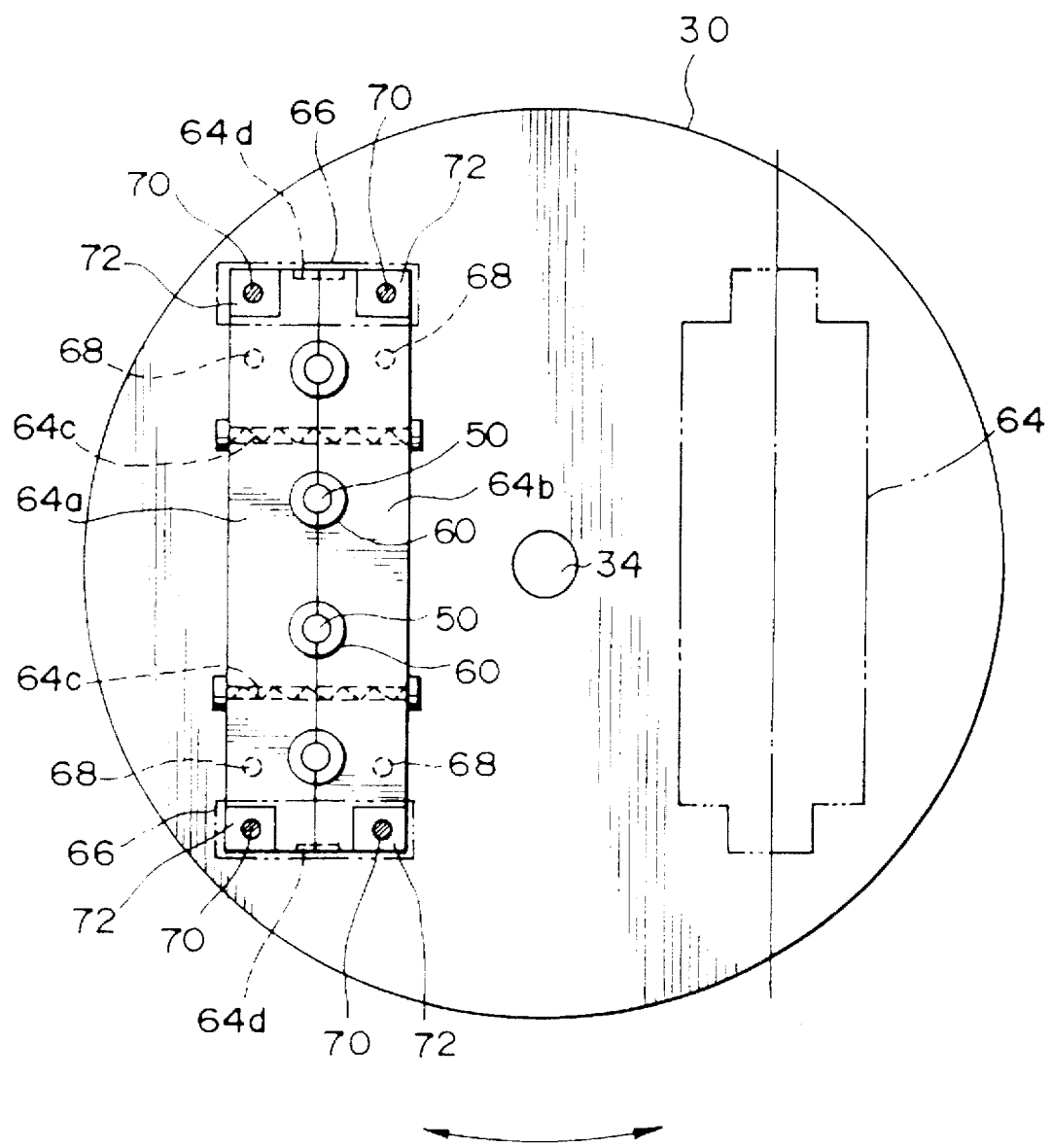
FIG. 5 is an underside view of a rotary disc.
Figure 7:
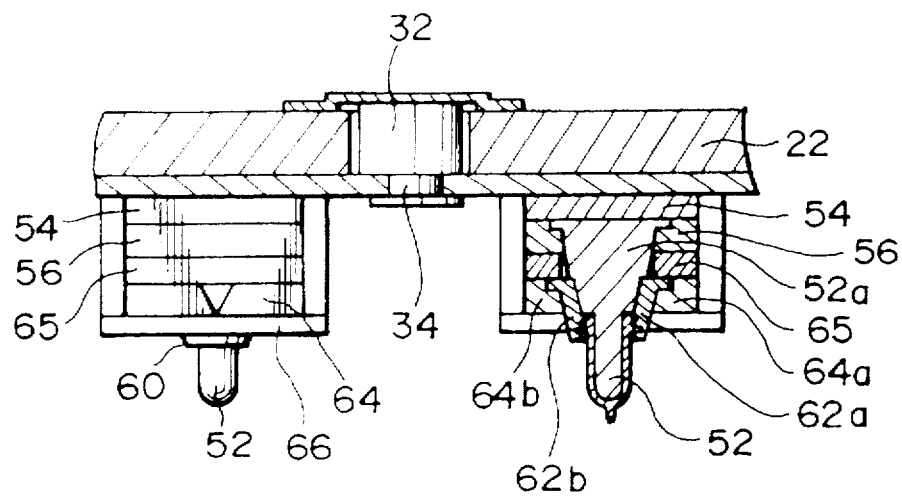
FIG. 7 is a partially sectional view showing the injection core mold and a neck cavity mold mounted on the rotary disc.

As shown in FIG. 2 to FIG. 4, the rotary disc 30 constituting the first circulatory carrier is rotatably mounted at the underside of the upper clamping plate 22. As shown in FIG. 7, this rotary disc 30 is fixed to a rotational shaft 34 rotationally driven by a rotary actuator 32 fixed to the upper clamping plate 22. As shown in FIG. 5, which is an underside view of the rotary disc 30, the two injection core molds 50 and the two neck cavity molds 60 are mounted on the rotary disc 30 in positions corresponding to the injection molding section 14 and the preform ejecting section 16. The details of the injection core molds 50 and the neck cavity molds 60 will be discussed in detail later.

As shown in FIG. 2 and FIG. 4, the injection molding section 14 is provided with a hot runner mold 40 with which a nozzle of the injecting apparatus 12 nozzle-touches, and the injection cavity mold 42 is mounted on this hot runner mold 40. This injection cavity mold 42 has a cavity for each of the N preforms 1 simultaneously molded in the injection molding section 14, for example four cavities. This injection cavity mold 42 is capable of cooling the injection molded preforms, and a coolant, for example water at room temperature, is circulated therethrough.

As shown in FIG. 4 to FIG. 8, the two injection core molds 50 mounted on the rotary disc 30 each have the same number of core pins 52 as the number N of preforms simultaneously molded, for example four core pins 52. As shown in FIG. 7, the base portions 52a of these core pins 52 are supported by a core presser plate 54 fixed to the underside of the rotary disc 30 and a core fixing plate 56 fixed to the underside of this core presser plate 54. When the clamping cylinder 28 is driven and the clamping rod 28a drives down the upper clamping plate 22, the core pins 52 of the injection core mold 50 are driven down integrally with the rotary disc 30, the core presser plate 54 and the core fixing plate 56 mounted on this upper clamping plate 22 and are thereby clamped onto the injection cavity mold 42.

Figure 11:
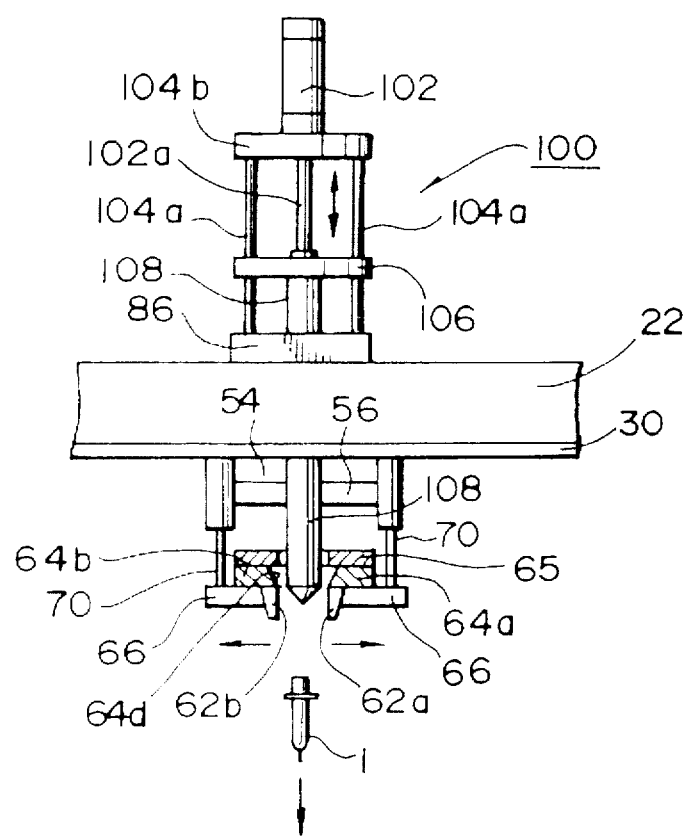
FIG. 11 is a partially sectional view illustrating a preform 1 ejecting operation.

As shown in FIG. 7 and FIG. 11, the two neck cavity molds 60 mounted on the rotary disc 30 are made up of pairs of split molds 62a and 62b, each neck cavity mold 60 comprising the same number of pairs of split molds 62a and 62b as the number N of preforms simultaneously molded, for example four. The pairs of split molds 62a and 62b of each neck cavity mold 60 are fixed by split plates 64a and 64b, and these split plates 64a and 64b constitute a neck fixing plate 64. As shown in FIG. 11, a neck presser plate 65 which pushes this neck fixing plate 64 downward is disposed on the upper surface side of the split plates 64a and 64b. Also, there are provided guide plates 66 which support the undersides of the ends of the neck fixing plate 64. The split plates 64a and 64b are kept normally closed by springs 64c shown in FIG. 5. As shown in FIG. 5, a wedge hole 64d is provided at each end of the split plates 64a and 64b. After the neck fixing plate 64 has been carried into the preform ejecting section 16, the split plates 64a and 64b are opened by being driven apart along the guide plates 66 by split plate opening cams 108, which will be further discussed later, driven into the wedge holes 64d.

Figure 6:
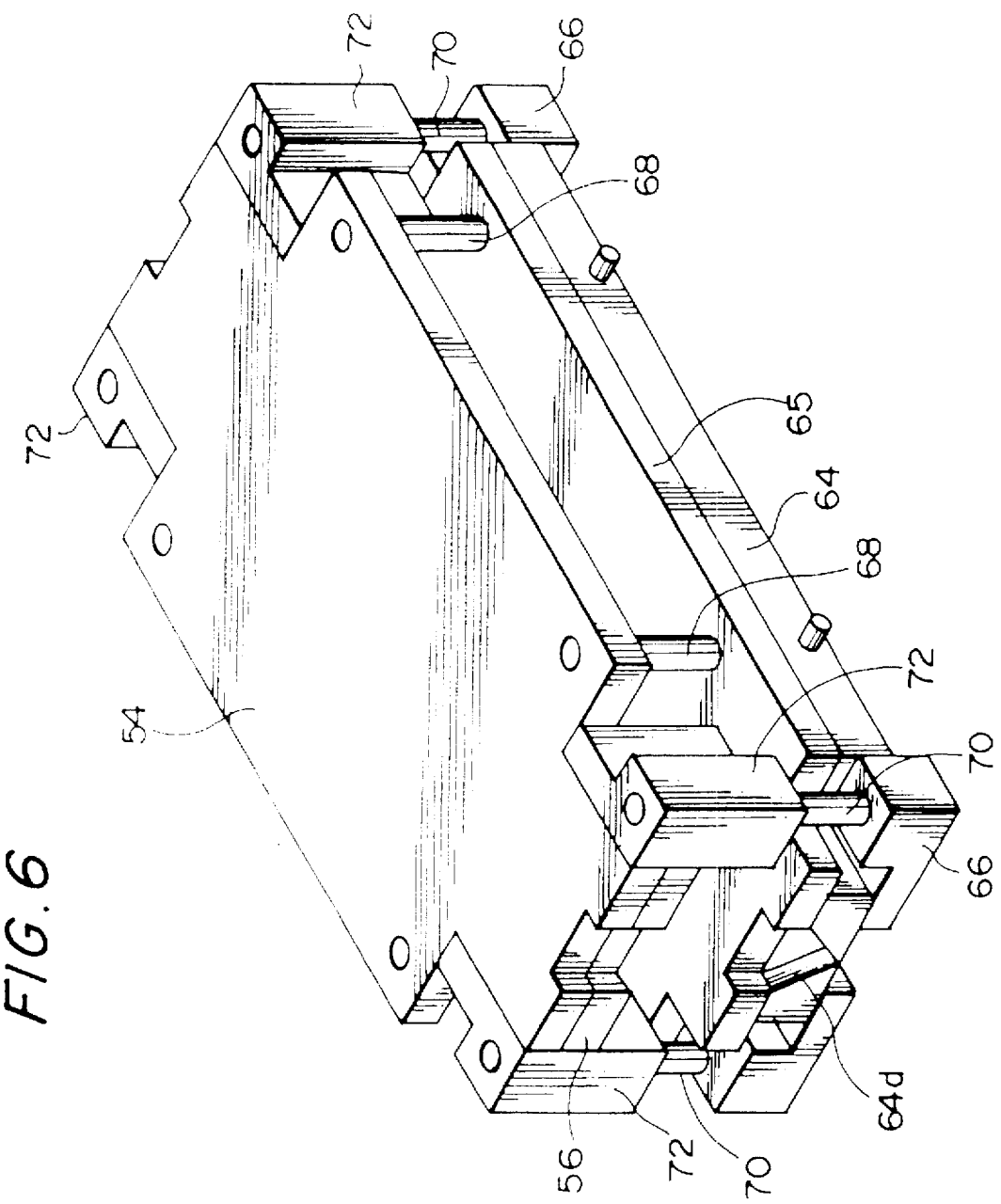
FIG. 6 is a perspective view showing the mold-released state of an injection core mold when a neck presser plate has been lowered.
Figure 8:
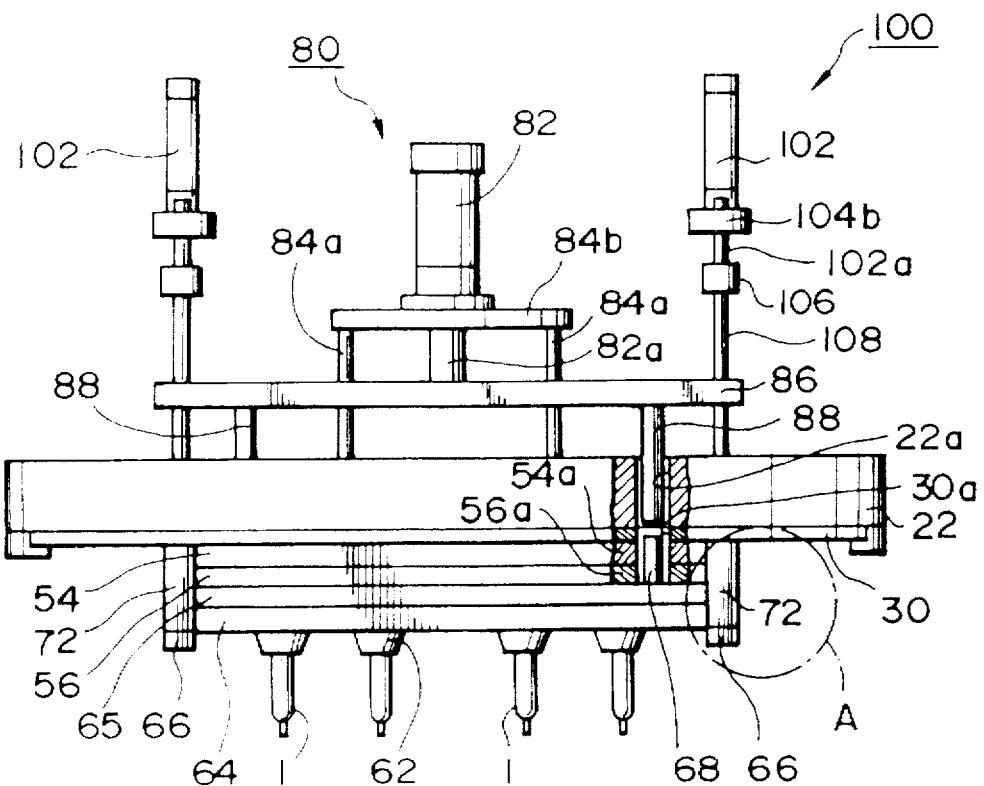
FIG. 8 is a view illustrating a preform ejecting drive mechanism.
Figure 9:
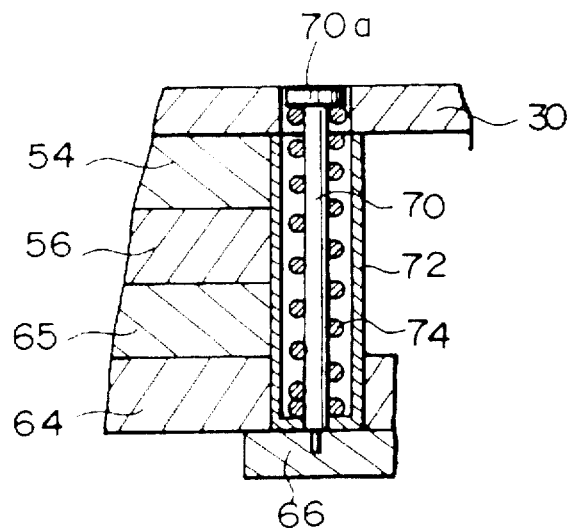
FIG. 9 is an enlarged sectional view of portion A in FIG. 8.

As shown in FIG. 9, which is an enlarged sectional view of portion A of FIG. 8, and in FIG. 6, at each end of each guide plate 66 a vertical lifting and lowering pin 70 has its lower end fixed in the guide plate 66, and a flange 70a is formed at the upper end of this lifting and lowering pin 70. A guide cylinder 72 extends downward from the underside of the rotary disc 30, and the lifting and lowering pin 70 is disposed inside this guide cylinder 72. A return spring 74 is disposed between the inner wall of the bottom portion of the guide cylinder 72 and the flange 70a of the lifting and lowering pin 70. The upward urging force of these return springs 74 urges the guide plate 66 upward at all times, and as a result the neck presser plate 65 is normally in contact with the underside of the core fixing plate 56.

By this state of contact between the core fixing plate 56 and the neck presser plate 65 being maintained, the injection core mold 50 and the neck cavity mold 60 are kept clamped together. When in the preform ejecting section 16 an external force (which will be further discussed later) is applied to the lifting and lowering pins 70, the lifting and lowering pins 70 descend against the urging force of the return springs 74 and the neck presser plate 65 is driven down so that it moves away from the underside of the core fixing plate 56 and pushes the neck fixing plate 64 downward. As a result, the core pins 52 of the injection core mold 50 are released from the preforms 1 whose neck portions 2 are held by the neck cavity mold 60.

Preform Ejecting Section 16

Next, the construction of the preform ejecting section 16, and in particular the preform ejection drive mechanism will be described. In this preferred embodiment, the preform ejection drive mechanism is made up of a neck mold-release driver 80 and a split mold opening driver 100. As shown in FIG. 8, the neck mold-release driver 80 has a first cylinder 82, and this first cylinder 82 is mounted on a first cylinder mounting plate 84b supported on the upper clamping plate 22 by way of first support rods 84a. The first cylinder 82 drives a first raising and lowering plate 86 up and down by way of a first piston rod 82a. Presser drive rods 88 are provided at each end of this first raising and lowering plate 86. Holes 22a are provided in the upper clamping plate 22 passing through from the upper surface to the lower surface thereof, and the presser drive rods 88 are disposed in these holes 22a. The initial position of the first raising and lowering plate 86 is a position such that the ends of the presser drive rods 88 do not project below the underside of the upper clamping plate 22 so they do not obstruct the rotation of the rotary disc 30.

As shown in FIG. 8, the rotary disc 30, the core presser plate 54 and the core fixing plate 56 respectively have holes 30a, 54a and 56a in positions facing the holes 22a in the upper clamping plate 22. Driven rods 68 disposed in the holes 30a, 54a and 56a are mounted on the upper surface of the neck presser plate 65.

Figure 10:
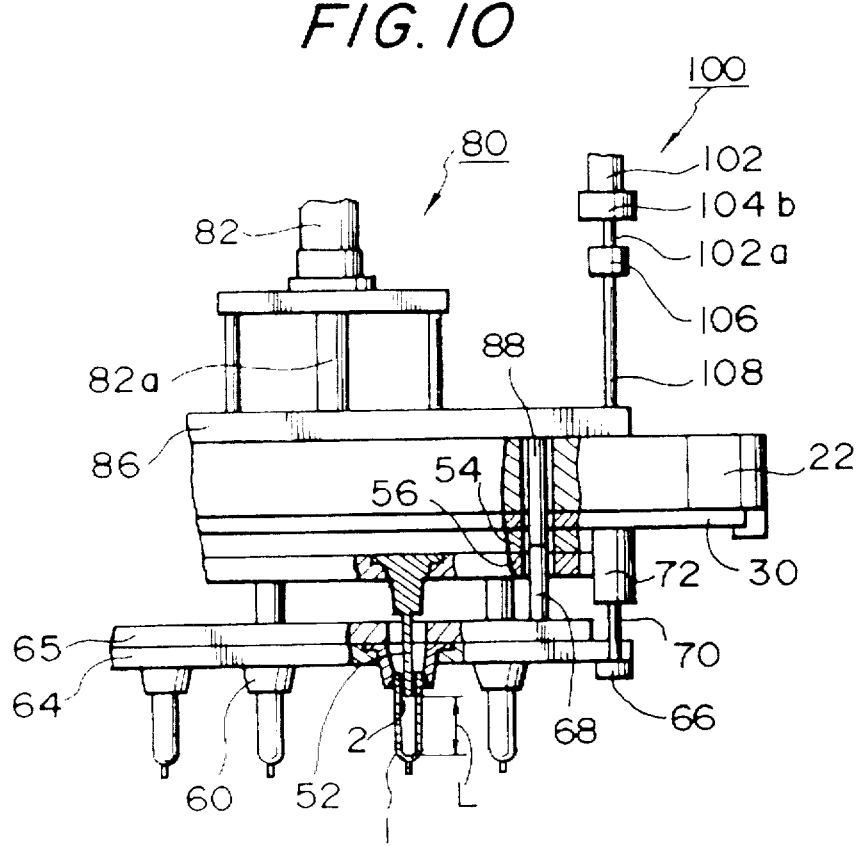
FIG. 10 is a partially sectional view illustrating the mold-released state of the injection core mold.

As a result, when the first cylinder 82 is driven, the neck presser plate 65 and the neck fixing plate 64 are driven down against the urging force of the return springs 74 by the first cylinder 82 by way of the first piston rod 82a, the presser drive rods 88 and the driven rods 68. As shown in FIG. 10, this causes the core pins 52 of the injection core mold 50 to release from the preforms 1 whose neck portions 2 are held by the neck cavity mold 60. In this preferred embodiment, the core pins 52 of the injection core mold 50 do not have to be pulled completely clear of the open ends of the preforms 1, it only being necessary that at least gaps through which air can enter form between the core pins 52 and the inner walls of the preforms 1. In this preferred embodiment, the downward stroke of the neck fixing plate 64, that is the releasing stroke of the core pins 52 (the length L shown in FIG. 10), is set at for example 50 mm.

Next, the split mold opening driver 100 will be described. As shown in FIG. 1 and FIG. 8, this split mold opening driver 100 has for example two second cylinders 102. These second cylinders 102, as shown in FIG. 11, are mounted on a second cylinder mounting plate 104b supported on the first raising and lowering plate 86 by way of second support rods 104a. As a result, when the first raising and lowering plate 86 is driven up or down by the first cylinder 82, the second cylinders 102 are also moved up or down at the same time. These second cylinders 102 drive second raising and lowering plates 106 up and down by way of second piston rods 102a. The split plate opening cams 108 are mounted on these second raising and lowering plates 106. The lower end portions of these split plate opening cams 108 are of a wedge shape fitting the wedge holes 64d formed in the split plates 64a and 64b constituting the neck fixing plate 64. By driving the second cylinders 102 the split plate opening cams 108 are driven down and the wedge portions at their ends are thereby inserted into the wedge holes 64d in the neck fixing plate 64, and this opens the split plates 64a and 64b. Consequently the pairs of split molds 62a and 62b mounted on this pair of split plates 64a and 64b are opened, and the preforms 1 are ejected from the neck cavity mold 60. In this preferred embodiment the drive timing of the second cylinders 102 is set to after the first cylinder 82 is driven.

Next, the operation of the preform molding station 10 of the apparatus of the preferred embodiment will be described.

Injection Molding in Injection Molding Section 14

The clamping cylinder 28 is driven and the upper clamping plate 22 is thereby driven down, whereby the injection core mold 50 and the neck cavity mold 60 are clamped to the injection cavity mold 42. After the clamped state shown in FIG. 4 is reached, by a screw inside the injecting apparatus 12 being advanced and rotated, the preforms 1 injection molding material, for example polyethylene terephthalate (PET), is injected by way of the hot runner mold 40 into the cavity bounded by the molds 42, 50 and 60, and the preforms 1 are thereby injection molded.

Cooling Step in Injection Molding Section 14

The injection cavity mold 42, the injection core mold 50 and the neck cavity mold 60 each have a coolant, for example water at room temperature, circulating through them, and the resin injected into the cavity bounded by the molds can be immediately cooled.

Injection Cavity Mold 42 Mold-Release Step in Injection Molding Section 14

By the clamping cylinder 28 being so driven that it lifts the upper clamping plate 22, the injection core mold 50 and the neck cavity mold 60 can be lifted up away from the injection cavity mold 42 as shown by the mold-open state of FIG. 10. At this time, because the neck portions 2 of the preforms 1 form an undercut with respect to the mold-release direction, the injection molded preforms 1 are held on the injection core mold 50 and neck cavity mold 60 side and are released from the injection cavity mold 42.

The timing at which this mold-release starts in the injection molding section 14 can be made considerably earlier than a conventional mold-release starting timing. In other words, the cooling time of the preforms 1 in the injection molding section 14 can be shortened. This is because even after the preforms 1 have been released from the injection cavity mold 42 the core pins 52 of the injection core mold 50 remain inside the preforms 1 and deformation of the preforms 1 accompanying their thermal contraction can be prevented. Therefore, the mold-release temperature of the preforms 1 in the injection molding section 14 only has to be low enough for a skin layer thick enough for the shape of the preforms 1 to be maintained after they are released from the injection cavity mold 42 to form at the outer surfaces of the preforms 1, and can be higher than conventional mold-release temperatures. Even if the mold-release temperature is high like this, because the cooling causes the preforms 1 to contract around the core pins 52 of the injection core mold 50, mold-release from the injection cavity mold 42 can be carried out relatively smoothly, and preform 1 mold-release problems do not occur. Also, because in the injection molding section 14 withdrawal of the core pins 52 is not carried out, even if the preforms 1 are mold-released at a high mold-release temperature, the mold-release problem of the lower ends of the preforms 1 being lifted together with the core pins 52 does not occur.

The clamped state of the injection core mold 50 and the neck cavity mold 60 with respect to the preforms 1 released from the injection cavity mold 42 is maintained by the core fixing plate 56 and the neck presser plate 65 being kept in contact with each other by the return springs 74. This clamped state of the injection core mold 50 and the neck cavity mold 60 is maintained through the subsequent preforms 1 carrying step and until in the preform ejecting section 16 the injection core mold 50 is released from the preforms 1. Cooling of the preforms 1 is possible throughout the time during which this clamped state of the injection core mold 50 and the neck cavity mold 60 is maintained.

Preforms 1 Carrying Step

The preforms 1 are carried from the injection molding section 14 to the preform ejecting section 16 by the rotary actuator 32 being driven and the rotary disc 30 constituting the first circulatory carrier being rotated thereby through 180°. During this preforms 1 carrying step, it is possible for cooling of the preforms 1 by the coolant circulating through the injection core mold 50 and the neck cavity mold 60 to continue without interruption.

Generally, when the preforms 1 are mold-released at a high temperature, crystallization occurs due to inadequate cooling and the wall surfaces of the preforms 1 become nontransparent, and particularly when PET is being used to make transparent containers this is a fatal defect. According to experiments carried out by the present inventors, this crystallization and loss of transparency of the preforms 1 accompanying inadequate cooling is particularly marked at the inner wall sides of the preforms 1. This is because at the inner wall side of a preform 1 there is less surface area in contact with the mold and consequently the inner wall is more liable to be inadequately cooled than the outer wall. Also, when as in the past the injection cavity mold 42 and the injection core mold 50 are released from the preforms 1 in the injection molding section, the inner wall side is more liable to be inadequately cooled than the outer wall because the heat-radiating surface area at the inner wall side of the preform 1 is smaller than at the outer wall side and furthermore heat is confined in the interior of the preform 1.

In this preferred embodiment, even if in the injection molding portion 14 the preforms 1 are mold-released at a relatively high temperature, in the subsequent carrying step it is possible for the preforms 1 to continue to be cooled by the injection core mold 50 and the neck cavity mold 60. In particular, because the inner walls of the preforms 1 can be uninterruptedly cooled by the core pins 52 of the injection core mold 50, crystallization and loss of transparency caused by inadequate cooling can be certainly prevented. Also, the neck portions 2, which because they are thick have large heat capacities and are more liable to crystallize than other portions, can be cooled by the neck cavity mold 60 and prevented from crystallizing.

Preform Cooling Step in Preform Ejecting Section 16

Even after the preforms 1 have been carried into the preform ejecting section 16, by the clamped state of the injection core mold 50 and the neck cavity mold 60 with respect to the preforms 1 being maintained, the preforms 1 can be cooled as they were during the above-mentioned carrying step. At this time, even if in the injection molding section 14 the clamping cylinder 28 has been driven and the upper clamping plate 22 lowered for the injection molding of the next preforms, because the above-mentioned clamped state in the preform ejecting section 16 is maintained, cooling of the preforms 1 can be continued.

Separation of Neck Cavity Mold 60 from Injection Core Mold 50

Cooling of the preforms 1 by the core pins 52 of the injection core mold 50 only has to continue long enough for crystallization caused by inadequate cooling of the inner walls of the preforms 1 to be prevented and for deformation of the ejected preforms 1 to be avoided, and indeed if the preforms 1 are excessively cooled by the core pins 52, removal of the core pins 52 becomes difficult. Therefore, in this preform ejecting section 16, first the injection core mold 50 is released from the preforms 1. In this preferred embodiment, this is achieved by the neck cavity mold 60 holding the preforms 1 being released from the injection core mold 50.

This separation of the neck cavity mold 60 is carried out by the neck presser plate 65 kept in contact with the core fixing plate 56 by the urging force of the return springs 74 being lowered by the neck mold-release driver 80. When the first cylinder 82 of the neck mold-release driver 80 is driven, the pushing force thereof transmitted through the first piston rod 82a, the first raising and lowering plate 86, the presser drive rods 88 and the driven rods 68 causes the neck fixing plate 64 to be pressed against the neck presser plate 65 and be driven downward as shown in FIG. 6 and FIG. 10. At this time, because the preforms 1 have their neck portions 2 held by the neck cavity mold 60, the preforms 1 are also driven downward together with the neck fixing plate 64 and the neck cavity mold 60. Consequently, the separation of the neck cavity mold 60 from the injection core mold 50 results in the injection core mold 50 being released from the preforms 1.

This mold-releasing stroke of the injection core mold 50 with respect to the preforms 1 does not have to be so long that the core pins 52 are pulled completely clear of the open ends of the preforms 1 for the subsequent carrying of the preforms 1 as it does conventionally, and need only be long enough for at least gaps through which air can enter to be formed between the inner walls of the preforms 1 and the core pins 52. Consequently, the mold-releasing stroke of the injection core mold 50 depends on the angle of the removal taper provided on the core pins 52 and the inner walls of the preforms 1, and the greater this removal taper angle is, the shorter the mold-release stroke need be. Because the mold-releasing stroke of the injection core mold 50 can be shortened in this way the installation height of the first cylinder 82 can be made low and the overall height of the injection molding apparatus can be made low, and this is advantageous in the transportation and installation of the apparatus.

Preforms 1 Ejection Step in Preform Ejecting Section 16

Because the preforms 1 have their neck portions 2 held by the neck cavity mold 60 comprising the pairs of split molds 62a and 62b, the preforms 1 can be ejected by this neck cavity mold 60 being released. To bring this about, the second cylinders 102 of the split mold opening driver 100 are driven. This driving force of the second cylinders 102 is transmitted to the split plate opening cams 108 by way of the second piston rods 102a and the second raising and lowering plates 106. By the split plate opening cams 108 being driven downward, as shown in FIG. 11 their ends are inserted into the wedge holes 64d formed in the split plates 64a and 64b, these split plates 64a and 64b are driven open, and the pairs of split molds 62a and 62b are thereby opened. At this time, even if a neck portion 2 of a preform 1 has stuck to one of the split molds 62a, 62b and tries to move therewith, because the respective core pin 52 of the injection core mold 50 is still inside the preform 1, lateral movement of the preform 1 is restricted and the preform 1 can be dropped downward without fail.

In the state before the split plate opening cams 108 are driven downward, in order to avoid the split plate opening cams 108 interfering with the rotation of the rotary disc 30 it is necessary that their ends stop within the thickness of the upper clamping plate 22. On the other hand, because the neck fixing plate 64 which is driven open by these split plate opening cams 108 is in the farthest position from the rotary disc 30, the downward stroke of the split plate opening cams 108 is long. In this preferred embodiment, because the second cylinders 102 which drive these split plate opening cams 108 are mounted on the first raising and lowering plate 86 driven by the first cylinder 82 and because before the split plate opening cams 108 are driven the first raising and lowering plate 86 is driven, the actual downward stroke through which the split plate opening cams 108 are driven by the second cylinders 102 is short. As a result, the installation height of the second cylinders 102 can be made low, the overall height of the injection molding apparatus an be made low, and an apparatus advantageous from the points of view of transportation and installation can be provided.

After this preform 1 ejecting step is finished, the first and second cylinders 82 and 102 return to their original states. As a result, the neck presser plate 65 is brought back into contact with the core fixing plate 56 by the return springs 74, and the injection core mold 50 and the neck cavity mold 60 are returned to their clamped state in preparation for the next injection molding.

The cooling and mold-releasing steps described above carried out in the preform ejecting section 16 only have to be finished within the time taken for the injection molding of the next, new preforms in the injection molding section 14 to finish, in other words within the injection molding cycle time. The preform 1 cooling time depends particularly on the thickness of the trunk portions of the preforms 1, and the thicker the preforms 1 are the longer the cooling time that must be provided. In this preferred embodiment this cooling time can be adjusted by way of the setting of the timing of the mold-release of the injection core mold 50 in the preform ejecting section 16 as well as by adjusting the cooling time in the injection molding section 14. As a result, even while the mold-release temperature in the injection molding section 14 is made high and the injection molding cycle time thereby shortened, because adjustment of the cooling time is easy a highly flexible preform injection molding station can be provided.

After the preform 1 injection molding in the injection molding section 14 is finished, the injection core molds 50 and the neck cavity molds 60 in the two sections 14 and 16 are changed around by the rotary disc 30 being rotated through 180° by the rotary actuator 32. In this preferred embodiment, the rotary actuator 32 consists of reversible rotary carrying means of which the rotary carrying direction reverses each time. As a result, even if the injection core molds 50 and the neck cavity molds 60 rotationally carried have cooling pipes for circulating coolant therethrough connected thereto, these cooling pipes will not be twisted through more than one revolution. Consequently, it is possible to connect these cooling pipes to the molds without using rotary connectors and their construction does not become complicated.

Because for the reasons discussed above the preforms 1 are given a uniform temperature or a suitable temperature distribution, it is possible to mold bottles of a desired thickness. Also, because whitening crystallization of the bottles is prevented, highly transparent bottles can be molded. This invention is not limited to being applied to the hot parison blow molding described above, and of course can also be applied to so-called cold parison blow molding wherein the preforms are returned to room temperature before being heated again and blow molded. In this case also, there is the effect that the injection molding cycle time can be shortened.

Transfer Station 200

Next, the constitution and operation of the transfer station 200 will be described with reference to FIG. 2, FIG. 12 to FIG. 14 and FIG. 21 and FIG. 22. FIG. 12 to FIG. 15 show a mechanism corresponding not to the preferred embodiment apparatus shown in FIG. 1 but rather corresponding to a preferred embodiment apparatus shown in FIG. 21. FIG. 21 shows a case wherein the above-mentioned numbers N and n of preforms molded simultaneously are respectively N=6 and n=2, and accordingly the mechanisms of the transfer station 200 shown in FIG. 12 to FIG. 15 transfer n=2 preforms 1 simultaneously. The case wherein n=1 preform 1 is transferred at a time is exactly the same as the case where n=2 except in that there is no transfer pitch conversion, which will be further discussed later.

This transfer station 200 has a receiving and lowering mechanism 210 which receives and lowers preforms 1 ejected from the preform ejecting section 16 of the preform molding station 10, and an inverting and handing over mechanism 230 which then turns the preforms 1 upside-down and hands them over to the preform receiving section 304 of the blow molding station 300.

Receiving and Lowering Mechanism 210

FIG. 12 and FIG. 13 respectively show the receiving and lowering mechanism 210 in a raised position and a lowered position. This receiving and lowering mechanism 210 has a bottom portion holding part 214 which holds the bottom portion 3 of a preform 1 and a neck lower portion holding part 218 which supports a support ring 2a formed at the lower end of the neck portion 2 of the preform 1. The bottom portion holding part 214 is mounted on a rod 212a of a first raising and lowering drive device 212 comprising an air cylinder or the like and is movable up and down between the raised position in which it is shown in FIG. 12 and the lowered position in which it is shown in FIG. 13. This vertical stroke b is shown in FIG. 4.

The neck lower portion holding part 218 is movable up and down together with the bottom portion holding part 214 and is movable horizontally through a horizontal stroke a shown in FIG. 4. To make this possible, a first slider 220 is disposed on a rail 222 slidably therealong. This first slider 220 is driven horizontally by a rod 216a of a first advancing and withdrawing drive device 216 comprising an air cylinder or the like. The neck lower portion holding part 218 has a small diameter shaft portion 218a at its lower part and a large diameter shaft portion 218b at its upper part, and the small diameter shaft portion 218a passes through a stopper member 220a mounted on the first slider 220. A flange 218c is fixed to the lower end of the small diameter shaft portion 218a which projects below this stopper member 220a. Also, a spring 218d is disposed around a portion of the small diameter shaft portion 218a projecting upward of the bottom portion holding part 214. Because this spring 218d is disposed between the bottom portion holding part 214 and the large diameter shaft portion 218b, the large diameter shaft portion 218b is pushed upward by the spring 218d as the bottom portion holding part 214 ascends, and the neck lower portion holding part 218 can thereby be raised. When the first advancing and withdrawing drive device 216 is driven, because this horizontal driving force is transmitted by way of the first slider 220 to the shaft portions 218a and 218b, the neck lower portion holding part 218 is caused to slide horizontally. This sliding stroke a is shown in FIG. 4.

The operation of this receiving and lowering mechanism 210 will now be explained with reference to FIG. 4, FIG. 12 and FIG. 13. Before the neck cavity mold 60 is driven open in the preform ejecting section 16 of the preform molding station 10, the bottom portion holding part 214 and the neck lower portion holding part 218 are disposed in the positions in which they are shown in FIG. 12. In this state shown in FIG. 12, the raised position of the neck lower portion holding part 218 is determined by the flange 218c thereof abutting with the stopper member 220a. The bottom portion holding part 214 is stopped in a position which it reaches by compressing the spring 218d after the neck lower portion holding part 218 has reached its upper limit position. At this time, the neck lower portion holding part 218 is in a position wherein it is withdrawn to the right in FIG. 4 and FIG. 12 of a position directly below the support ring 2a of the preform 1. When the neck cavity mold 60 is driven open, the preform 1 drops downward and its bottom portion 3 is caught by the bottom portion holding part 214. At this time, as shown in FIG. 12, the preform 1 does not completely release from the core pin 52 and the preform 1 maintains an upright state with a portion of the core pin 52 remaining inserted therein.

After that the first advancing and withdrawing drive device 216 is driven, and the neck lower portion holding part 218 is moved to the left through the stroke a (see FIG. 4). As a result, the neck lower portion holding part 218 is positioned directly below the support ring 2a of the preform 1.

After that, the first raising and lowering drive device 212 is so driven that it pulls in the rod 212a, and the bottom portion holding part 214 starts to be lowered. In the initial stage of this lowering, until the spring 218d returns to its original length, the neck lower portion holding part 218 stays in its upper position. As a result, during the initial stage of this lowering, the bottom portion holding part 214 moves away from the bottom portion 3 of the preform 1 and the support ring 2a of the preform 1 comes to rest on the neck lower portion holding part 218. The first raising and lowering drive device 212 continues to be driven after this, and the preform 1 descends with its support ring 2a being held by the neck lower portion holding part 218 only. It is preferable that members of low thermal conductivity, for example synthetic resin or the like, be used for the portions of the bottom portion holding part 214 and the neck lower portion holding part 218 which make contact with the preform 1. The preform 1 supported by the neck lower portion holding part 218 continues to be lowered until it reaches the position in which it is shown in FIG. 13.

Inverting and Handing Over Mechanism 230

Next, the constitution of the inverting and handing over mechanism 230 will be described with reference to FIG. 4 and FIG. 13 to FIG. 15. This inverting and handing over mechanism 230 has two neck holding mechanisms 232 corresponding to the number n=2 of preforms simultaneously blow molded in the blow molding section 310 shown in FIG. 21 (see FIG. 14). The neck holding mechanisms 232 each have an open/closeable pair of neck holding members 234 which hold the neck portion 2 of the preform 1. As shown in FIG. 15, these two neck holding mechanisms 232 are mounted on a support table 236, and this support table 236 is linked to a rod 238a of a second raising and lowering drive device 238 comprising an air cylinder or the like. As a result, the two neck holding mechanisms 232 are movable vertically through a vertical stroke e shown in FIG. 4. In order to make this vertical movement smooth, for example two guide rods 240 are provided and guided by guide portions 242.

The second raising and lowering drive device 238 and the guide portions 242 described above are mounted on a second slider 244 as shown in FIG. 15. This second slider 244 is provided with a horizontal drive device 246 which moves the second slider 244 in the direction in which the number of preforms N, for example 4, simultaneously molded in the injection molding section 14 are arrayed. This horizontal drive device 246 moves the second slider 244 horizontally by means of for example a ball screw 246a. The horizontal drive device 246 is mounted on a third slider 248, and this third slider 248 is provided with a second advancing and withdrawing drive device 250 which advances and withdraws the raising and lowering drive device 238 through the advancing and withdrawing stroke c shown in FIG. 4. That is, as shown in FIG. 14, a rod 250a of the second advancing and withdrawing drive device 250 is linked to the third slider 248.

Also, there is provided an inverting drive device 252 which rotates the two neck holding mechanisms 232 through 180° about a horizontal axis. The 180° rotational stroke d of this inverting drive device 252 is shown in FIG. 4. As a result of this inversion the preform 1 moves from an upright state wherein the neck portion 2 faces upward to an inverted state wherein the neck portion 2 faces downward.

Next, the operation of this inverting and handing over mechanism 230 will be explained. When the preforms 1 reach their lowered positions as shown in FIG. 13, the neck holding mechanisms 232 which are in a standby position shown with chain lines in FIG. 13 are rotated through 180° by the inverting drive device 252. Opening and closing drive mechanisms incorporated into the neck holding mechanisms 232 close the pairs of neck holding members 234, and the neck portions 2 of the preforms 1 are held by these neck holding members 234. Then the preforms 1 are inverted. Before that, however, to prevent the preforms 1 from interfering with other members, the neck lower portion holding part 218 is withdrawn to the right through the moving stroke a (see FIG. 4), and by the third slider 248 being moved to the left through the moving stroke c (see FIG. 4) the two neck holding mechanisms 232 are moved to the left. After that, by the preforms 1 being rotated through 180° by the inverting drive device 252, the preforms 1 reach the position shown with chain lines in FIG. 13. Then, by the two neck holding mechanisms 232 being lowered by the second raising and lowering drive device 238 through the stroke e (see FIG. 4), the preforms 1 can be placed on carrier members 330 positioned in the preform receiving section 304 of the blow molding station 300. After that, the neck holding mechanisms 232 are opened and moved through the vertical stroke e and the transverse stoke c shown in FIG. 4 whereby the neck holding mechanisms 232 are moved away from the preforms 1 and returned to their standby position shown with chain lines in FIG. 13.

When the above transfer operation is carried out in the preferred embodiment apparatus shown in FIG. 21 wherein the number of simultaneously blow molded preforms 1 is n=2, n=2 preforms 1 are transferred simultaneously. The transferred two preforms 1 are handed over to carrier members 330 in two receiving positions 260. At this time, the pitch P2 at which the neck holding mechanisms 232 receive the two preforms 1 from the receiving and lowering mechanism 210 is different from the pitch P3 at which the neck holding mechanisms 232 deliver the two preforms 1 to the carrier members 330. This is because during the transfer of the preforms 1 pitch conversion is performed by a pitch change drive device 254; this point will be further discussed later. In the case of the preferred embodiment apparatus of FIG. 1 wherein the number of preforms 1 simultaneously blow molded is n=1, the preform 1 is delivered to a carrier member 330 positioned between the two receiving positions shown in FIG. 14. Therefore, each time an injection molding operation in which N=4 simultaneously injection molded preforms 1 are injection molded is finished, transfer of one preform 1 at a time is repeated four times.

Blow Molding Station 300

Next, the blow molding station 300 will be described with reference to 41, FIG. 4 and FIG. 16 to FIG. 20.

Second Circulatory Carrier 302 and Preform Receiving Section 304

This blow molding station 300 circulates the carrier member 330 carried by the second circulatory carrier 302 in order through the preform receiving section 304, the heating section 306, the standby section 308, the blow molding section 310 and the bottle ejecting section 312. As shown in FIG. 1, the second circulatory carrier 302 has four sprockets 320a to 320d, and for example only the sprocket 320a is driven and the other sprockets 320b to 320d are not driven. An endless carrier chain 322 runs around these four sprockets 320a to 320d. Some other endless drive member, such as a belt, for example a V-belt or a toothed belt, can be used instead of the chain, and other rotary drive members such as pulleys can be used instead of the sprockets.

In the preferred embodiment apparatus shown in FIG. 1, ten carrier members 330 are fixed to the carrier chain 322. This fixing structure is as follows:

As shown in FIG. 18, each carrier member 330 has a cylindrical mount portion 332. This mount portion 332 has is provided at one side thereof with projecting portions 334a and 334b which respectively project above and below the carrier chain 322, sandwiching the carrier chain 322. Adjacent chain links in the carrier chain 322 are connected by hollow pins, and the upper and lower projecting portions 334a and 334b are linked to the carrier chain 322 by fixing pins 336 being passed through the central portions of the hollow pins and having their ends secured so that they cannot drop out.

A cylinder 342 is rotatably supported by way of a bearing 340 inside the cylindrical portion of the mount part 332. The upper portion of this cylinder 342 functions as a carrying surface 344 on which the end surface of the neck portion 2 of an inverted preform 1 is placed. Also, a carrying pin 346 is supported inside this cylinder 342. This carrying pin 346 has a portion thereof projecting upward of the carrying surface 344 which enters the neck portion 2 of the preform 1 and can support the preform 1 in its inverted state. Thus, the carrying surface 344 and the carrying pin 346 constitute a preform 1 supporting portion.

As shown in FIG. 16, three cam followers 338 consisting of rollers or the like are supported on this carrier member 330. Two of the cam followers 338 roll along the inner side locus described when the carrier member 330 is driven by the carrier chain 322. The other cam follower 338 rolls along the outer side locus. These three cam followers 338 are guided by a carrier base 324 or by rails 326, depending on where the carrier member 330 is in the blow molding station 300. As shown in FIG. 18, the two rails 326 are disposed on either side of the carrying path and each are formed with a C-shaped cross-section and have a cam surface 326a. These rails 326 have portions which so project that they cover the upper portions of the cam followers 338, and the cam followers 338 cannot leave the rails 326. These rails 326 are disposed in the blow molding section 310.

On the other hand, in all parts of the carrying path outside the blow molding section 310, for example as shown in FIG. 19 showing the heating section 306, the carrier base 324 is provided below the carrying path. Upper surfaces of this carrier base 324 constitute cam surfaces 324a. Portions of the rails 326 disposed in the heating section 306 are so disposed that they cover the upper portions of the cam followers 338 and prevent the cam followers 338 from escaping from their travel paths. Because if the carrier base 324 were provided in the blow molding section 310 it would not be possible for a drawing rod and a blow core mold to be inserted from below into the preform 1, such a construction is not used.

An autorotation sprocket 348 is mounted on the cylinder 342 of the carrier member 330. When the preform 1 is in the heating section 306, this autorotation sprocket 348 rotates the preform 1 about its vertical axis; this point will be further discussed in the description of the heating section 306.

The driving sprocket 320a repeats an intermittent carrying movement wherein it moves by an amount corresponding to one pitch of the carrier members 330 fixed to the carrier chain 322 at a predetermined pitch and then stops for a predetermined period of time. By the preform 1 being received in an inverted state by the preform receiving section 304 of the blow molding station 300 the preform 1 is placed on the carrying surface 344 of the carrier member 330 and the carrying pin 346 is inserted into the neck portion 2 of the preform 1. When after that the driving sprocket 320a is driven and rotates, the carrier chain 322 meshing with the sprockets 320a to 320d moves and the carrier members 330 are thereby moved by one pitch. By this carrying operation being repeated, the preforms 1 received in the preform receiving section 304 are carried through the heating section 306 and the standby section 308 to the blow molding section 310, and here they are drawn and blow molded into bottles 6. After that the bottles 6 on the carrier members 330 are carried to the bottle ejecting section 312, and here the bottles 6 are ejected to outside the apparatus.

Heating Section 306

Next, the heating section 306 will be described with reference to FIG. 19 and FIG. 20.

The heating section 306 heats the preform 1 by means of radiant heat in a space enclosed by a heating box cover 350. As described above, in the apparatus of this preferred embodiment, the preform 1 can be amply cooled by the injection core mold 50 while it is being carried to the preform ejecting section 16 and in the preform ejecting section 16 until the injection core mold 50 is released from the preform 1. As a result, while the method is still a hot parison method, the preform 1 can be amply cooled and can be cooled to a temperature lower than is suitable for blow molding. For this reason, in the apparatus of this preferred embodiment, the preform 1 is heated in the heating section 306 provided in the blow molding station 300 until it reaches a temperature suitable for blow molding.

Inside the heating box cover 350 of the heating section 306 there are provided first to fourth barlike heaters 352a to 352d constituting a first heater set disposed spaced apart in the axial direction of the preform 1. The barlike heaters 352a to 352d are for example infrared heaters, and extend in the preform 1 carrying direction inside the heating box cover 350. The first and second barlike heaters 352a and 352b are partly surrounded by a focussing reflecting plate 354a, and heat especially the bottom portion 3 of the preform 1 with radiant heat. The third and fourth barlike heaters 352c and 352d are partly surrounded by a focussing reflecting plate 354b and heat especially the vicinity of the trunk portion 4 of the preform 1 with radiant heat. As shown in FIG. 19, a reflecting plate 356 is disposed on the other side of the carrying path facing the barlike heaters 352a to 352d.

Also, as shown in FIG. 19, fifth and sixth barlike heaters 352e and 352f constituting a second heater set are disposed one on either side of the preform 1 carrying path. These barlike heaters 352e and 352f are positioned at such a vertical height that they face the vicinity of the neck portion 2 of the preform 1 which is draw orientated in the blow molding section 310. The region of the preform 1 heated by these fifth and sixth barlike heaters 352e and 352f is the region which is immediately below the neck portion 2 when the preform 1 is upright, and will hereinafter be called the region below the neck 4a.

This region below the neck 4a is the region corresponding to the shoulder portion of the blow molded bottle 6. Consequently, when the preform 1 is positioned inside the blow mold 378, this region below the neck 4a is in the position closest to the surface of the blow cavity. Because of this, because the transverse axis orientation rate is low, the region below the neck 4a tends to become thick, but by amply heating the region below the neck 4a it is possible for it to be molded to the desired thinness. To this end, in this preferred embodiment, as well as the fifth and sixth barlike heaters 352e and 352f being disposed in positions where they face the region below the neck 4a of the preform 1, the heat-radiating surfaces of these heaters are disposed closer to the region below the neck 4a than the other heaters are to the preform 1.

As shown in FIG. 20, two sprockets 360a and 360b are disposed inside the heating box cover 350 of this heating section 306, and an autorotation drive chain 358 runs around these two sprockets 360a and 360b. This autorotation drive chain 358 also meshes with the autorotation sprocket 348 on the carrier member 330 that has been carried into the heating section 306. As a result of this arrangement, when the autorotation drive chain 358 is driven, the autorotation sprocket 348 rotates, this rotation is transmitted by way of the cylinder 342 to the preform 1, and the preform 1 is rotated.

As a result, when the preform 1 is carried into the heating section 306, the bottom portion 3 and the trunk portion 4 of the preform 1 receive radiant heat both from the barlike heaters 352a to 352d disposed on one side of the carrying path and from the reflecting plate 356 disposed on the other side of the carrying path, and because the preform 1 is rotated it receives heat substantially uniformly in the circumferential direction and therefore is heated uniformly in the circumferential direction. Also, the region below the neck 4a of the preform 1 is amply heated by the fifth and sixth barlike heaters 352e and 352f disposed close to the preform 1 on either side of the carrying path, and furthermore the rotation of the preform 1 ensures that this region below the neck 4a also is heated substantially uniformly in the circumferential direction.

Here, as shown in FIG. 20, when the preform 1 carrying direction is direction A, the direction of travel of the autorotation drive chain 358 where it meshes with the autorotation sprocket 348 of the carrier member 330 is made direction B, the opposite direction to direction A. The reason for this is as follows:

If the carrier chain 322 and the autorotation drive chain 358 were both to move at the same speed and in the same direction, direction A, there would be no relative movement between the autorotation sprocket 348 on the carrier member 330 side and the autorotation drive chain 358, and the preform 1 would not rotate at all. Even if the running speeds of the carrier chain 322 and the autorotation drive chain 358 were to be changed, depending on the sizes of the speeds the rotation of the preform 1 would either be extremely slow or would be reverse rotation. These situations will not occur if the autorotation drive chain 358 is driven at a higher speed than the carrier chain 322, but normally it is not desirable to rotate it at high speed in this way for reasons relating to moment. When rotated at high speed, if the preform 1 is slightly bent, this bend will be made greater by the strong moment it undergoes and this will cause uneven heating of the preform 1 and adversely affect the thickness distribution of the bottle 6.

Therefore, in the preferred embodiment shown in FIG. 20, by having the carrier chain 322 and the autorotation drive chain 358 run in opposite directions, when the preform 1 is carried in direction A the direction of its autorotation will always be the arrow C direction, and the problems described above are eliminated. The preform 1 rotates faster while it is being moved than when it is at a preform 1 stopping position.

Also, in this preferred embodiment, the total number of revolutions through which the preform 1 is rotated while it is inside the heating zone inside the heating box cover 350 is made a substantially integral number. In this preferred embodiment, 'while the preform 1 is in the heating zone' refers to the time that the preform 1 spends moving through the distances L1, L2 and L3 (L1+L2+L3=the heating zone length L), as shown in FIG. 20, and the time the preform 1 spends stopped at the two positions shown in FIG. 20. L1 is the distance over which the preform 1 is carried between entering the heating zone and the first stopping position; L2 is the distance between the two stopping positions; and L3 is the distance over which the preform 1 is carried between the second stopping position and leaving the heating zone. In this preferred embodiment, by making the number of turns through which the preform 1 autorotates in this carrying time and stopped time a substantially integral number of turns, the radiant heat from both sides of the preform 1 carrying path can be received substantially uniformity in the circumferential direction of the preform 1 and temperature variation in the circumferential direction of the preform 1 can thereby be prevented.

Also, according to this preferred embodiment, the operation of heating the preform 1 in this heating section 306 can be carried out after any temperature difference between the inner wall and the outer wall of the preform 1 has been sufficiently reduced. That is, in this preferred embodiment, the preform 1 is amply cooled from the inner wall side thereof by the injection core mold 50 in the preform molding station 10. As a result, the inner wall temperature of the preform 1 ejected in the preform ejecting section 16 is low, and the outer wall temperature is high. However, this preform 1 does not immediately enter the heating section after a short carrying period as in the case of a so-called hot parison or 1-stage apparatus but rather enters the heating section 306 after being transferred by the transfer station 200 and carried stepwise by the carrier member 330. As a result, after the preform 1 is released from the injection molds, a considerably longer cooling time elapses than in a so-called 1-stage apparatus before the preform 1 enters the heating section 306. Because of this, the difference between the temperatures of the inner and outer walls of the preform 1 can be amply moderated. This lack of temperature difference between the inner and outer walls is the same as in so-called cold parison or 2-stage apparatuses, but because unlike the case in these apparatuses the bottle 6 in this preferred embodiment can be blow molded from a preform 1 still containing heat from when it was injection molded, the preferred embodiment is superior in that less heat energy has to be given to the preforms and therefore energy can be saved.

Furthermore, with this preferred embodiment, by heating control of preforms 1 cooled to a temperature lower than a blow molding temperature (but considerably higher than room temperature), the stability of the preform temperature from molding cycle to molding cycle is improved and it is possible to reduce the variation in temperature occurring when a plurality of simultaneously injection molded preforms 1 are blow molded non-simultaneously. Also, in the apparatus of this preferred embodiment, the carrying pitch at which the preforms 1 are carried by the second circulatory carrier 302 is maintained at a fixed pitch. In contrast to this, in conventional cold parison or 2-stage molding machines, the carrying pitch is made smaller when the preforms are heated in the heating section and the carrying pitch is made larger when they enter the blow molding section. The reason why the carrying pitch is made smaller in the heating section is that because it is necessary to heat the preforms all the way from room temperature to the blow molding temperature the total number of preforms inside the heating section is made as large as possible in order to keep the apparatus as small as possible. The reason why the carrying pitch is made larger in the blow molding section, on the other hand, is that when a plurality of preforms are to be blow molded simultaneously the distance between the preforms has to be made at least greater than the maximum width of the molded product. Also, preforms about to be carried into the blow molding section and preforms having just been carried out of the blow molding section have to standby outside the blow mold clamping apparatus of the blow molding section. Because of this, in conventional 1-stage molding machines the carrying pitch has to be changed midway around the carrying path and the apparatus consequently is complex.

In contrast with this, in this preferred embodiment apparatus, because bottles 6 are blow molded from preforms 1 which still contain heat from when they were injection molded in the injection molding section 14, the amount of heat energy which has to be given to the preforms 1 in the heating section 306 is very small compared to a 2-stage case. As a result, the preforms 1 can be fully reheated to the blow molding temperature without the total number of preforms 1 in the heating section 306 being increased, and it is not necessary for the carrying pitch to be changed midway around the carrying path.

Standby Section 308

As shown in FIG. 1, in the carrying path between the heating section 306 and the blow molding section 310, one stop of the preform 1 performed by the normal carrying sequence carrying out intermittent drive is allocated to the standby section 308. The provision of this standby section 308 makes it possible to moderate the temperature distribution in the preform 1, which, being made of a synthetic resin, has poor thermal conductivity. Like the heating in the heating section 306 in this preferred embodiment apparatus, the heating of the preform 1 is normally carried out from the outside using radiant heat. Because of this, the temperature of the inner wall of the preform 1 becomes lower than the temperature of the outer wall. In the apparatus of this preferred embodiment, after the preform 1 is carried out of the heating section 306, by stopping the preform 1 at least once in the standby section 308 before it is carried into the blow molding section 310 it is possible to reduce this temperature difference between the inner and outer walls and the blow molding characteristics of the bottle 6 can thereby be stabilized.

During this temperature distribution moderation in the standby section 308 it is also possible to perform temperature adjustment of the preform 1 actively. By actively performing temperature adjustment of the preform 1 in the standby section 308 it is possible to obtain a temperature distribution which cannot be obtained just by heating the preform 1 while rotating it in the heating section 306.

As a temperature adjusting member disposed in the standby section 308, for example a temperature adjusting core 400 which is inserted from below the preform 1 into the preform 1 and performs temperature adjustment from the inner wall side over a temperature adjustment region S can be used, as shown in FIG. 23. This temperature adjusting core 400 has a first temperature adjusting core 402 which performs temperature adjustment of the region below the neck 4a of the preform 1 from the inner wall side thereof. This temperature adjusting core 400 also has a second temperature adjusting core 404 which performs temperature adjustment on the trunk portion excluding the region below the neck 4a. As described above, because it is necessary to adjust the temperature of the region below the neck 4a to a higher temperature than other regions, in FIG. 23 the first temperature adjusting core 402 has a larger diameter than the second temperature adjusting core 404. Alternatively, a layer consisting of a material which radiates heat of such a wavelength that it is easily absorbed by the resin material from which the preforms 1 are molded (for example PET) may be coated onto the first temperature adjusting core 402.

As shown in FIG. 24, the temperature adjusting member can also be made a temperature adjusting pot 410 having a cylindrical portion which can be positioned around the preform 1. In this case, the temperature adjusting pot 410 has blocks 414a to 414d divided into zones in the axial direction of the preform 1 by thermal insulation 412, and each of the blocks 414a to 414d has an independent temperature adjusting fluid passage 416 whereby independent temperature control of each zone is carried out. Because the temperature adjusting pot 410 can be so positioned that is covers the preform 1, a temperature distribution stepped in the axial direction of the preform 1 can be certainly obtained. By this means, it is possible to for example adjust the region below the neck 4a to a high temperature and adjust the bottom portion 3 to a low temperature. As shown in FIG. 14, it is also possible to apply an internal pressure to the preform 1 by introducing air into the preform 1 in the direction of the arrow 420 and thereby bring the outer wall of the preform 1 and the blocks 414a to 414d into contact and facilitate the temperature adjustment.

Also, as this kind of temperature adjusting member, it is possible to use a member which in one or a plurality of locations in the circumferential direction of the preform 1 extend in the axial direction of the preform 1 and impart the preform 1 with a temperature distribution in the circumferential direction thereof. For example, as shown in FIG. 25, it is possible for example at both sides of the preform 1 to dispose a pair of cooling members 430 along the axial direction of the preform 1 and bring them into contact with the side wall of the trunk portion of the preform 1 using air cylinders 432 or the like. When this is done, the preform 1 is given a temperature distribution in the circumferential direction, and for example as shown in FIG. 26 it is possible to fully secure the wall thickness required of the high transverse axis drawing rate region of a flat bottle 6. This kind of measure can be applied not only to flat containers but also to for example square containers. When a temperature distribution in the circumferential direction of the preform 1 is to be imparted, besides bringing a cooling member into contact with the preform I it is also possible to position a heating member in the vicinity of the preform 1.

Blow Molding Section 310

The blow molding section 310 has two blow mounting plates 370 mounted on the machine bed 8, one on either side of the preform 1 carrying path. As shown in FIG. 4, for example four tie bars 372 are mounted crossing between these two blow mounting plates 370. Two blow mold clamping plates 374 which move horizontally along the four tie bars 372 are mounted between the blow mounting plates 370. These two blow mold clamping plates 374 are opened and closed symmetrically about a vertical line by a blow mold clamping mechanism 376, comprising for example hydraulic pistons, mounted on the blow mounting plates 370.

A pair of split molds 378a and 378b constituting the blow mold 378 are mounted on these two blow mold clamping plates 374. In the case of the preferred embodiment apparatus shown in FIG. 1, because the number n of bottles simultaneously blow molded is n=1, a cavity for one bottle is formed in the pair of split molds 378a and 378b. In the case of the preferred embodiment apparatus shown in FIG. 21, because the number n of bottles simultaneously blow molded is n=2, cavities for two bottles are formed in the pair of split molds 378a and 378b.

A cylinder mounting plate 380 is mounted at a position midway along the upper two tie bars 372, and a bottom mold driving cylinder 382 is mounted on this cylinder mounting plate 380. This bottom mold driving cylinder 382 raises and lowers a bottom mold 384. In this preferred embodiment, because the bottle 6 is blow molded from a preform 1 which is inverted, the bottom mold 384 is made movable up and down above the preform 1.

Thus in this preferred embodiment, while raising productivity by injection molding N=4 preforms 1 simultaneously in the injection molding section 14 of the preform molding station 10, by only molding n=1 bottle 6 at a time in the blow molding section 310 it is possible to raise the operation rate of the blow cavity mold 378. Also, by reducing the number of cavities in the blow cavity mold 378, which is a relatively expensive type of mold, mold costs, molds being consumable items, can be reduced. Furthermore, in this preferred embodiment apparatus, because in the preform molding station 10 the preforms 1 are amply cooled before they are released from the injection molds, and because enough cooling time is provided thereafter for the temperature difference between the inner and outer walls of the preforms 1 to be moderated before the preforms 1 are heated to the blowing temperature, the uniformity of the temperature distribution of the retained heat in the preforms 1 can be increased and the stability of the blow molding can be greatly improved.

Bottle Ejecting Section 312

As shown in FIG. 1 and FIG. 4, the bottle ejecting section 312 is disposed in the carrying path of the carrier members 330 carried by the second circulatory carrier 302 between the blow molding section 310 and the preform receiving section 304. This bottle ejecting section 312 has a neck holding mechanism 390 having for example a similar construction to that of the neck holding mechanisms 232 employed in the inverting and handing over mechanism 230. This neck holding mechanism 390 holds the neck portion of the inverted bottle 6 by means of a pair of holding members. As shown in FIG. 3 and FIG. 4, there are also provided a raising and lowering drive device 392 which raises and lowers this neck holding mechanism 390 and an inverting drive device 394 which inverts the neck holding mechanism through an angle of 180°. By the neck holding mechanism 390 being raised by the raising and lowering drive device 392, the neck portion of the bottle 6 is pulled upward off the carrying pin 346 of the carrier member 330. After that, by this holding mechanism 390 being rotated through 180° by the inverting device 394, the bottle 6 is brought into an upright state to one side of the machine bed 8, and by the pair of holding members of the neck holding mechanism then being opened, the bottle 6 is discharged to outside the apparatus.

When Simultaneous Molding Numbers Are N=6, n=2

FIG. 21 is a plan view of a preferred embodiment apparatus wherein the simultaneous molding numbers are N=6, n=2. The preferred embodiment shown in FIG. 21 differs from the preferred embodiment apparatus shown in FIG. 1 in the following points:

First, because the blow molding section 310 is to simultaneously blow mold two bottles 6 at a time from among the N=2 simultaneously injection molded preforms, the blow cavity mold 378 has two blow cavities spaced an array pitch P3 apart. The array pitch at which the carrier members 330 carried by the second circulatory carrier 302 are spaced apart is the same pitch as the array pitch P3 of the blow cavities in the blow molding section 310. Also, the total number of carrier members fitted to the carrier chain 322 constituting the second circulatory carrier 302 is twenty, twice as many as in the case of the preferred embodiment shown in FIG. 1. Enough preforms 1 for two blow molding cycles, 2×n=4 preforms 1, are stopped inside the heating section 306. In the standby section 308, enough preforms 1 for one blow molding cycle, n=2 preforms 1, are made to standby. The carrier chain 322 and the carrier members 330 used in the preferred embodiment apparatus of FIG. 21 are the same as those used in the preferred embodiment apparatus shown in FIG. 1, and it is only the positions and pitch at which the carrier members 330 are fitted to the carrier chain 322 that are different.

In the preferred embodiment apparatus shown in FIG. 21, in the transfer station 200, the number n=2 of preforms 1 simultaneously blow molded in the blow molding section 310 are simultaneously transferred. For this, a transfer pitch converting operation, which will now be explained with reference to FIG. 22, is necessary. In FIG. 22, six preforms 1 simultaneously injection molded in the injection molding section 14 of the preform molding station 10 are shown as preform 1a to preform 1f. In FIG. 22, the first row on the right shows the array pitch of the preforms 1 injection molded in the preform molding station 10. The array pitch of the preforms 1 at this time is the same as the array pitch P1 of the core pins 52 of the injection molding section 14. The second row from the right in FIG. 22 shows the state of the preforms 1 before they are received by the inverting and handing over mechanism 230 of the transfer station 200. The array pitch of the preforms 1 here is also the pitch P1. The third row from the right in FIG. 22 shows the state of two preforms 1 received by the preform receiving section 304 of the blow molding station 300. The transfer of these two preforms 1 is carried out using the two pairs of neck holding members 234 shown in FIG. 4. The array pitch of the preforms 1 received by the preform receiving section 304 is the same as their array pitch P3 in the blow molding section 310.

Here, in the transfer station 200, when the two preforms 1 are transferred by the two pairs of neck holding members 234, first, for example the first and fourth preforms 1a and 1d are held. That is, the two preforms 1a and 1d are held and the two preforms 1b and 1c are ignored this time. As a result, the array pitch P2 of the neck holding members 234 at this time is P2=3×P1. This pitch conversion from the pitch P2 to the pitch P3 is carried out by the array pitch of the two neck holding mechanisms 232 being converted by the pitch change drive device 254 shown in FIG. 14. Similarly thereafter, by the second and fifth preforms 1b and 1e being transferred and then the third and sixth preforms 1c and 1f being simultaneously transferred after that, the operation of transferring of the six simultaneously molded preforms 1 is completed.

When the simultaneous molding numbers N, n are made N=4, n=2, the transfer operation in the transfer station 200 is carried out with pitch conversion from the pitch P2=2×P1 to the pitch P3 being performed and two preforms being held while the one preform between them is ignored until the next time.

In the case of the preferred embodiment apparatus shown in FIG. 21, the ratio (N/n) of the simultaneous molding numbers N and n is 3. According to studies carried out by the present inventors, in the case of general-purpose medium-sized containers of capacity about 1 to 3 liters having relatively small mouths (the diameter of the opening of the neck portion 2 being about 28 to 38 mm), the ratio of the simultaneous molding numbers N, n should ideally be set to N:n=3:1. The reason for this is as follows: The size of a preform for molding a general-purpose medium-sized container, although some elements do vary according to the application, is within a substantially fixed range. This is because the preform size is determined by the drawing factor necessary to obtain the drawing characteristics of polyethylene terephthalate (PET) resin and the drawing factor necessary for molding stability. Although there is some variation depending on the use for which the container is intended, research carried out by the present inventors has shown that the maximum thickness of the trunk portion 4 of a preform 1 used for a general-purpose medium-sized container lies within the range 3.0 to 4.0 mm.

Generally, the blow molding cycle time (the time required between when a preform 1 is carried into the blow molding section 310 and when the next preform 1 is carried in) required for blow molding by a blow molding machine is approximately 3.6 to 4.0 seconds.

In the case of this preferred embodiment, wherein the preforms 1 are cooled by the injection core mold 50 even after being released from the injection cavity mold 42 and then blow molded thereafter, the time required for molding a preform for this kind of general-purpose medium-sized container is shortened to about ¾ of that of a conventional injecting stretch blow molding machine, and an injection molding cycle time of approximately 10 to 15 seconds is sufficient.

Therefore, if this injection molding cycle time (approx. 10 to 15 seconds) is T1 and the blow molding cycle time (3.6 to 4.0 seconds) is T2, the ratio T1:T2 is about 3:1, and it is established that in order to efficiently mold general-purpose medium-sized containers the simultaneous molding numbers N and n should ideally be set in accordance with this ratio. When large container is to be molded from a thicker preform an injection molding cycle time of 16 seconds or more is suitable and the ratio N:n can be set to around 4:1. When a small container is to be molded from a thin preform the injection molding cycle time is shortened and consequently the ratio N:n can be set to for example 4:2. Thus, if N/n is set to 3, the injection molding cycle and the blow molding cycle will be suitable for molding medium-sized containers, for which the market demand is the greatest, and a blow molding machine with little waste in the molding cycles can be realized.

Intermediate Preform Discharge Mechanism

In this preferred embodiment, as shown in FIG. 2 and FIG. 3, a preform dropout opening is provided in the part of the machine bed 8 where the transfer station 200 is disposed. This preform dropout opening 8a is continuous with a chute 8b formed inside the machine bed 8, and this chute 8b leads to a preform discharge opening 8c formed in the side of the machine bed 8.

With this type of hot parison blow molding machine there are various situations wherein it is desirable that the transfer to the blow molding station 300 of the preforms 1 being molded in the preform molding station 10 be stopped. For example, when the whole blow molding machine is started up, until the preform 1 injection molding characteristics stabilize it is preferable that the imperfect preforms 1 being produced at this stage not be supplied to the blow molding station 300. Also, when for some reason trouble has arisen in the blow molding station 300 it is preferable that only the operation of the blow molding station 300 be stopped and that the operation of the preform molding station 10 not be stopped so that preforms 1 continue to be molded. This is because there are various heating parts in the preform molding station 10 and consequently once the preform molding station 10 is shut down a considerable amount of time is required to start it up again.

In this preferred embodiment, when such a situation arises, the preforms 1 continuing to be injection molded in the preform molding station 10 are discharged to the side of the machine bed 8 through the above-mentioned preform dropout opening 8a, the chute 8b and the discharge opening 8c instead of being transferred to the blow molding station 300 by the transfer station 200. This preform 1 discharging operation can for example be carried out by the pair of neck holding members 234 of the inverting and handing over mechanism 230 taking hold of the preforms 1 as usual but then, without inverting them through 180°, moving the preforms 1 for example horizontally to a predetermined position above the preform dropout opening 8a in the machine bed 8 and then simply releasing the preforms 1.

This preferred embodiment, as sequence control modes, has a bottle molding operating mode wherein the preforms 1 are transferred to the blow molding station 300 and blow molding of the bottles 6 is performed, and a preform molding operating mode wherein the preforms 1 are not transferred to the blow molding station 300. It is possible to change over from the normal bottle molding operating mold for example automatically when an abnormality is detected by a sensor or the like or by an operator flicking a manual switch. When the apparatus is switched over to the preform molding operating mode the operation of the transfer station 200 changes over to the operation of carrying the preforms 1 to the preform dropout opening 8a as described above, and no further preforms 1 are transferred to the blow molding station 300.

FIGS. 27 through 34 show an injection stretch blow molding apparatus which is a further embodiment of the present invention.

The injection stretch blow molding apparatus comprises a machine bed 8 on which a preform molding station 10, a transfer station 500 and a blow molding station 300 are disposed, as more clearly shown in FIG. 33, a side view, and FIG. 34, a layout diagram.

The preform molding station 10 comprises an injection molding section 14 disposed opposite to the injection apparatus 12 shown in FIG. 1 and a preform ejecting section 16 located opposite to the injection molding section 14. The injection core molds 50 are adapted to be intermittently circulated by means of a rotary disc 30, which functions as a first circulatory carrier, between the injection molding section 14 and the preform ejecting section 16 along a circular carrying path. The preform molding station 10 is adapted to mold and remove the preforms 1 with their opened neck portions 2 being directed upwardly, that is, in their erecting state.

As shown in FIG. 34, the blow molding station 300 comprises a second circulatory carrier 302 forming a carrying path of substantially rectangular configuration and for circulatorily carrying products, a preform receiving section 304 disposed on the first side of the second circulatory carrier 302 adjacent to the transfer station 500 for receiving the preforms 1, a heating section 306 disposed on the second side of the second circulatory carrier 302 for heating the preforms 1, a blow molding section 310 disposed on the third side of the second circulatory carrier 302 for blow molding the preforms into bottles and a bottle discharge (bottle ejecting) section 312 disposed on the fourth side of the second circulatory carrier 302. In the blow molding section 300, each of the preforms 1 is carried by the second circulatory carrier 302 with the opened neck portion 2 thereof being directed downwardly, that is, in its inverted state and then blow molded into a bottle under such an inverted state.

The structures of the preform molding and blow molding stations 10, 300 are basically the same as in the previous embodiments and will not further be described herein. However, only the transfer station 500 will now be described since its structure is different from those of the previous embodiments. It is now assumed that the preform molding station 10 simultaneously forms six preforms and the blow molding station 300 simultaneously forms two bottles. It is further assumed that the injection molding pitch of the preform molding station 10 is smaller than the blow molding pitch of the blow molding station 300.

As shown in FIGS. 27 to 32, the transfer station 500 comprises a receiving and lowering mechanism 502 for receiving and lowering preforms 1 from the removal section 16 of the preform molding station 10 in their erecting state and an inverting and handing over mechanism 504 for inverting the received preforms upside down and for handing over the inverted preforms 1 to the preform receiving section 304 of the blow molding station 300. The receiving and lowering and inverting and handing over mechanisms 502, 504 are located parallel to each other on two guide rails 505 for horizontal movement.

The receiving and lowering mechanism 502 comprises gate cutters 506 as in the form of an air nipper for cutting the gate of each of the preforms at the preform ejecting section 16 of the preform molding station 10, holding members 508 for receiving and holding preforms 1 removed from the preform ejecting section 16, a first raising and lowering drive device 510 for vertically moving the gate cutters 506 and holding members 508, and a first horizontally drive device 512 for horizontally moving the gate cutters 506 and holding members 508 together with the first raising and lowering drive device 510.

Six of such gate cutters 506 are arranged in the direction of array of the preforms 1 in the preform ejecting section 16 of the preform molding station 10 with a spacing equal to the injection molding pitch of the preforms 1. Thus, the receiving holes 514 of the six gate cutters 506 simultaneously receive the gates of six preforms 1 to cut them.

Six of such holding members 508 are arranged in the direction of array of the preforms 1 in the preform ejecting section 16 of the preform molding station 10 and adapted to receive six preforms 1 from the preform ejecting section 16 at the same time.

Since each of the preforms 1 formed at the preform molding station 10 has a support ring 2a at the neck portion 2 thereof, the support ring 2a having its external diameter larger than that of the barrel of the preform 1, each of the holding members 508 engages the bottom of the support ring 2a to hold the preform 1. The holding member 508 restricts the horizontal movement of the preform 1 through a preform receiving hole 516 that has its diameter slightly larger than the external diameter of the lower portion below the support ring 2a of the preform 1.

Each of the holding members 508 is divided into two parts which are supported by pins 518 for horizontal rotation and biased to their closed position by an open/close mechanism that may include biasing means (not shown) such as spring or the like. The holding member 508 can hold and release a preform 1 in its closed and opened states, respectively.

Each of the holding members 508 is supported on a substantially U-shaped receiving member 520. A pitch changing mechanism 522 is adapted to change the injection molding pitch to the blow molding pitch through such receiving members 520.

The pitch changing mechanism 522 comprises a guide rail 524 for slidably guiding the receiving members 520 in the direction of its array, five connecting rods 526 for slidably connecting each pairs of adjacent receiving members 520 to each other and for engaging and stopping them with a spacing equal to the blow molding pitch and two pitch changing drive cylinders 528 each having a piston rod coupled with the corresponding one of the outermost receiving members 520 such that two sets of three receiving members 520 will be slidably moved in the opposite directions to change the molding pitch.

When the two pitch changing drive cylinders 528 draw in their piston rods to place the receiving members 520 in contact with one another, the injection molding pitch is maintained. When the piston rods of the pitch changing drive cylinders 528 are extended, the two outermost receiving members 520 are slidably moved outwardly to engage the connecting rods 526 with the outermost and adjacent receiving members 520 sequentially. Thus, all the receiving members 520 will be slidably moved to change the molding pitch of the holding members 508 supported by these receiving members 520 to the blow molding pitch.

As shown in FIG. 30, the first raising and lowering drive device 510 can vertically move the holding members 508 and gate cutters 506 between a level A at which they receive the preforms 1 from the preform ejecting section 16 (reception height position A) and another level B below the reception height A at which the preforms 1 are moved from the holding members 508 to the inverting and handing over mechanism 504 (delivery height position B). The first raising and lowering drive device 510 comprises three guide rods 530 for vertically guiding the gate cutters 506 and holding members 508 and first raising and lowering cylinders 532 for vertically moving the gate cutters 506 and holding members 508 along the guide rods 530.

When the gate cutters 506 and holding member 508 are vertically moved to the reception height position A by the first raising and lowering cylinders 532, the gate cutters 506 cut the gates of the preforms and the holding members 508 receive the preforms 1. The received preforms 1 are then lowered to the delivery height position B at which they are delivered to the inverting and handing over mechanism 504.

The first horizontal drive device 512 moves the preforms 1 to any one of a preform receiving position C (the position in FIG. 29) whereat the holding members 508 are located directly below the preform ejecting section 16, a gate cutting position D (the position in FIG. 30) whereat the gate cutters 506 are located directly below the preform ejecting section 16 and a holding position E whereat the holding members 508 deliver the preform 1 to the inverting and handing over mechanism 504. The first horizontal drive device 512 comprises a first horizontal drive cylinder 534 for horizontally moving the receiving and lowering mechanism 502 including the holding members 508 and gate cutters 506 with the first raising and lowering drive device 510 between the positions C and E along two guide rails 505. The first horizontal drive device 512 further comprises a stoppage cylinder 560 having a rightward drive force larger than a leftward drive force of the first horizontal drive cylinder 534 and adapted to stop the gate cutters 506 to the gate cutting position D between the positions C and E against the leftward drive force of the first horizontal drive cylinder 534.

While the holding members 508, are moving leftward to the holding position E by the first horizontal drive cylinder 534, the holding members 508 are stopped at the gate cutting position D by the rightward drive force of the midway stoppage cylinder 560 against the leftward drive force of the first horizontal drive cylinder 534 and then moved rightward therefrom to the preform receiving position C by the first horizontal drive cylinder 534.

The inverting and handing over mechanism 504 is provided for the number of simultaneously molded preforms 1 and comprises six neck holding mechanisms 536 disposed with the blow molding pitch, an inverting drive device 538 for inverting the neck holding mechanism 536, second raising and lowering drive device 540 each for vertically moving the corresponding one of the neck holding mechanisms 536, a second horizontal drive device 542 for horizontally moving the neck holding mechanisms 536 with the second raising and lowering drive device 540, and a member 543 for positioning the carrier members.

Each of the six neck holding mechanisms 536 comprises a pair of neck holding members 544 actuated to their closed position for holding the neck portion 2 of a preform 1 and an open/close drive mechanism 546 for opening and closing the neck holding members 544.

Each pair of neck holding members 544 are disposed parallel to each other and adapted to grasp the neck portion 2 of the preform 1 by the tip ends of the neck holding members 544.

The open/close drive mechanism 546 comprises two open/close rods 548 respectively fix one of the pair of neck holding members 544, two open/close drive cylinders 550 each mounted on the corresponding one of the two open/close rods 548, and a synchronizing mechanism 552 such as a rack-and-pinion mechanism disposed between the open/close rods 548.

When the two open/close drive cylinders 550 are actuated in the opposite directions, the two open/close rods 548 are slidably moved in the opposite directions while synchronizing them through the synchronizing mechanism 552, such that the pair of neck holding members 544 are opened or closed to release or hold the neck portion 2 of the preform 1.

The inverting drive device 538 comprises a horizontally disposed inverting shaft 539 and an inverting actuator 554 located on the end of the inverting shaft 539. When the inverting actuator 554 is energized, the open/close drive mechanism 546 is rotated about the inverting shaft through 180 degrees to invert the preform 1 held by the neck holding mechanism 536 in its erecting state.

The neck holding mechanism 536 to be inverted by the inverting drive mechanism 538 is adapted to be positioned at two position, an erection holding height position F whereat the neck portion 2 of the preform 1 is held by the holding members 508 prior to inversion, and an inversion stand-by height position G after inversion lower than the erection holding height position F.

The second raising and lowering drive device 540 is adapted to move the neck holding mechanisms 536 vertically between the inversion stand-by height position G and a delivery height position H whereat the preforms 1 are delivered to the carrier members 330 of the preform receiving section 304. The second raising and lowering drive device 540 comprises second raising and lowering cylinders 556 for vertically moving the neck holding mechanisms 536.

The second horizontal drive device 542 can move the inverting and handing over mechanism 504 to any one of a receiving and holding position I whereat the neck holding mechanisms 536 hold the preforms 1 when the holding members 508 are in their holding position E, a delivery position J whereat the preforms 1 are delivered to the carrier members 330 by the neck holding mechanisms 536 and a stand-by position K between the receiving and holding position I and the delivery position J whereat the preform receiving section 304 waits until all the six carrier members are arranged. The second horizontal drive device 542 comprises a second horizontal drive cylinder 558 for horizontally moving the inverting and handing over mechanism 504 between the receiving and holding position I and the delivery position J along the two guide rails 505, and a stoppage cylinder 559 having a rightward drive force larger than a leftward drive force of the second horizontal drive cylinder 558, said stoppage cylinder 559 being operative to stop the inverting and handing over mechanism 504 at the stand-by position K against the leftward drive force of the second horizontal drive cylinder 558 as the inverting and handing over mechanism 504 is being moved to the delivery position J by the second horizontal drive cylinder 558.

After the preforms 1 have been held by the neck holding mechanisms 536 at the receiving and holding position I, the neck holding mechanisms 536 are moved to the delivery position J by the leftward drive force of the second horizontal drive cylinder 558. In course of such a movement, the inverting and handing over mechanism 504 is forcedly stopped at the stand-by position K since the piston rod of the previously actuated stoppage cylinder 559 engaged with the inverting and handing over mechanism 504. The inverting and handing over mechanism 504 is placed at the stand-by position K until all the six carrier members 330 are arranged. After all the carrier members 330 have been arranged, the drive force of the stoppage cylinder 560 is released to move the carrier members 330 to the delivery position J through the second horizontal drive cylinder 558. After delivered, the carrier members 330 are horizontally moved to the receiving and holding position I by the second horizontal drive cylinder 558.

The carrier positioning member 543 includes six positioning recesses 562 formed therein at positions corresponding to the six carrier members 330 conveyed to the preform receiving section 304, each of the positioning recesses 562 being adapted to receive the corresponding one of the carrier members 330. At the stage whereat the neck holding mechanisms 536 have been moved to the delivery position J by the second horizontal drive cylinder 558, each of the carrier members 330 will engage in the corresponding one of the positioning recesses 562 in the positioning member 543 so that the carrier member 330 can be reliably positioned for ensuring the delivery.

The operation of the transfer station 500 will be described mainly in connection with FIGS. 29 and 30.

In the preform molding station 10, each of the preforms 1 conveyed to the preform ejecting section 16 is supported in its erecting state by a neck cavity mold 60 at a position shown by solid line.

When the receiving and lowering mechanism 502 is biased toward the holding position E under the leftward drive force of the first horizontal drive cylinder 534, the stoppage cylinder 560 is energized to stop the receiving and lowering mechanism 502 at the gate cutting position D. The gate cutters 506 and holding members 508 are in the delivery height position B.

When the gate cutters 506 and holding members 508 are lifted from the delivery height position B to the reception height position A by the first raising and lowering cylinder 532, the gate of each of the preforms 1 is inserted into the gate cutter 506 through the gate inserting hole 514 as shown in FIG. 30. Thus, the gate can be cut by the gate cutter 506.

After the gates have been cut, the holding members 508 are once lowered from the reception height position A by the first raising and lowering cylinder 532 and then moved horizontally to the preform receiving position C by the rightward drive force of the first horizontal drive cylinder 534. The holding members 508 are further lifted to a position A shown by broken line in FIG. 29.

Under such a situation, the neck cavity molds 60 are lowered to a releasing position L shown by broken line in FIG. 29 such that the bottom of each of the preforms 1 is inserted into the corresponding preform receiving hole 516. Under such a condition, the preform 1 is released from the neck cavity mold 60 by opening the neck cavity mold 60. The preform 1 falls onto the corresponding holding member 508 on which the support ring 2a thereof is placed. Thus, six preforms 1 injection molded at the same time will be held by six holding members 508 in their erecting state with the injection molding pitch. The preforms 1 are restricted against horizontal movement. When the preforms 1 are being held by the holding members 508, the preforms 1 may be cooled by a stream of cooling air directed toward the bottoms of the preforms.

As the preforms 1 are received by the holding members 508, the first raising and lowering cylinder 532 is actuated to lower the holding members 508 to the delivery height position B. Under such a state, the first horizontal drive cylinder 534 is actuated to move the holding members 508 to the holding position E.

In course of this movement, the pitch changing cylinder 528 of the pitch changing mechanism 522 is actuated to change the injection molding pitch to the blow molding pitch wherein the spacing between adjacent receiving members 520 is increased.

As the preforms 1 are moved to the holding position E after changed to the blow molding pitch, the six neck holding mechanisms 536 of the inverting and handing over mechanism 504 positioned at the receiving and holding position I are actuated by the open/close drive mechanism 546 so that the neck portions 2 of the preforms 1 held by the holding members 508 are held by the neck holding mechanisms 536 with the preforms being erected.

When the neck portions 2 of the preforms 1 are held by the neck holding mechanisms 536, the second horizontal drive cylinder 558 is actuated to move the neck holding mechanisms 536 to the preform receiving section 304. As the neck holding mechanisms 536 reach the stand-by position K, they are stopped by the stoppage cylinder 559. The preforms 1 are placed at their stand-by position until all the six carrier members are arranged in the preform receiving section 304.

When the neck holding mechanisms 536 are carrying the preforms 1 to the stand-by position K while holding them, the inverting actuator 554 is energized to rotate the neck holding mechanisms 536 from the erection holding height position F to the inversion stand-by height position G. As a result, the preforms 1 will be inverted from the electing state to the inverted state under which state the preforms 1 will be placed at their stand-by position immediately before the preform receiving section 304.

In such a case, at the same time when the neck holding mechanisms 536 are initiated to move, the holding members 508 are oppositely moved to the preform ejecting section 16 by the drive force of the first horizontal drive cylinder 534. The holding members 508 are stopped at a time point when the gate cutters 506 reach the gate cutting position D by the stoppage cylinder 559. The system will then wait until the next preforms 1 are conveyed to the preform ejecting section 16.

If it is to remove the preforms 1 from the holding members 508 and when the neck holding mechanisms 536 and holding members 508 are initiated to move, the open/close drive mechanism 546 opens the holding members 508, thereby permitting the preforms 1 to pass therethrough. After passed, the open/close drive mechanism 546 closes the holding members 508 to hold the preforms 1.

When six empty carrier members 330 are arranged in the preform receiving section 304, the stoppage cylinder 559 is released and the second horizontal drive cylinder 558 then moves the neck holding mechanisms 536 to the delivery position J while maintaining them at the inversion stand-by height position G. At the delivery position J, the second raising and lowering cylinders 556 are energized to lower the neck holding mechanisms 536 to the delivery height position H whereat the neck portions 2 of the preforms 1 are placed on the carrier members 330. The open/close drive mechanism 546 is then actuated to release the neck portions 2 of the preforms 1. Thus, the delivery of the six preforms 1 simultaneously formed at the preform molding station 10 have completed. This delivery can be reliably carried out since the positioning member 543 engages and positions the carrier members 330.

On completion of the delivery, the second horizontal drive cylinder 558 is actuated to move the neck holding mechanisms 536 to the stand-by position K and the second raising and lowering cylinder 556 is then actuated to lift the neck holding mechanisms 536 to the original height position. During this lifting, the inverting actuator 554 is energized to invert the neck holding mechanisms 536. The inverted neck holding mechanisms 536 will wait until the next preforms 1 are conveyed by the receiving and lowering mechanism 502.

FIGS. 35 to 38 show an injection stretch blow molding apparatus which is a still further embodiment of the present invention.

In the injection stretch blow molding apparatus, the preform molding station 10 is adapted to form three preforms at the same time while the blow molding station 300 is adapted to form one product at a time.

In the present embodiment, three preforms 1 simultaneously formed by the preform molding station 10 are transferred in their erecting state to the transfer station 600 wherein they are received and held by three holding members 604 in a receiving and lowering mechanism 602 with the injection molding pitch being maintained. Thereafter, a pitch changing mechanism 606 is then actuated to change the injection molding pitch to the blow molding pitch in which the spacing between adjacent preforms becomes larger.

In an inverting and handing over mechanism 608, three neck holding mechanisms 610 have been set at the blow molding pitch. These neck holding mechanisms 610 receive and hold the three preforms 1 in their erecting state from the holding members 604, the preforms 1 having changed to the blow molding pitch at the receiving and lowering mechanism 602. The preforms 1 are then inverted by the inverting drive device 538, the inverted preforms 1 being simultaneously delivered to three carrier members 330 in the preform receiving section 304.

In this embodiment, the external diameter of the support ring 2a in the neck portion 2 of each of the preforms 1 is substantially equal to or smaller than the external diameter of the barrel thereof. It is therefore difficult to hold the neck portion 2 through the support ring 2a.

In place of the holding members 508 supporting the bottom of the support rings 2a in the embodiment of FIGS. 27 to 34, the receiving and lowering mechanism 602 comprises holding members 604 of heat insulating material such as synthetic resin or the like, each of which has a preform insertion portion 612 that can receive the bottom and barrel of the preform 1. Each of the holding members 604 is adapted to hold the preform 1 by contacting at least part of the bottom and barrel of the preform 1. Such a holding member 604 may include a cooling water circulated therethrough to cool the preform 1.

Each of the holding members 604 is lifted into engagement with the corresponding neck cavity mold 60 by a first raising and lowering cylinder 532. The neck cavity mold 60 is adapted to be lowered from the engagement position M to the preform releasing position L. When the length of the preform 1 is changed from one to another, e.g., to a reduced length, the reduction of the height of the injection cavity mold involves lowering of the position (equal to the engagement position M) of the neck cavity mold 60 to be rotated and conveyed. However, the bottom height position of the preform insertion position 612 of each holding member 604 will not be changed. The lowering of the position of the neck cavity mold 60 involves lowering of the releasing position L. In order that the movement of the neck cavity mold 60 can be correspondingly absorbed, guide members 614 supporting the holding member 604 for vertical movement are mounted in the holding member 604 at the opposite sides. A spring 616 upwardly biasing the holding member 604 is mounted about each guide member 614 to provide a cushioning function.

When the holding members 604 receive the preforms 1, the first raising and lowering cylinders 532 are actuated to lower the holding members 604 to the delivery height position B. At this time, the pitch changing mechanism 606 is actuated to change the pitch of the preforms to the blow molding pitch. At the same time, the first horizontal drive cylinder 534 is actuated to move the holding members 604 to the inverting and handing over mechanism 608. The holding members are stopped at a position O directly below the erection holding height position F of the neck holding mechanisms 610 in the inverting and handing over mechanism 608 positioned at the stand-by position K. The first raising and lowering cylinders 532 are actuated to lift the holding members toward the neck holding mechanisms 610 wherein the open/close drive mechanism 546 is actuated to close the neck holding mechanisms 610 to hold the neck portions 2 of the preforms 1. Thereafter, the first raising and lowering cylinders 532 are actuated to lower the holding members 604 and the horizontal drive cylinder is energized to return them to the receiving position C, thereby waiting until the next preform are conveyed to the preform ejecting section 16. At this position, the neck holding mechanisms 610 holding the preforms 1 is inverted to the inversion stand-by height position G by the inverting drive device 538, with the inverted preforms 1 being maintained at their stand-by position. When all the three carrier members 330 are arranged in the preform receiving section 304, the second horizontal drive cylinder 558 is actuated to move the inverting and handing over mechanism 608 to the delivery position J. The second raising and lowering cylinders 556 are energized to lower the neck holding mechanisms 610 for delivering the preforms 1 to the carrier members 330.

Since the receiving and lowering mechanism 602 is simply reciprocated between the preform receiving position C and the holding position E while the inverting and handing over mechanism 608 is also simply reciprocated between the stand-by position K and the delivery position J, the present embodiment does not use such stoppage cylinders 559 and 560 as in the embodiment of FIGS. 27 to 34.

The open/close drive mechanism 546 is only required to open and close the three neck holding mechanisms 610, only a single open/close drive cylinder 550 is required, unlike the embodiment of FIGS. 27 to 34 wherein two open/close drive cylinders are used.

The pitch changing mechanism 606 does not use such connecting rods 526 as in the embodiment of FIGS. 27 to 34, but may change the pitch through the stroke of two pitch changing drive cylinders 528.

The description of the other structures and functions will be omitted since they are similar to those of the embodiment shown in FIGS. 27 to 34.

This invention is not limited to the preferred embodiment described above, and various modifications can be made within the scope of the invention.

In the preferred embodiment described above, the rotary disc 30 carried both the injection core mold 50 and the neck cavity mold 60, but for example in cases such as when the shape of the neck portion 2 does not form an undercut with respect to the mold-release direction it is not always necessary to use the neck cavity mold 60. When the neck cavity mold 60 is not used, after the preforms 1 are released from the injection cavity mold 42 in the injection molding section 14, the preforms 1 can be carried to the preform ejecting section 16 by the injection core mold 50 alone. Because the preforms 1 contract around the core pins 52 of the injection core mold 50 as they cool they can be smoothly released from the injection cavity mold 42, and the preform 1 can be carried by the injection core mold 50 even without there being any undercut at the neck portion 2.

In the preform ejecting section 16, to remove the injection core mold 50 from the preforms 1, for example the core pins 52 of the injection core mold 50 can be provided with a function enabling them to introduce air for ejection into the preforms 1. When this is done, in the preform ejecting section 16, by blowing air from the core pins 52 into the preforms 1 after they are cooled by the injection core mold 50, the preforms 1 can be caused to drop downward by this air pressure.

Each preform holding member 604 of the preform 1 is sufficient so far as it engages part of the barrel and bottom. even though the preform insertion portion 612 thereof does not match the external diameter of the preform barrel.

What is claimed is:

1. An injection stretch blow molding apparatus comprising:

a preform molding station for injection molding preforms;

a blow molding station for stretch blow molding the preforms into containers; and a transfer station for transferring said preforms from said preform molding station to said blow molding station, said preform molding station comprising:

a first circulatory carrier for intermittently circulatorily carrying a plurality of injection core molds disposed apart along a first carrying path;

an injection molding section for injection molding said preforms which are erected and have neck portions opened upwardly, said injection molding section including an injection cavity mold for being clamped relative to one of said injection core molds stopped in course of said first carrying path; and an ejecting section for releasing and ejecting erected preforms relative to one of said injection core molds stopped in course of said first carrying path, said blow molding station comprising:

a second circulatory carrier for intermittently circulatorily carrying said preforms transferred from said preform molding station through said transfer station along a second carrying path with said preforms being inverted to have their opened necks directed downwardly; and a blow molding section including a blow mold for being clamped relative to said preforms stopped in course of said second carrying path, thereby permitting said preforms to be blow molded into said containers, said transfer station comprising:

a receiving mechanism for receiving said erected preforms from one of said injection core molds, said receiving mechanism having holding members for holding said erected preforms;

an inverting mechanism for inverting said preforms; and a vertical movement device for moving said holding members in the vertical direction, wherein said holding members rise to an upper position to receive said erected preforms and fall to a lower position to avoid said injection core molds, wherein a blow molding pitch in the blow molding station is larger than an injection molding pitch in said preform molding station and wherein the receiving mechanism includes a pitch changing mechanism for changing a pitch of said preforms from said injection molding pitch to the blow molding pitch.

2. An injection stretch blow molding apparatus according to claim 1 wherein each of said neck portions of said preforms has a flange portion having an outer diameter that is larger than an outer diameter of a barrel portion below each of said neck portions, and wherein each of said holding members engage a bottom of the flange portion to hold a preform, wherein each of the holding members includes an open and close mechanism for holding or releasing the preform, and wherein the open and close mechanism includes a passage portion which passes through said barrel portion of the preform while said open and close mechanism is closing.

3. An injection stretch blow molding apparatus comprising:

a preform molding station for injection molding preforms;

a blow molding station for stretch blow molding the preforms into containers; and a transfer station for transferring said preforms from said preform molding station to said blow molding station, said preform molding station comprising:

a first circulatory carrier for intermittently circulatorily carrying a plurality of injection core molds disposed apart along a first carrying path;

an injection molding section for injection molding said preforms which are erected and have neck portions opened upwardly, said injection molding section including an injection cavity mold for being clamped relative to one of said injection core molds stopped in course of said first carrying path; and an ejecting section for releasing and ejecting erected preforms relative to one of said injection core molds stopped in course of said first carrying path, said blow molding station comprising:

a second circulatory carrier for intermittently circulatorily carrying said preforms transferred from said preform molding station through said transfer station along a second carrying path with said preforms being inverted to have their opened necks directed downwardly; and a blow molding section including a blow mold for being clamped relative to said preforms stopped in course of said second carrying path, thereby permitting said preforms to be blow molded into said containers;

said transfer station comprising:

a receiving mechanism for receiving said erected preforms from one of said injection core molds, said receiving mechanism having pots for holding said erected preforms, wherein each of said pots has a holding part which contacts at least part of a bottom portion and a barrel portion of a preform to hold each of the preforms; and an inverting mechanism for inverting said preforms.

4. An injection stretch blow molding apparatus according to claim 3 wherein each of the pots has means for cooling an outer wall of the preform.

5. An injection stretch blow molding apparatus according to claim 1 wherein the second circulatory carrier places said carrier members at a preform receiving position opposed to the inverting mechanism, the number of said carrier members to be placed being equal to the number N of preforms which have been injection molded simultaneously in the preform molding station, and wherein the inverting mechanism has a holding mechanism for holding the N preforms at the same time, and wherein said holding mechanism simultaneously delivers the N preforms to the same number (N) of said carrier members stopped at the preform receiving position while inverting the preforms.

6. An injection stretch blow molding apparatus comprising:

a preform molding station for injection molding preforms;

a blow molding station for stretch blow molding the preforms into containers; and a transfer station for transferring said preforms from said preform molding station to said blow molding station, said preform molding station comprising:
- a first circulatory carrier for intermittently circulatorily carrying a plurality of injection core molds disposed along a first carrying path;
- an injection molding section for injection molding said preforms which are erected and have neck portions opened upwardly, said injection molding section including an injection cavity mold for being clamped relative to one of said injection core molds stopped in course of said first carrying path; and
- an ejecting section for releasing and ejecting erected preforms relative to one of said injection core molds stopped in course of said first carrying path, said blow molding station comprising:
- a second circulatory carrier for intermittently circulatorily carrying said preforms transferred from said preform molding station through said transfer station along a second carrying path with said preforms being inverted to have their opened necks directed downwardly; and
- a blow molding section including a blow mold for being clamped relative to said preforms stopped in course of said second carrying path, thereby permitting said preforms to be blow molded into said containers, said transfer station comprising:
- a receiving mechanism for receiving said erected preforms from one of said injection core molds, said receiving mechanism having holding members for holding said erected preforms;
- an inverting mechanism for inverting said preforms;
- a first horizontal movement device for moving the receiving mechanism in the horizontal direction, and wherein the receiving mechanism receives the preforms at a position just below said ejecting section of the preform molding station, and then is horizontally moved by said first horizontal movement device, for delivering the preforms to the inverting mechanism; and
- a second horizontal movement device for moving the inverting mechanism in the horizontal direction, and wherein the inverting mechanism receives the preforms from the receiving mechanism, and then is horizontally moved by the second horizontal movement device, thereby delivering the preforms to the N carrier members.

7. An infection stretch blow molding apparatus according to claim 5 wherein the inverting mechanism holds said preforms in an inverted state with said neck portions being directed downwardly until all the N carrier members are arranged at the preform receiving position.

* * * * *